United States Patent [19]

Song

[11] Patent Number: 5,567,761
[45] Date of Patent: Oct. 22, 1996

[54] AQUEOUS TWO-PART ISOCYANATE-FREE CURABLE, POLYURETHANE RESIN SYSTEMS

[75] Inventor: Zhiqiang Song, Memphis, Tenn.

[73] Assignee: Guertin Bros. Coatings and Sealants Ltd., Winnipeg, Canada

[21] Appl. No.: 313,837

[22] Filed: Sep. 28, 1994

Related U.S. Application Data

[63] Continuation-in-part of Ser. No. 58,240, May 10, 1993, abandoned, and a continuation-in-part of Ser. No. 165,643, Dec. 13, 1993, abandoned.

[51] Int. Cl.$^6$ ................. C08J 3/00; C08F 8/30; C08L 75/00
[52] U.S. Cl. .............. 524/523; 525/131; 525/127; 525/300
[58] Field of Search ............. 524/523; 525/131; 525/127, 300; 528/224

[56] References Cited

U.S. PATENT DOCUMENTS

| | | | |
|---|---|---|---|
| 2,480,810 | 8/1949 | Jones | 260/86.1 |
| 2,500,265 | 3/1950 | Walling et al. | 260/89.5 |
| 3,607,834 | 9/1971 | Marx et al. | 260/63 R |
| 3,689,593 | 9/1972 | Jackson | 260/859 |
| 3,694,415 | 9/1972 | Honda et al. | 260/77.5 CR |
| 3,775,377 | 11/1973 | Kokawa | 260/77.5 CR |
| 3,850,770 | 11/1974 | Juna et al. | 204/159.19 |
| 3,954,714 | 5/1976 | Kuehn | 260/47 CZ |
| 3,993,849 | 11/1976 | Victorius | 428/463 |
| 4,034,017 | 7/1977 | Chang et al. | 260/859 R |
| 4,089,763 | 5/1978 | Dart et al. | 204/159.23 |
| 4,112,017 | 9/1978 | Howard | 260/859 R |
| 4,217,396 | 8/1980 | Heckles | 428/500 |
| 4,243,578 | 1/1981 | O'Sullivan et al. | 260/42.52 |
| 4,408,018 | 10/1983 | Bartman et al. | 525/300 |
| 4,422,914 | 12/1983 | Tsao et al. | 204/159.19 |
| 4,687,813 | 8/1987 | Lenz et al. | 525/131 |
| 4,766,177 | 8/1988 | Miller et al. | 525/131 |
| 4,786,682 | 11/1988 | Perez et al. | 525/28 |
| 4,818,791 | 4/1989 | Murakami et al. | 525/124 |
| 4,826,921 | 5/1989 | Andrews et al. | 525/102 |
| 5,017,649 | 5/1991 | Clemens | 525/59 |
| 5,051,529 | 9/1991 | Witzeman et al. | 560/178 |
| 5,132,367 | 7/1992 | Chan | 525/131 |

FOREIGN PATENT DOCUMENTS

| | | |
|---|---|---|
| 40807/85 | 10/1985 | Australia . |
| 384 029 | 9/1987 | Austria . |
| 0 160 824 | 11/1985 | European Pat. Off. . |
| 0 287 842 | 10/1988 | European Pat. Off. . |
| 0 326 723 | 8/1989 | European Pat. Off. . |
| 0 366 884 | 5/1990 | European Pat. Off. . |
| 0 555 774 | 8/1993 | European Pat. Off. . |
| 2 239 411 | 2/1973 | Germany . |
| 37 10431 A1 | 10/1988 | Germany . |
| 55-40711 | 3/1980 | Japan . |
| 56-5847 | 1/1981 | Japan . |
| 8502506-A | 10/1985 | South Africa . |
| 1 281 898 | 7/1972 | United Kingdom . |
| WO81/01292 | 5/1981 | WIPO . |
| WO88/07556 | 10/1988 | WIPO . |
| WO91/09910 | 7/1991 | WIPO . |

OTHER PUBLICATIONS

J. S. Witzeman et al, "Comparison of Methods For The Preparation of Acetoacetylated Coatings Resins", *Journal of Coatings Technology*, Presented Feb. 1989.
"Technical Tips", A Technical Brochure From Eastman Chemical.
"Utility of Acetoacetoxyethyl Methacrylate (AAEM) in Thermoset Coatings", A Technical Brochure From Eastman Chemical.
"Acetoacetoxyethyl Methacrylate (AAEM) and Acetoacethyl Chemistry", A Technical Brochure From Eastman Chemical.
"Eastman AAEM", A Japanese Language Technical Brochure From Eastman Chemical.
Chemical Abstracts, 112, Jan. 22, 1990, No. 22391m.
A. Noomen, "The Chemistry and Physics of Low Emission Coatings. Part 2. Waterborne Two-Pack Coatings", *Process in Organic Coatings*, (1989), 17, pp. 27–29.
Abstract, Z 88/0725, Aug. 4, 1988.
Chemical Abstracts 108:39740q (1988).
Chemical Abstracts 112:200705b (1990).
R. J. Clemens et al, "A Comparison of Catalysts For Crosslinking Acetoacetylated Resins Via The Michael Reaction", *Journal of Coatings Technology*, Presented Feb. 1988.
F. Del Rector et al, "Applications For Acetoacetyl Chemistry in Thermoset Coatings", *Journal of Coatings Technology*, Presented Feb. 1988.
Docket Number 2816-004-0 Serial No. 08/058,240 Filing or Issue Date May 10, 1993 Status or Patentee Abandoned.
Docket Number 2816-006-68 Serial No. 08/165,643 Filing or Issued Date Dec. 13, 1993 Status or Patentee Abandoned.
Docket Number 2816-007-68 CIP Serial No. 08/313,837 Filing or Issue Date Sep. 28, 1994 Status or Patentee Pending.
Database WPI, Derwent Publications, AN-93-032218, JP-4-359977. Dec. 14 1992.
Database WPI, Derwent Publications, AN-93-392912, JP-5-295302, Nov. 9, 1993.

*Primary Examiner*—Paul R. Michl
*Assistant Examiner*—LaVonda R. DeWitt
*Attorney, Agent, or Firm*—Oblon, Spivak, McClelland, Maier & Neustadt, P.C.

[57] ABSTRACT

Aqueous-borne coating compositions containing:

(A) an acetoacetylated polymer; and (B) a polyacrylate having at least two (meth)acrylate end groups, have long pot lives and may be cured by the evaporation of water in the presence of a basic catalyst. Acrylic copolymers having pendent urethane side groups which are terminated with (meth)acrylate groups are water-dispersible and may be cured with polyfunctional crosslinking agents or by free radical initiators to afford coatings having excellent properties. Incorporation of a crosslinking component containing epoxy groups improves the coating properties.

30 Claims, No Drawings

5,567,761

AQUEOUS TWO-PART ISOCYANATE-FREE CURABLE, POLYURETHANE RESIN SYSTEMS

This is a continuation-in-part application of U.S. patent application Ser. No. 08/058,240, filed May 10, 1993, now abandoned and U.S. patent application Ser. No. 08/165,643, filed Dec. 13, 1993 now abandoned.

BACKGROUND OF THE INVENTION

1. Field of the Invention

In a first embodiment, the present invention relates to two-component aqueous polymer systems which are crosslinkable at ambient temperatures through the Michael reaction, methods of making acetoacetylated latexes, water-dispersible acetoacetylated acrylic resins and water-dispersible urethane polyacrylate resins, and to compositions for use of the polymer systems in water-borne coatings.

In a second embodiment, the present invention also relates to water-dispersible acrylated urethane acrylic (WDAUA) film-forming binders comprised of an acrylic copolymer having pendant urethane side chains terminated with (meth)acrylate groups for crosslinking, a method for preparing such WDAUA binders, and to compositions for use of the WDAUA binders with polyacetoacetates, polyketimines or photoinitiators in ambient temperature-curable or UV-curable water-borne coatings.

In a third embodiment, the present invention also relates to water-borne polymer compositions crosslinkable at ambient temperatures through dual cure of the Michael reaction and the epoxy reaction.

2. Discussion of the Background

Acetoacetylated polymers have recently become of interest in thermosetting coatings systems because they are crosslinkable with many other reactants at ambient temperatures. The known reagents which react readily with acetoacetyl groups include amines, aldehydes, metal ions and acrylate esters. The base-catalyzed addition reaction between the active methylene group of the acetoacetyl functionality and an activated olefin unsaturated double bond such as in an acrylate ester is known as the Michael reaction.

U.S. Pat. No. 4,408,018 describes crosslinking butyl acrylate/acetoacetoxyethyl methacrylate (AAEM) copolymers with polyacrylates such as trimethylolpropane triacrylate (TMPTA) in the presence of a strong basic catalyst at ambient temperatures.

Two-package acrylic urethane compositions based on hydroxyl functional acrylic copolymers and crosslinking agents containing isocyanate (NCO) groups are known as ambient temperature-curable compositions that can be used for high quality coatings with outstanding performance properties. However, the use of isocyanate crosslinkers often requires precautions to be taken in handling and using these materials due to their high toxicity. Health and environmental concerns have led researchers to develop NCO-free urethane compositions that can be cured at ambient temperatures but without involving the reactions of free NCO groups. Because (meth)acrylate groups react readily with active methylene groups such as contained in acetoacetates and primary amino groups at ambient temperatures or with themselves through free radical polymerization initiated by UV radiation and certain free radical initiators, (meth)acrylate functionalized polyurethanes have found applications in ambient temperature-curable NCO-free compositions for production of crosslinked urethanes polymers.

Thus, U.S. Pat. No. 4,078,015 describes ultraviolet (UV)-curable compositions containing 50 to 90 wt. % of an acrylated polyurethane prepared by reacting an organic diisocyanate, a hydroxyalkyl acrylate and a polyol.

U.S. Pat. No. 4,246,391 describes a process for making acrylated urethanes of low viscosity. The process involves first reacting a monohydroxyl functional acrylate with a polyisocyanate followed by reacting the product mixture with a polyol.

European Patent 0,542,219 A2 discloses a process for preparing (meth)acrylated polyurethanes from certain liquid hydrocarbon diols, polyfunctional isocyanates and hydroxyalkyl (meth)acrylates. The (meth)acrylated polyurethanes are useful as decorative and functional coatings, inks, adhesives, sealants and formed parts. The compositions containing the (meth)acrylated polyurethane are cured by UV radiation.

U.S. Pat. No. 5,132,367 discloses a NCO-free two-component polyurethane system comprised of an acetoacetate functionalized acrylic copolymer and a urethane crosslinking agent containing acrylate groups. The two-component NCO-free urethane compositions can be cured at ambient temperatures through the Michael reaction using a strong base as catalyst and are useful as a substitute for conventional two-component urethane compositions that are cured through NCO reactions.

The (meth)acrylated urethanes described in the above patents are generally prepared by first capping a polyol with diisocyanates and then capping remaining free NCO groups with hydroxyalkyl (meth)acrylates. The polyols used are usually hydrocarbon polyols, ether polyols or ester polyols containing 2 or 3 hydroxyl groups. The (meth)acrylated urethanes thus-obtained have low acrylol functionality usually 2 or at most 4. High molecular weight (>2000) acrylated urethanes of low functionality (or high acrylate equivalent weight) are good film-forming binders but provide low crosslinking density. High crosslinking density is needed to give coating films with desirable performance properties. On the other hand, low molecular weight (<1000) acrylated urethanes of low functionality (or low acrylate equivalent weight) can provide desired high crosslinking density, but are generally poor film-forming binders. In such case, other high molecular weight polymers must be incorporated in the coating compositions to assist film-forming.

Accordingly, it is desirable to have high molecular weight (meth)acrylated urethanes of high functionality that can serve as film-forming binders and provide desired high crosslinking density. It is further desirable to make such high molecular weight, high functionality acrylated urethanes water-dispersible owing to growing environmental concern and strict governmental regulations. Advantages associated with water-borne systems include reduction of volatile organic compounds (VOC), reduced fire and health hazards, and ease of clean up.

U.S. Pat. No. 5,177,152 discloses a process for production of a water-dispersible acrylic copolymer having pendant carboxylic acid groups and acrylate functional groups. The process involves first forming an acrylic backbone copolymer with pendant epoxy groups by copolymerization with glycidyl methacrylate, then reacting the epoxy groups with acrylic acid to introduce acrylol functionality and finally reacting the hydroxyl groups (produced from the epoxy-carboxylic acid reaction and/or from the copolymerized hydroxyethyl methacrylate) with a dibasic acid anhydride to introduce carboxyl groups for water dispersibility. The same procedure of preparing water dispersible ethylenically unsaturated acrylic copolymers was also reported in *Progress in Organic Coatings*, vol. 17, 27–39 (1988), by A. Noomen.

The water-dispersible acrylated acrylic resins so obtained are high molecular weight polymers and can have high acrylate functionality. However, they are not urethane-type resins and will not give the advantages of crosslinked polyurethanes. Besides, these resins have relative dark color and low solid content (about 50 wt. %). The low solid or high organic solvent content limits the use of these resins, as obtained, for low VOC coatings. The water-dispersible acrylated acrylic resins described in U.S. Pat. No. 5,177,152 are used with polyamines or polyketimines as crosslinkers to prepare two-component ambient cured coatings. However, the two-component water-borne coatings using polyamines or polyketimines crosslinkers have a short pot-life (less than 2 hours).

Thus, there remains a need for water-dispersible acrylated urethanes of high molecular weight and high functionality which can overcome the above-mentioned shortcomings and provide the outstanding performance of urethane materials.

European Patent 0,326,723 B1 teaches the use of tertiary amines with epoxides as potential catalysts for the Michael reaction cure in solvent-borne systems. The tertiary amines used, typically, triethylene diamine (TEDA), are relatively weak bases and cannot be used alone as catalysts for the Michael reaction. It is believed that in the presence of an activated methylene component, the reaction between amine and epoxide forms, in situ, a stronger base of quaternary ammonium which then functions as the Michael reaction catalyst to activate the methylene component for reaction with the active alkene component. The tertiary amine-epoxide catalyst system improves the drawback of short pot-life for solvent-borne Michael reaction cure systems using strong base catalyst.

European Patent 0,326,723 B1, however, does not cover the use of epoxides in strong base-catalyzed Michael reaction cure systems to achieve synergistic effects of Michael reaction cure and epoxy cure on coatings peformance properties. The epoxides in this patent are mainly used as co-activators with tertiary amines to generate a strong base in-situ for the Michael reaction cure. No mention is made that the epoxides function as a third component and participate in forming a crosslinked network with the active methylene component and active alkene component to contribute to coatings performance properties. In fact, the use of low amounts of epoxides is encouraged for better coatings properties. Epoxides are generally used in equivalent molar amount with tertiary amines. High levels of epoxide requires high levels of the tertiary amine. The presence of excessive amine gives a shorter pot-life and is detrimental to acid resistance and weathering resistance. Use of excessive equivalents of epoxide to amine in these systems resulted in poorer coatings performance properties such as hardness and solvent resistance.

Although European Patent 0,326,723 B1 mentions use of some acetoacetylated copolymers with a small amount of carboxyl content (0.5% methacrylic acid), the use of polymers with higher carboxyl content as can be used in water-borne coating compositions is not disclosed.

The patents mentioned above deal only with solvent-borne systems. Solvent-borne coatings cured through the Michael reaction suffer from the drawback of having a short pot-life. In addition, the growing environmental concern and strict government regulations have made it desirable to develop corresponding water-borne systems. The advantages associated with water-borne systems are obvious: low volatile organic compounds (VOC), less fire and health hazards, and ease to clean up.

SUMMARY OF THE INVENTION

Accordingly, in a first embodiment, one object of the present invention is to provide novel aqueous polymer systems curable at ambient temperatures through the Michael reaction.

It is another object of the present invention to provide ambient-temperature-curable water-borne polymer compositions with a long pot-life (>24 hours).

It is still another object of the present invention to provide ambient-temperature-curable polymers that can be used to formulate high gloss water-borne coatings.

It is still another object of the present invention to provide high gloss latex coating formulations with low VOC content.

It is still another object of the present invention to provide one-package water-borne ambient-temperature-curable coatings which have a long pot-life.

It is still another object of the present invention to provide catalyst blend systems that have synergistic effect of giving cured coatings with improved properties.

These and other objects and features of the present invention, which will become apparent from the following detailed description, have been achieved by the inventor's discovery that aqueous polymer systems comprising:

(A) an acetoacetylated polymer in the form of an aqueous solution, dispersion, or emulsion; and (B) a polyacrylate having at least two (meth)acrylate end groups;

are stable at ambient temperatures even in the presence of a base catalyst, but are curable at ambient or elevated temperatures when the water is permitted to evaporate.

The inventor has also discovered that the organic solvents previously thought to be necessary in organic coating compositions cured via the Michael reaction may be replaced with low molecular weight reactive crosslinkers leading to a reduction in VOC. In such systems, good latex film formation occurs before significant crosslinking takes place after the evaporation of water.

The inventor has found that such water dispersions or emulsions containing components (A) and (B) become ambient-temperature-curable when a base catalyst of pKa= 12 to 14 is added. The crosslinking through the Michael reaction is blocked by water and occurs after water evaporation out of the applied coating films. Thus, the present systems exhibit a long pot-life greater than 24 hours.

Moreover, in a second embodiment, it is one object of the present invention to provide novel water-dispersible acrylated urethane acrylic (WDAUA) copolymers containing pendant (meth)acrylate groups that can be cured with polyfunctional crosslinking agents or by free radical initiators.

It is another object of the present invention to provide a method of making such WDAUA resins.

It is still another object of the present invention to provide WDAUA resins that can be used with polyacetoacetates as crosslinking agents to formulate low VOC, high gloss two-component water-borne coatings curable at ambient temperatures and cured coatings thereof possessing high gloss, high impact resistance, good solvent resistance, and good hardness and flexibility.

It is still another object of the present invention to provide ambient temperature-curable water-borne coating compositions which have a long pot-life.

It is still another object of the present invention to provide WDAUA resins that can be used for ambient temperature-curable water-borne coatings using polyamines or polyketimes as crosslinking agents.

It is still another object of the present invention to provide WDAUA resins that can be used for UV-curable water-borne coatings.

These and other objects, which will become apparent during the following detailed description, have been achieved by the inventor's discovery that acrylic copolymers having pendent urethane side groups which are terminated with (meth)acrylate groups may be cured with polyfunctional crosslinking agents or by free radical initiators to afford coatings having excellent properties.

Furthermore, in a third embodiment, one object of the present invention is to provide novel dual-cure polymer compositions containing active methylene, active alkene, and epoxy components and a Michael reaction base catalyst.

It is another object of the present invention to provide water-borne dual-cure coating compositions which give better properties than compositions without the epoxy component.

It is still another object of the present invention to provide the water-borne dual-cure coating compositions which give cured coatings with excellent solvent resistance, hardness, impact resistance and improved water resistance and weathering resistance.

These and other objects, which will become apparent during the following detailed description, have been achieved by the inventor's discovery that incorporating epoxide as a third component in the Michael reaction curing coating compositions remarkably improves the performance properties of the resulting coating.

DETAILED DESCRIPTION OF THE PREFERRED EMBODIMENTS

I. First Embodiment

A. Acetoacetylated Polymers

Acetoacetylated polymers are a required component of the present aqueous polymer systems. Useful polymers include acetoacetylated (AcAc) acrylic resins, AcAc acrylic latexes, AcAc polyester resin, AcAc epoxy resins and the like. Preferred AcAc polymers for the aqueous polymer systems of the present invention are water dispersible AcAc acrylic resins and AcAc acrylic latexes.

A1. Water-Dispersible Acetoacetylated (AcAc) Acrylic Resins

The water dispersible AcAc acrylic resins suitable for use in the present invention may be prepared by copolymerization of a mixture containing 10 to 60 wt. %, preferably 20 to 40 wt. %, of an acetoacetylated (meth)acrylate monomer (M1), 1 to 15 wt. %, preferably 2 to 8 wt. %, of a hydrophilic vinyl monomer (M2), and 25 to 89 wt. %, preferably 54 to 78 wt. %, of other copolymerizable vinyl monomers (M3), wherein all wt. % values are based on the total weight of the monomer mixture of M1, M2, and M3. Hereafter, (meth) acrylate means both acrylate and methacrylate.

The acetoacetylated (meth)acrylate monomer (M1) is a compound represented by the following formula:

$$CH_2=C(R1)-CO-O-R2-O-CO-CH_2-CO-CH_3 \quad (M1)$$

where R1 is a hydrogen atom or a methyl group and R2 is a $C_{1-6}$ saturated straight-chain or branched alkylene group. A typical example of monomer M1 is acetoacetoxyethyl methacrylate (AAEM). AAEM is commercially available, and the use of AAEM as M1 is preferred.

The hydrophilic vinyl monomer (M2) may be any which can impart the desired water solubility or water dispersibility. Thus, (M2) can be a carboxyl vinyl monomer having at least one carboxyl group and one polymerizable unsaturated double bond in the molecule. Examples of the carboxyl vinyl monomer include (meth)acrylic acid, crotonic acid, isocrotonic acid, maleic acid, fumaric acid, itaconic acid, citraconic acid, vinyl acetic acid, allyl acetic acid, and the like.

Monomer M2 can also be a vinyl monomer containing a sulfonate group. Examples of the sulfonate vinyl monomer include styrene sulfonic acid and salts thereof, vinyl sulfonic acid and salts thereof, sulfoethyl methacrylate, 2-acrylamido-2-methylpropane sulfonic acid and salts thereof, and the like. Suitable salts include those where the cation is sodium, potassium, ammonium, etc.

Monomer M2 can also be a vinyl monomer carrying a phosphorous or phosphoric group. Examples of the phosphorous or phosphoric vinyl monomer include (hydroxy)phosphinyl-$C_{1-4}$-alkyl (meth)acrylates, (dihydroxy)phosphinyl-$C_{1-4}$-alkyl (meth)acrylates, hydroxyethyl(meth)acrylate mono-diphosphate esters, hydroxyethyl(meth)acrylate diphosphate esters, and the like.

Monomer M2 can also be a vinyl monomer containing amino groups which provide cationic stabilization for dispersion when neutralized. Examples of the amino vinyl monomer include dimethylaminoethyl (meth)acrylates, diethylaminoethyl, (meth)acrylates, t-butylaminoethyl (meth)acrylates, 2-vinyl pyridine, 4-vinyl pyridine, and the like.

Monomer M2 can also be a nonionic vinyl monomer containing hydrophilic polyethylene oxide groups shown by the following molecular structure:

$$CH_2=C(R1)-CO-O(CH_2CH_2O)_n-H \quad (M2a)$$

where R1 is a hydrogen atom or a methyl group and n is an integer of 5 to 50, preferably 10 to 35.

The other copolymerizable vinyl monomer (M3) is a compound containing an unsaturated double bond which can be polymerized with monomers M1 and M2 to form copolymers. Examples of monomer M3 include esters of (meth)acrylic acid represented by the following formula:

$$CH_2=C(R1)-CO-O-R3 \quad (M3)$$

where R1 is already defined and R3 is a $C_{1-20}$ linear or branched saturated alkyl group, or a $C_{1-20}$ linear or branched alkyl group which is substituted with a functional group, such as glycidyl or hydroxyl, other than those functional groups mentioned for monomer M1 and M2. Examples of (meth)acrylate monomer M3 are methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, 2-hydroxyethyl (meth)acrylate, hydroxypropyl (meth)acrylate, glycidyl (meth)acrylate, and the like.

Monomer M3 also includes aromatic vinyl monomers such as styrene, vinyltoluene and alpha-methylstyrene, vinyl compounds such as vinyl acetate and vinyl chloride, nitrile vinyl monomers such as (meth)acrylonitrile, amide vinyl monomers such as (meth)acrylamides, N-methylol (meth)acrylamides, dimethylacrylamide and N-vinyl pyrrolidinone, and diene compounds such as butadiene and isoprene.

Preferred vinyl monomers for the water-dispersible AcAc acrylic resins of the present invention are AAEM for monomer M1, carboxyl vinyl monomers, especially (meth)acrylic acid, for monomer M2, and $C_{1-4}$-alkyl esters of (meth) acrylic acid and styrene of monomer M3.

Vinyl monomers M1, M2, and M3 can be copolymerized by conventional methods using conventional catalysts. Copolymerization for the water-dispersible AcAc acrylic resins is preferably carried out in solution using a free radical initiator.

Suitable organic solvents for the solution copolymerization include, but are not limited to, ethers such as diethylene glycol di(mono)methyl di(mono)ethers, dipropylene glycol di(mono)methyl di(mono)ethers and tetrahydrofuran; ketones such as acetone and methylethyl ketone; esters of saturated carboxylic acids such as ethyl acetate, butyl acetate and glycol ether acetates such as propylene glycol methyl monoether acetate (PMA); aromatic hydrocarbons such as benzene, toluene and xylene; alcohols such as ethanol and isopropanol; amides such as N,N-dimethylformamide and N-methyl pyrrolidinone; and sulfur containing compounds such as dimethyl sulfoxide. Those organic solvents which are inert and have good water solubility and good hydrolysis stability are preferably used for preparing the water-dispersible AcAc acrylic resins of the present invention. Examples of such preferred solvents are ethylene glycol diethers such as diethylene glycol dimethyl diether (DGM) and diethylene glycol diethyl diether (EDGM), propylene glycol diethers such as dipropylene dimethyl diether (DMM), acetone, methylethyl ketone (MEK), N-methylpyrrolidone (NMP), dimethyl sulfoxide (DMSO), propylene glycol methyl monoether acetate (PMA), diethylene glycol ethyl monoether acetate (DEA), and the like.

Suitable free radical initiators for the polymerization include organic peroxides such as BPO, t-butyl peroxylbenzoate, t-amyl peroxyacetate (Lupersol 555) and the like, and azo compounds such as AIBN. The amount of the free radical initiator used depends on the reaction temperature and the desirable resin molecular weights. Generally, 0.2 to 8 wt. %, preferably 1 to 6 wt. % based on the total weight of the monomer charge is used.

Chain transfer agents may be used in the polymerization to obtain desirable molecular weights. Suitable chain transfer agents include mercaptans such as dodecyl mercaptan, octyl mercaptan, hexyl mercaptan and ethanolmercaptan, and halogen containing compounds such as carbon tetrabromide and carbon tetrachloride.

The water dispersible acetoacetylated acrylic resin has a number average molecular weight of 1,000 to 16,000, preferably 2000 to 8000. When acrylic acid or methacrylic acid is used as monomer M2, an acid value based on the resin solid of 10 to 120, preferably 15 to 50, mgKOH/g is desirable.

The water-dispersible AcAc acrylic resins thus-obtained should be neutralized with base before they are dispersed in water. Examples of suitable bases for the neutralization are ammonia, triethylamine (TEA), dimethylethanolamine (DMEA), 2-amino-2-methyl-1-propanol (AMP), 1,8-diazabicyclo[5,4,0]undecene-7 (DBU), 1,5-diazabicyclo[4,3,0]nonene-5 (DBN), 1,1,3,3-tetramethylguanidine (TMGD), tetrabutylammonium hydroxide, potassium methoxide, NaOH, KOH, and the like.

A2. Acetoacetylated Acrylic Latexes

The acetoacetylated acrylic latexes are prepared by emulsion polymerization of vinyl monomers M1, M2, and M3 described above. Monomer M2 may not be a necessary reactant component for producing the AcAc acrylic latexes, since the polymer particles are generally stabilized by external emulsifiers or surfactants. However, Monomer M2 may be included to replace part or all of the external emulsifiers. Emulsion polymerization of 10 to 60 wt. %, preferably 20 to 40 wt. % of monomer M1, 0 to 8 wt. %, preferably 0 to 4 wt. % of monomer M2 and 32 to 90 wt. %, preferably 58 to 80 wt. % of monomer M3 is carried out in water medium in the presence of 0 to 10 wt. %, preferably 0.5 to 6 wt. % of an emulsifier and 0.1 to 5 wt. %, preferably 0.2 to 2 wt. % of a free radical initiator. All wt. % values are based on the total weight of the monomer mixture of M1, M2, and M3.

Suitable emulsifiers include ionic surfactants, nonionic surfactants, and mixtures thereof. Anionic surfactants include, but are not limited to, alkylphenolethoxylate sulfates, sulfonates, phosphates and succinates, alkyl sulfates, sulfonates, phosphates and succinates. Cationic surfactants may be compounds containing quaternary nitrogen. Nonionic surfactants include, but are not limited to, alkylaryl polyether alcohols, alkylphenolethoxylates, alkylethoxylates, ethylene oxide/propylene oxide block copolymers. Anionic surfactants, nonionic surfactants, and mixtures thereof are preferably used in the process of the present invention.

Suitable free radical initiators for preparing the AcAC acrylic latexes are water-soluble single initiators or water-soluble redox initiators conventionally used in emulsion polymerization. Examples of suitable initiators include, but are not limited to, hydrogen peroxide, t-butyl hydrogenperoxide (tBHPO), persulfate salts, combination of tBHPO and/or persulfates with reducing agents such as formaldehyde sulfoxylate salts and/or water-soluble iron salts.

Chain transfer agents such as those described above may also be used in emulsion polymerization to obtain emulsion polymers with desirable molecular weights. The number average molecular weight of the acetoacetylated acrylic latex is suitably 3,000 to 500,000, preferably 5,000 to 200,000.

B. NCO-Free Water Dispersible Urethane Polyacrylate Resins

The NCO-free urethane polyacrylate is a urethane polymer having at least two (meth)acrylate end groups. This polymer may be obtained using the methods disclosed in U.S. Pat. No. 5,132,367, which is incorporated herein by reference.

The water-dispersible urethane polyacrylate resins are prepared by a two-stage process wherein a water-dispersible NCO-terminated prepolymer is formed in the first stage by reacting an excess of a polyisocyanate (B1) with an hydrophilic NCO-reactive compound which can impart the desired water dispersibility (B2) and/or a NCO-reactive compound other than B2 (B3). The NCO-terminated prepolymer is then capped with (meth)acrylate functionality by reacting with a NCO-reactive (meth)acrylate (B4) in a second stage.

An alternative method of preparing the water-dispersible urethane polyacrylate resins involves forming a single NCO-terminated (meth)acrylate in the first stage by reacting an excess of a polyisocyanate (B1) with reactant B4 so that each obtained molecule has one NCO group and at least one (meth)acrylate end group. The single NCO-terminated (meth)acrylate is then used in the second stage to cap a water dispersible NCO-reactive group (e.g., hydroxyl) terminated prepolymer which may be formed by reacting an excess of reactant B2 and/or reactant B3 with reactant B1.

The NCO-reactive compounds are compounds containing at least a functional group (NCO-reactive group) that can react with isocyanate to form covalent bonds. Examples of the NCO-reactive group are hydroxyl and primary and secondary amino groups.

Suitable polyisocyanates (B1) to be used in preparing the single NCO-terminated or NCO-reactive group terminated urethane prepolymers in accordance with the present invention include organic diisocyanates represented by the following formula.

$$R(NCO)_2 \qquad (B1a)$$

and their isocyanurate trimers. R in formula B1a is an organic group having a molecular weight of from 50 to 1000, preferably from 70 to 400. R may be an aliphatic, cycloaliphatic $C_{4-18}$ alkylene group or a $C_{6-18}$ arylene group.

Examples of aliphatic polyisocyanates include 1,6-hexamethylene diisocyanate (HMDI) and the isocyanurate trimer thereof (HMDI-T), tetramethylene diisocyanate, dodecamethylene diisocyanate, and the like.

Examples of cycloaliphatic polyisocyanates include cyclohexane-1,3- and -1,4-diisocyanate (CHDI), isophorone diisocyanate (IPDI) and the isocyanurate trimer thereof (IPDI-T), bis (4-isocyanatocyclohexyl)-methane, 1,4-bis(isocyanatomethyl)cyclohexane, bis-(4-isocyanato-3-methylcyclohexyl)methane, and the like.

Examples of aromatic polyisocyanates include 2,6- and/or 2,4-diisocyanatotoluene (TDI), 4,4'-di-isocyanatodiphenyl methane and its isomer mixture with 2,4'- and/or 2,2'-diisocyanatodiphenyl ethane, 1,5-diisocyanato naphthalene, and the like.

Preferred polyisocyanates for the present invention are IPDI, IPDI-T, HMDI, HMDI-T, TDI, bis-(4-isocyanato-cyclohexyl) methane, and 4,4'- and 2,4'-diisocyanatodiphenyl methane.

The organic compounds containing at least two hydroxyl groups (B2 and B3) are reacted with the above organic polyisocyanates to form the single NCO-terminated or hydroxyl-terminated urethane prepolymers. Useful organic compounds containing at least two hydroxyl groups include polyols with a molecular weight from 62 to 6000, preferably 106 to 3000. B2 and B3 polyols include, but are not limited to, alkyl polyols, ester polyols, ether polyols, acrylic polyols, and thioether polyols.

Examples of suitable alkyl polyols are ethylene glycol, propylene glycol-(1,2) and (1,3), butylene glycol-(1,4) and (1,3), hexanediol-(1,6), octanediol-(1,8), neopentyl glycol, cyclohexanedimethanol, 2-methyl-1,3-propanediol, 2,2,4-tri-methyl-1,3-pentanediol, trimethylol propanetriol (TMP), glycerine, pentaerythritol, and the like.

Suitable ether polyols are obtained in known manner by the reaction of compounds such as dihydric alcohols described above or water with alkylene oxides such as ethylene oxide, propylene oxide, butylene oxide, tetrahydrofuran, and styrene oxide. Examples of the ether polyols are diethylene glycol, triethylene glycol, tetraethylene glycol, polyethylene glycols with molecular weight of from 200 to 2000, dipropylene glycol, polypropylene glycols with molecular weight of from 200 to 3000, dibutylene glycol polybutylene glycols with molecular weight of from 200 to 3000, and the like.

Suitable ester polyols include reaction products of alkyl diols or ether diols described above and dibasic carboxylic acids. Examples of dicarboxylic acid include succinic acid, phthalic acid, isophthalic acid, adipic acid, trimellitic acid, suberic acid, azelaic acid, maleic acid, fumaric acid, phthalic anhydride, glutaric anhydride, maleic anhydride, and the like. Polyesters of lactones such as ε-caprolactone or hydroxycarboxylic acid such as α-hydroxycaproicic acid may also be used.

Suitable acrylic polyols include reaction products of hydroxyl containing methacrylates (B4a) and/or other vinyl monomers from M1, M2 and M3 described above. The hydroxyl containing (meth)acrylate B4a is included in vinyl monomer M2 and M3 and also in reactant B4 of NCO-reactive (meth)acrylate which is used to cap the NCO-terminated urethane prepolymers in preparing the NCO-free urethane polyacrylates of the present invention.

The hydroxyl containing (meth)acrylate B4a includes those compounds represented by formula B4a:

$$CH_2=C(R1)-CO-O-R4-OH \qquad (B4a)$$

where R1 is a hydrogen atom or a methyl group, and R4 is a linking group. R4 may be a $C_{2-6}$ linear or branched saturated alkylene, an alkylene oxide segment similar to the one expressed in formula M2a (a polyethylene oxide or polypropylene oxide group with 5 to 50, preferably 10 to 35 repeating units of alkylene oxide), or an ester group containing $C_{8-12}$ alkylene. Examples of reactant B4a include 2-hydroxyethyl (meth)acrylate, 2-hydroxypropyl (meth) acrylate, 3-hydroxypropyl (meth)acrylate and their reaction products with lactones such as ε-caprolactone. Examples of other NCO-reactive (meth)acrylate (B4) may include t-butylaminoethyl (meth)acrylate.

In order to render the urethane polyacrylate polymers dispersible in water medium, either ionic or potential ionic groups, or lateral or terminated hydrophilic ethylene oxide segments are chemically incorporated into the urethane polyacrylates. The potential ionic groups or their corresponding ionic groups may be cationic such as quaternary nitrogen groups or, preferably, anionic such as sulfonate or carboxyl groups.

The compounds which can impart the desired water dispersibility (B2) include α,α-dimethylolalkaneoic acids which are the most useful compounds for the incorporation of potential anionic groups in the process of the present invention. Representative α,α-dimethylolalkanoic acids include α,α-dimethylolpropanoic acid (DMPA) and α,α-dimethylolbutyric acid. DMPA is preferred because of its ready commercial availability. DMPA is incorporated in an amount sufficient to provide a carboxyl group content of up to 120 milliequivalents, preferably 10 to 80 millequivalents per 100 g of the urethane polyacrylate resin solid.

Reactant B2 also includes polyethylene glycols with molecular weights of from 300 to 1500 useful to incorporate nonionic groups in the urethane polyacrylates to achieve water dispersibility. The content of polyethylene oxide segments may be up to 10 wt. %, preferably 1 to 8 wt. %, based on the weight of the urethane polyacrylates resin solid.

To protect the (meth)acrylate double bond from premature reaction during production of the water dispersible urethane polyacrylates, a free radical inhibitor such as monomethyl ether hydroquinoline (MEHQ) may be used in an amount of 100 to 1000 ppm, preferably 150 to 300 ppm. A dry air blanket should also be maintained during incorporation of reactant B4.

C. Water-Borne Coating Compositions

Any compound containing at least two acrylate functional groups can be used with the AcAc water-dispersible acrylic resins or latexes of the present invention to form water dispersions or emulsions which are crosslinkable at ambient temperatures through the base catalyzed Michael reaction. Besides the urethane polyacrylates described above, there are other types of polyacrylates such as ester type, epoxy type, urea type and amide type which can be synthesized by choosing appropriate functional (meth)acrylates and co-reactants. These other types of polyacrylates, either small molecular weight monomers or higher molecular weight oligomers or polymers, can be used together with the urethane polyacrylates of the present invention to obtain desirable acrylate double bond (C=C) equivalent weight (EW) and thus desired coating performance properties.

The most commonly used additional polyacrylates are ester polyacrylates which are usually the condensation reaction products of hydric polyols and/or ether polyols with (meth)acrylic acid. Typical examples of commercially available ester polyacrylates are trimethylolpropane triacrylate (TMPTA), 1,6-hexanediol diacrylate (HDODA), ethoxylated trimethylolpropane triacrylate (TMPEOTA), pentaerythritol tetraacrylate (PETA), polyethylene glycol (400) diacrylate (Sartomer 344), highly alkoxylated triacrylate (Sartomer 9035), and the like.

Three types of the aqueous coating compositions formed from component (A) and component (B) of polyacrylates are provided by the present invention according to the three different polymers of the present invention used to form basic water dispersions or emulsions for a composition. In the first type, the water dispersible AcAc acrylic resins form the basic water dispersion. Other binder ingredients of the coating composition are incorporated in the composition in lesser amounts. Thus, component B is incorporated as a crosslinker in an amount from 5 to 100 parts by weight, preferably 20 to 60 parts by weight, per 100 parts by weight of the solid weight of the AcAc acrylic resins used. The component (B) used can be water-soluble or dispersible, or water-indispersible or hydrophobic. In the case of a hydrophobic polyacrylate component (B), the amount of component (B) should be kept low enough to prevent phase separation of the composition. Phase separation can be prevented by using polyacrylates with high functionality or low (C=C) equivalent weights or water-dispersible AcAc acrylic resins with higher acid values.

Similarly in the second type of aqueous coating composition, the AcAc acrylic latexes form the basic aqueous emulsion. In this case, the polyacrylates of component (B) as crosslinkers are incorporated in an amount of from 5 to 60 parts by weight, preferably 15 to 40 parts by weight, per 100 parts by weight of the AcAc latex solid used.

In the third type of aqueous coating composition, the water-dispersible urethane polyacrylate resins are used to form the basic water dispersion. In this case, component (A) is a polyfunctional AcAc polymer and/or monomer such as trimethylolpropane triacetoacetate (TMPTAcAc) of the present invention are incorporated as crosslinkers in an amount of from 5 to 100 parts by weight, preferably 10 to 60 parts by weight, per 100 parts by weight of the solid weight of the water-dispersible urethane polyacrylate component (B) used.

The two-component aqueous coating compositions are formulated so that the ratio of acrylate double bond (C=C) equivalents to acetoacetyl (AcAc) equivalents ranges from 2.4 to 0.3, preferably from 2 to 1.

The two component aqueous coating compositions of the present invention become ambient-temperature crosslinkable when a suitable catalyst is added. The base catalysts used must have a pKa of from 12 to 14. Suitable catalysts which may be used include, but are not limited to, DBU, DBN, TMGD, 1,4-dihydropyridines, 2-allyl-N-alkyl imidazolines, tetra-t-butylammonium hydroxide, potassium methoxide, NaOH and KOH. Catalysts blend of the above described catalysts can also be used. An appropriate catalyst blend can sometimes have synergistic effects of giving certain better desirable coating properties than when single catalyst is used. The amount of the catalysts used depends on the acid value of the unneutralized composition and can range from 0 2 to 10 wt. %, preferably 0.4 to 5 wt. %, based on the total weight of the solids content of the composition.

The catalyzed aqueous coating compositions have a long pot-life usually greater than 24 hours, because crosslinking through the Michael addition reaction is blocked by water present in large amount. When coatings films are applied, water evaporates out of the films, and significant crosslinking starts to occur in a time, e.g., 2 hours, much less than the pot-life at room temperatures. Complete cure is achieved in about 7 days drying at room temperature. The fully cured coating films have very good solvent resistance indicating a high degree of crosslinking.

The catalyzed coating compositions must have a water content more than 10 wt. %, preferably more than 35 wt. %, based on the total weight of the composition, when water can form a continuous phase, to have the beneficial long pot-life. It will be demonstrated later by an exemplary embodiment that water present in less than 10% can have a reverse effect of shortening the pot-life of the catalyzed two component coating composition.

The present coating compositions may be applied to a surface by any conventional technique, such as by brush, by roller, or by sprayer. Further, the present coating compositions may contain further components such as pigments, including titanium dioxide, carbon black, and others disclosed in Kirk-Othmer, *Encyclopedia of Chemical Technology*, vol. 17, pp. 788–889, Wiley, New York (1982), which is incorporated herein by reference.

II. Second Embodiment

The NCO-free water-dispersible acrylated urethane acrylic (WDAUA) resins are comprised of an acrylic copolymer having pendant urethane side chains terminated with (meth)acrylate groups. The NCO-free (meth)acrylated urethane acrylic resins are synthesized by:

(1) forming a backbone acrylic copolymer with pendant carboxyl and hydroxyl groups by free radical solution polymerization of 0 to 20 wt. %, preferably 0 to 10 wt. %, of carboxyl containing monomers, preferably acrylic acid and methacrylic acid, 10 to 100 wt. %, preferably 15 to 50 wt. % of hydroxyalkyl (meth)acrylates, and 0 to 90 wt. %, preferably 40 to 80 wt. % of copolymerizable ethylenically unsaturated monomers, preferably esters of (meth)acrylic acids and styrene;

(2) preparing an acrylated urethane with a single NCO terminus by capping a polyisocyanate with a monohydroxyl functional (meth)acrylate using an appropriate hydroxyl (OH) to isocyanate (NCO) ratio;

(3) grafting the (meth)acrylated urethane from (2) to the backbone acrylic copolymer from (1) through a NCO/OH addition reaction.

The WDAUA copolymers formed typically have the following formula (1):

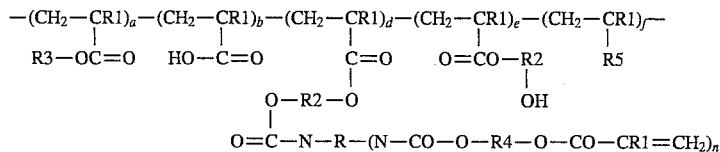

where
- R is the residue of the polyisocyanate used;
- R1 is H or $CH_3$;
- R2 is $C_{2-6}$ alkylene group;
- R3 is $C_{1-20}$ linear or branched or cyclic alkyl group, or a $C_{1-20}$ linear or branched or cyclic saturated alkyl group which is substituted with a glycidyl group;
- R4 is —[$(CH_2)_i$—$CO_2$]$_j$—R2—, where i=2 to 11 and j=0 to 3;
- R5 is phenyl; phenyl substituted with one or more substituents selected from the group consisting of chloro, bromo, fluoro, nitro, $C_{1-4}$-alkyl, cyano, amino, sulfonate, and phosphonate; a halogen; a nitrile; a R3COO—; a —CON(R1)R3; or the residue of another copolymerizable vinyl monomer;
- a is 0 to 100;
- b is 0 to 60;
- d is 2 to 80;
- e is 0 to 30;
- f is 0 to 50;
- n is 1 or 2.

The inventor has discovered that the key to success in synthesis of the acrylated urethane acrylic resins is to use an appropriate OH/NCO ratio during step 2 of preparing the acrylated urethane with a single NCO terminus. The OH/NCO equivalent ratio in step 2 should be greater than 0.64 when using a diisocyanate and greater than 0.80 when using a triisocyanate. Gelled products will result when the OH/NCO in step 2 is less than the specified values. However, if the OH/NCO ratio in step 2 is too high, the grafting efficiency will be low. Thus, the preferred OH/NCO ratio in step 2 is about 0.74 for diisocyanates and about 0.83 for triisocyanates.

The inventor has also discovered that the addition of a small amount of a low molecular weight alcohol such as methanol or ethanol immediately after 95% of the NCO groups for grafting have reacted during step 3 effectively prevents undesirable crosslinking and is important to obtain viscosity stable products, especially when a lower OH/NCO ratio is used in step 2.

Acrylated urethane acrylic resins without (or without enough) copolymerized hydrophilic monomers, or with an acid number lower than 10 mg KOH/g are usually not water-dispersible but can be used for high solid solvent-borne compositions. Water-dispersible acrylated urethane acrylic (WDAUA) resins may have an acid number from 10 to 100 mg KOH/g, preferably 15 to 50 mg KOH/g, a (meth)acrylate equivalent weight of from 200 to 4000, preferably 250 to 1500, and a weight average molecular weight of from 4,000 to 50,000, preferably 8,000 to 30,000.

Suitable carboxyl containing monomers for the backbone acrylic copolymer include carboxyl vinyl monomers having at least one carboxyl group and one vinyl polymerizable unsaturated double bond in the molecule. Examples of the carboxyl vinyl monomers include (meth)acrylic acids, crotonic acid, isocrotonic acid, maleic acid, fumaric acid, itaconic acid, citraconic acid, vinyl acetic acid, allyl acetic acid, and the like. Preferred carboxyl vinyl monomers are acrylic acid and methacrylic acid.

Other hydrophilic vinyl monomers which can impart the desired water solubility or water dispersibility may be used to substitute part or all of the required amount of the carboxyl vinyl monomer. Suitable other hydrophilic vinyl monomers include vinyl monomers containing a sulfonate, a phosphorous, a phosporic, an amino, or a polyethylene oxide group. Examples of such monomers are styrene sulfonic acid, vinyl sulfonic acid, sulfoethyl methacrylate, 2-acrylamide-2-methylpropane sulfonic acids and their salts, (hydroxy)phosphinyl-$C_{1-4}$-alkyl (meth)acrylates, hydroxyethyl(meth)acrylate diphosphate esters, dimethylaminoethyl (meth)acrylates, diethylaminoethyl (meth)acrylates, 2-vinylpyridine, 4-vinylpyridine, and the monomer with the following molecular structure:

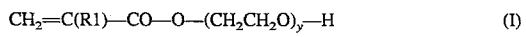

$$CH_2=C(R1)-CO-O-(CH_2CH_2O)_y-H \qquad (I)$$

where R1 is a hydrogen or a methyl group and y is an integer of 5 to 50, preferably 10 to 40.

Suitable hydroxyl containing monomers for the backbone acrylic copolymer as well as for capping the urethane side chains include hydroxyalkyl (meth)acrylates represented by the following formula:

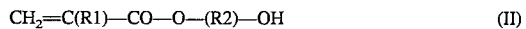

$$CH_2=C(R1)-CO-O-(R2)-OH \qquad (II)$$

where R1 is a hydrogen atom or a methyl group, and R2 is a $C_{2-6}$ linear or branched saturated alkylene group. Examples of hydroxyalkyl (meth)acrylates include 2-hydroxyethyl (meth)acrylates, 2-hydroxylpropyl (meth)acrylates, 3-hydroxypropyl (meth)acrylates and their reaction products with lactones such as ε-caprolactone. Compounds represented by Formula I may also be used as the hydroxy containing monomer. Other suitable hydroxyl containing monomers also include allyl alcohol. Polyvinyl alcohol copolymers obtained by free radical polymerization of vinyl esters such as vinyl acetate with other copolymerizable acrylic monomers and subsequent hydrolysis of the obtained copolymers to introduce hydroxyl groups may also be used directly as the backbone acrylic copolymers for urethane grafting.

The copolymerizable ethylenically unsaturated monomers include esters of (meth)acrylic acids represented by the following formula:

$$CH_2=C(R1)CO-O-R3 \qquad (III)$$

where R1 is already defined and R3 is a $C_{1-20}$ linear or branched or cyclic saturated alkyl group, a $C_{1-20}$ linear or branched or cyclic saturated alkyl group which is substituted with a functional group, such as glycidyl, other than carboxyl or hydroxyl functional group. Examples of (meth)acrylate monomer III are methyl (meth)acrylates, ethyl (meth)acrylates, propyl (meth)acrylates, butyl (meth)acrylates, 2-ethylhexyl (meth)acrylates, cyclohexyl (meth)acrylates, lauryl (meth)acrylates, 2-hyroxyethyl (meth)acrylates, glycidyl (meth)acrylates, and the like.

The copolymerizable monomer may also include aromatic vinyl monomers such as styrene, vinyltoluene and alpha-methylstyrene, vinyl compounds such as vinyl acetate and vinyl chloride, nitrile vinyl monomers such as (meth- )acrylonitriles, amide vinyl monomers such as (meth)acrylamides, N-methylol (meth)acrylamides, dimethylacrylamide and N-vinyl pyrrolidinone, and diene compounds such as butadiene and isoprene.

Copolymerization for the backbone hydroxyl containing acrylic copolymer is preferably carried out in solution using a free radical initiator. Solvents with a hydroxyl group or other functional group which can react with isocyanate are not suitable. Suitable isocyanate-inert solvents include, but are not limited to, ethers such as diethylene glycol dimethyl diether, dipropylene glycol dimethyl diether and tetrahyrofuran; ketones such as acetone and methylethyl ketone; esters of saturated carboxylic acids such as ethyl acetate, butyl acetate and glycol ether acetates such as propylene glycol methyl monoether acetate (PMA); aromatic hydrocarbons such as benzene, toluene and xylene; alcohols such as ethanol and isopropanol; amides such as N,N-dimethylformamide and N-methyl pyrrolidinone; sulfur containing compounds such as dimethyl sulfoxide. Those organic solvents which are inert and have good water solubility and good hydrolysis stability are preferably used for preparing the acrylated urethane acrylic resins of the present invention. Examples of such preferred solvents are ethylene glycol diethers such as DGM and EDGM, propylene glycol diethers such as DMM, acetone, MEK, NMP, DMSO, PMA, DEA, and the like.

Suitable free radical initiators for the polymerization include organic peroxides such as BPO, t-butyl peroxylbenzoate, t-amyl peroxyaceate (Lupersol 555) and the like, and azo compounds such as AIBN. The amount of the free radical initiator used depends on the reaction temperature and the desirable resin molecular weights. Generally, 0.2 to 8 wt. %, preferably 1 to 6 wt. % based on the total monomer charge is used.

The reaction temperature for the polymerization of the backbone hydroxyl-containing acrylic copolymer depends largely on the initiator used and can be 50° to 190° C., preferably 60° to 170° C. The reaction time, depending on the reaction temperature and other reaction conditions such as the capability of the reactor used to remove the polymerization heat, can last from 3 to 20 hours, preferably 6 to 10 hours by choosing appropriate reaction conditions. When L-555M60 initiator is used as in Example 1, the reaction temperature can be 110° to 180° C., preferably 130° to 160° C. and the reaction time can be 4 to 16 hours, preferably 6 to 10 hours.

Chain transfer agents may be used in the polymerization to obtain desirable molecular weights. Suitable chain transfer agents include mercaptans such as dodecyl mercaptan, octyl mercaptan, hexyl mercaptan and ethanolmercaptan, and halogen-containing compounds such as carbon tetrabromide and carbon tetrachloride.

The backbone hydroxyl containing acrylic copolymer obtained has a weight average molecular weight from 2,000 to 20,000, preferably 3,000 to 10,000, a hydroxyl number from 40 to 450, preferably 60 to 230 mg KOH/g solid, and an acid value from 0 to 160, preferably 0 to 70 mg KOH/g solid.

Suitable polyisocyanates to be used in preparing the (meth)acrylated urethane prepolymers with a single NCO terminus in accordance with the present invention include organic diisocyanates represented by the following formula.

$$R'(NCO)_2 \qquad (IV)$$

and their isocyanurate trimers. R in formula (1) is an organic group having a molecular weight of from 50 to 1000, preferably from 70 to 400. R' in formula (IV) may be an aliphatic, cycloaliphatic or aromatic $C_{4-18}$ hydrocarbon group. Thus, R in formula (1) may also be an aliphatic, cycloaliphatic or aromatic $C_{4-18}$ hydrocarbon group, or R may be a trivalent residue which is derived from the isocyanaurate trimer of $R'(NCO)_2$.

Examples of aliphatic polyisocyanates include 1,6-hexamethylene diisocyanate (HDI) and the isocyanurate trimer thereof (HDI-T), tetramethylene diisocyanate, dodecamethylene diisocyanate and the like.

Examples of cycloaliphatic polyisocyanates include CHDI 1,3 and 1,4, IPDI and the isocyanurate trimer thereof (IPDI-T), bis(4-isocyanatocyclohexyl)-methane, 1,4-bis(isocyanatomethyl)cyclohexane, bis-(4-isocyanato-3-methylcyclohexyl)methane, and the like.

Examples of the aromatic polyisocyanates include TDI (2,6 and/or 2,4), 4,4'-di-isocyanato-diphenyl methane and its isomer mixture with 2,4'- and/or 2,2'-diisocyanato-diphenyl ethane, 1,5-diisocyanato-naphthalene, and the like.

Preferred polyisocyanates for the present invention are IPDI, IPDI-T, HDI, HDI-T, TDI, bis-(4-isocyanato-cyclohexyl) methane, and 4,4'- and 2,4'-diisocyanatodiphenyl methane.

The above organic polyisocyanate is first capped with a monohydroxyl functional (meth)acrylate in a reaction using an OH/NCO equivalents ratio of 0.64 to 0.95, preferably 0.74 to 0.80 when a diisocyanate is used, and 0.80 to 0.95, preferably 0.83 to 0.86 when a triisocyanate is used. Suitable monohydroxyl functional (meth)acrylates include compounds represented by Formulae I and II mentioned above. Preferred hydroxyl functional (meth)acrylates are hydroxyethyl (meth)acrylates, 2-hydroxy-propyl (meth)acrylates and their reaction products with lactones such as ε-caprolactone.

The capping of the organic polyisocyanate with the monohydroxyl (meth)acrylate may be carried out neat or in any of the inert solvents described above. The capping reaction is suitably carried out at a temperature of from 20° to 120° C., preferably 40° to 90° C. The reaction time, depending on the reactants, reaction temperature and other reaction conditions, can range from 1 to 24 hours. Reaction times of 2 to 6 hours are preferred and are achieved by choosing appropriate reaction conditions.

The backbone acrylic polyol is added for grafting at the end of the (meth)acrylate capping stage. The (meth)acrylated urethane is grafted to the backbone acrylic polyol through the reaction of remaining NCO groups and the OH groups. The grafting is carried out until 95% of the remaining NCO groups for grafting have been reacted or until the NCO content reaches 0.1 wt. %. A small amount (about 0.2 to 1.5 wt. %, preferably 0.5 to 1.0 wt. % of the total reaction product) of a low molecular weight alcohol such as methanol or ethanol is added to terminate the grafting and effectively prevent gelling or too great a viscosity increase.

The grafting of the backbone acrylic polyol with the polyisocyanate which has been capped with the monohydroxyl (meth)acrylate may be carried out using any of the inert solvents described above. In fact, it is possible to carry out the grafting step by using the reaction mixtures of the polymerization of the backbone acrylic polyol and the capping of the polyisocyanate directly, without prior isolation and purification of the backbone acrylic polyol or capped polyisocyanate prior to grafting. Suitably, the grafting is carried out for a time of 2 to 24 hours, preferably 3 to 8 hours, at a temperature of 20° to 120° C. preferably 40° to 90° C.

If desired, catalysts for the hydroxyl/isocyanate reactions to form urethane linkages may be used. Known urethane catalysts include, but are not limited to, dibutyltin dilaurate, dibutyltin diacetate, dibutyltin oxide, stannous octanoate, stannous laurate, isooctyltin diacetate, lead octanoate, zinc octanoate, morpholine, N-methyl-morpholine, triethylamine, triethanolamine, piperazine and the like.

To protect the (meth)acrylate double bond from premature reaction during the (meth)acrylate capping and the urethane grafting, a free radical inhibitor such as monomethyl ether hydroquinoline (MEHQ) may be used in an amount of 100 to 1000 ppm, preferably 150 to 300 ppm. A dry air blanket should also be maintained during the reaction.

The acrylated urethane acrylic resins (AUA) so obtained are NCO free and may have a weight average molecular weight of from 4,000 to 50,000, preferably 8,000 to 30,000, and a (meth)acrylate equivalent weight of from 200 to 4000, preferably 250 to 1500. A water-dispersible acrylated urethane acrylic resin (WDAUA) may have in addition an acid value of from 10 to 100, preferably 15 to 50, mg KOH/g solid.

The water-dispersible acrylated urethane acrylic resins should be neutralized with a base before they are dispersed in water. Examples of suitable bases for the neutralization are ammonia, morpholine, N-methyl morpholine, triethylamine (TEA), dimethylethanolamine (DMEA), 2-amino-2-methyl-1-propanol (AMP), DBU, DBN, TMGD, tetrabutylammonium hydroxide, potassium methoxide, NaOH, KOH, and the like.

Typically, the water-dispersible acrylated urethane acrylic resins will be dispersed in water at a concentration of 20 to 50 wt., preferably 25 to 40 wt. %, based on the total weight of the aqueous dispersion.

Any compound containing more than two functional moieties which can react with a (meth)acrylate group may be used as a curing agent for the acrylated urethane acrylic resins of the present invention to form curable coating compositions. Thus, the WDAUA resins can be cured at ambient temperature with compounds containing active methylene groups using a strong base as catalyst. The base catalyzed addition reaction between an active methylene hydrogen and an activated olefin unsaturated double bond such as contained in an acrylol group is known as the Michael reaction.

Suitable active methylene moieties are esters or amides of acetoacetic acid, malonic acid or cyanoacetic acid. Acetoacetic esters or amides can be prepared through the reaction of alcohol or amine groups with diketene or the diketene acetone adduct (2,2,6-trimethyl-4-H-1,3-dioxin-4-one). Polyaceto-acetates can also be obtained by transesterification of a polyol with a monoacetoacetate such as t-butylacetoacetate, ethylacetoacetate or methylacetoacetate.

Examples of low molecular weight polyacetoacetates include trimethylolpropane tris(acetoacetate) (TMPAcAc), trimethylolpropane diacetoacetate (TMPDAcAc), neopentylglycol diacetoacetate, 2,2,4-trimethylpentan-1,3-diol diacetoacetate, 1,6-hexanediol diacetoacetate, ethyleneglycol diacetoacetate, and butyl ethyl propanediol diacetoacetate. Examples of high molecular weight polyacetoacetates are acetoacetylated acrylic copolymers and acetoacetylated polyester resins. Acetoacetylated acrylic copolymers can be prepared by free radical copolymerization of acetoacetoxyethyl methacrylate (AAEM), a commercially available material, with other copolymerizable ethylenic unsaturated monomers. Acetoacetylated polyester resins can be obtained from a polyester polyol by transesterification with t-butylacetoacetate, ethylacetoacetate or methylacetoacetate, or by an addition reaction with diketene. AAEM copolymers containing pendant acetoacetate groups are favored for ease of copolymerization, especially when high levels of active methylene moiety are desired. The amount of acetoacetate functionality can be designed to give adequate crosslinking.

Acetoacetylated emulsion polymers or latices prepared by emulsion copolymerization of AAEM with other copolymerizable monomers are particularly useful for formulating water-borne Michael reaction-curable coating compositions with the WDAUA resins of the present invention. Such acetoacetylated emulsion polymers or latices are referred to as water-dispersible acetoacetylated (AcAc) acrylic resins and acetoacetylated acrylic latices, and these curing agents are described in detail below.

The water-dispersible AcAc acrylic resins suitable for use in the present invention may be prepared by copolymerization of a mixture containing 10 to 60 wt. %, preferably 20 to 40 wt. %, of an acetoacetylated (meth)acrylate monomer (M1), 1 to 15 wt. %, preferably 2 to 8 wt. %, of a hydrophilic vinyl monomer (M2), and 25 to 89 wt. %, preferably 54 to 78 wt. %, of other copolymerizable vinyl monomers (M3), wherein all wt. % values are based on the total weight of the monomer mixture of M1, M2, and M3, and (meth)acrylate means both acrylate and methacrylate.

The acetoacetylated (meth)acrylate monomer (M1) is a compound represented by the following formula:

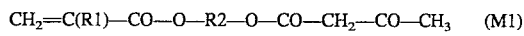

$$CH_2=C(R1)-CO-O-R2-O-CO-CH_2-CO-CH_3 \quad (M1)$$

where R1 is a hydrogen atom or a methyl group and R2 is a $C_{1-6}$ saturated straight-chain or branched alkylene group. A typical example of monomer M1 is AAEM. AAEM is commercially available, and the use of AAEM as M1 is preferred.

The hydrophilic vinyl monomer (M2) may be any which can impart the desired water solubility or water dispersibility. Thus, (M2) can be a carboxyl vinyl monomer having at least one carboxyl group and one polymerizable unsaturated double bond in the molecule. Examples of the carboxyl vinyl monomer include (meth)acrylic acid, crotonic acid, isocrotonic acid, maleic acid, fumaric acid, itaconic acid, citraconic acid, vinyl acetic acid, allyl acetic acid, and the like.

Monomer M2 can also be a vinyl monomer containing a sulfonate group. Examples of the sulfonate vinyl monomer include styrene sulfonic acid and salts thereof, vinyl sulfonic acid and salts thereof, sulfoethyl methacrylate, 2-acrylamido-2-methylpropane sulfonic acid and salts thereof, and the like. Suitable salts include those where the cation is sodium, potassium, ammonium, etc.

Monomer M2 can also be a vinyl monomer carrying a phosphorous or phosphoric group. Examples of the phosphorous or phosphoric vinyl monomer include (hydroxy)phosphinyl-$C_{1-4}$-alkyl (meth)acrylates, (dihydroxy)phosphinyl-$C_{1-4}$-alkyl (meth)acrylates, hydroxyethyl(meth)acrylate mono-diphosphate esters, hydroxyethyl(meth)acrylate diphosphate esters, and the like.

Monomer M2 can also be a vinyl monomer containing amino groups which provide cationic stabilization for dispersion when neutralized. Examples of the amino vinyl monomer include dimethylaminoethyl (meth)acrylates, diethylaminoethyl (meth)acrylates, t-butylaminoethyl (meth)acrylates, 2-vinyl pyridine, 4-vinyl pyridine, and the like.

Monomer M2 can also be a nonionic vinyl monomer containing hydrophilic polyethylene oxide groups shown by the following molecular structure:

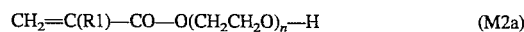

$$CH_2=C(R1)-CO-O(CH_2CH_2O)_n-H \quad (M2a)$$

where R1 is a hydrogen atom or a methyl group and n is an integer of 5 to 50, preferably 10 to 35.

The other copolymerizable vinyl monomer (M3) is a compound containing an unsaturated double bond which can be polymerized with monomers M1 and M2 to form copolymers. Examples of monomer M3 include esters of (meth)acrylic acid represented by the following formula:

$$CH_2=C(R1)-CO-O-R3 \quad (M3)$$

where R1 is already defined and R3 is a $C_{1-20}$ linear or branched saturated alkyl group, or a $C_{1-20}$ linear or branched alkyl group which is substituted with a functional group, such as glycidyl or hydroxyl, other than those functional groups mentioned for monomer M1 and M2. Examples of (meth)acrylate monomer M3 are methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, 2-hydroxyethyl (meth)acrylate, hydroxypropyl (meth)acrylate, glycidyl (meth)acrylate, and the like.

Monomer M3 also includes aromatic vinyl monomers such as styrene, vinyltoluene and alpha-methylstyrene, vinyl compounds such as vinyl acetate and vinyl chloride, nitrile vinyl monomers such as (meth)acrylonitrile, amide vinyl monomers such as (meth)acrylamides, N-methylol (meth) acrylamides, dimethylacrylamide and N-vinyl pyrrolidinone, and diene compounds such as butadiene and isoprene.

Preferred vinyl monomers for the water-dispersible AcAc acrylic resins of the present invention are AAEM for monomer M1, carboxyl vinyl monomers, especially (meth)acrylic acid, for monomer M2, and $C_{1-4}$-alkyl esters of (meth) acrylic acid and styrene for monomer M3.

Vinyl monomers M1, M2, and M3 can be copolymerized by conventional methods using conventional catalysts. Copolymerization for the water-dispersible AcAc acrylic resins is preferably carried out in solution using a free radical initiator.

Suitable organic solvents for the solution copolymerization include, but are not limited to, ethers such as diethylene glycol di(mono)methyl di(mono)ethers, dipropylene glycol di(mono)methyl di(mono)ethers and tetrahydrofuran; ketones such as acetone and methylethyl ketone; esters of saturated carboxylic acids such as ethyl acetate, butyl acetate and glycol ether acetates such as propylene glycol methyl monoether acetate (PMA); aromatic hydrocarbons such as benzene, toluene and xylene; alcohols such as ethanol and isopropanol; amides such as N,N-dimethylformamide and N-methyl pyrrolidinone; and sulfur containing compounds such as dimethyl sulfoxide. Those organic solvents which are inert and have good water solubility and good hydrolysis stability are preferably used for preparing the water-dispersible AcAc acrylic resins of the present invention. Examples of such preferred solvents are ethylene glycol diethers such as DGM and EDGM, propylene glycol diethers such as DMM, acetone, MEK, NMP, DMSO, PMA, DEA, and the like.

Suitable free radical initiators for the polymerization include organic peroxides such as BPO, t-butyl peroxylbenzoate, t-amyl peroxyacetate (Lupersol 555) and the like, and azo compounds such as AIBN. The amount of the free radical initiator used depends on the reaction temperature and the desirable resin molecular weights. Generally, 0.2 to 8 wt. %, preferably 1 to 6 wt. % based on the total weight of the monomer charge is used.

Chain transfer agents may be used in the polymerization to obtain desirable molecular weights. Suitable chain transfer agents include mercaptans such as dodecyl mercaptan, octyl mercaptan, hexyl mercaptan and ethanol mercaptan, and halogen containing compounds such as carbon tetrabromide and carbon tetrachloride.

The water-dispersible acetoacetylated acrylic resin has a number average molecular weight of 1,000 to 16,000, preferably 2000 to 8000. When acrylic acid or methacrylic acid is used as monomer M2, an acid value based on the resin solid of 10 to 120, preferably 15 to 50, mgKOH/g is desirable.

The water-dispersible AcAc acrylic resins thus-obtained should be neutralized with base before they are dispersed in water. Examples of suitable bases for the neutralization are ammonia, TEA, DMEA, AMP, DBU, DBN, TMGD, tetrabutylammonium hydroxide, potassium methoxide, NaOH, KOH, and the like.

The acetoacetylated acrylic latices are prepared by emulsion polymerization of vinyl monomers M1, M2, and M3 described above. Monomer M2 may not be a necessary reactant component for producing the AcAc acrylic latices, since the polymer particles are generally stabilized by external emulsifiers or surfactants. However, Monomer M2 may be included to replace part or all of the external emulsifiers. Emulsion polymerization of 10 to 60 wt. %, preferably 20 to 40 wt. %, of monomer M1; 0 to 8 wt. %, preferably 0 to 4 wt. %, of monomer M2; and 32 to 90 wt. %, preferably 58 to 80 wt. %, of monomer M3 is carried out in water medium in the presence of 0 to 10 wt. %, preferably 0.5 to 6 wt. %, of an emulsifier and 0.1 to 5 wt. %, preferably 0.2 to 2 wt. %, of a free radical initiator. All wt. % values are based on the total weight of the monomer mixture of M1, M2, and M3.

Suitable emulsifiers include ionic surfactants, nonionic surfactants, and mixtures thereof. Anionic surfactants include, but are not limited to, alkylphenolethoxylate sulfates, sulfonates, phosphates and succinates, alkyl sulfates, sulfonates, phosphates and succinates. Cationic surfactants may be compounds containing quaternary nitrogen. Nonionic surfactants include, but are not limited to, alkylaryl polyether alcohols, alkylphenolethoxylates, alkylethoxylates, ethylene oxide/propylene oxide block copolymers. Anionic surfactants, nonionic surfactants, and mixtures thereof are preferably used in the process of the present invention.

Suitable free radical initiators for preparing the AcAC acrylic latices are water-soluble single initiators or water-soluble redox initiators conventionally used in emulsion polymerization. Examples of suitable initiators include, but are not limited to, hydrogen peroxide, tBHPO, persulfate salts, combination of tBHPO and/or persulfates with reducing agents such as formaldehyde sulfoxylate salts and/or water-soluble iron salts.

Chain transfer agents such as those described above may also be used in the emulsion polymerization to obtain emulsion polymers with desirable molecular weights. The number average molecular weight of the acetoacetylated acrylic latice is suitably 3,000 to 500,000, preferably 5,000 to 200,000.

Examples of low molecular weight polymalonates useful as curing agents include trimethylolpropane tri(ethyl malonate) which can be prepared by transesterification of trimethylolpropane with diethyl malonate. High molecular weight polymalonates include malonated polyesters obtained by condensation polymerization of malonic acids with glycols and other dibasic acids.

Malonic ester or amide moieties can be preferred for low color with certain activated alkenes. Cyanoacetic esters or amides are featured with high reactivity and are preferably used with alkene compounds that have poor reactivity with acetoacetate or malonate moieties. Polyacetoacetates such as TMPTAcAc and AAEM acrylic copolymers are preferred in the present invention because they are easy to prepare and economically attractive.

Suitable Michael reaction catalysts are strong bases with a pKa of from 12 to 14. Suitable bases which may be used include, but are not limited to, DBU, DBN, TMGD, 1,4-dihydropyridines, methyl diphenylphosphane, methyl di-p-tolylphosphane, 2-allyl-N-alkyl imidazolines, tetra-t-butylammonium hydroxide, potassium methoxide, NaOH, and KOH. Catalyst blends of the above-described catalysts can also be used. Catalyst blends can sometimes afford synergistic effects giving certain better desirable coatings properties than when single catalyst is used. The amount of the catalyst used depends on the acid value of the unneutralized composition and can range from 0.2 to 10 wt. %, preferably 0.4 to 6 wt. %, based on the total weight of the coating composition.

The catalyzed aqueous coating compositions have a long pot-life, usually greater than 24 hours, because crosslinking through the Michael addition reaction is blocked by water which is present in a large amount. When coatings films are applied, water evaporates out of the films and significant crosslinking starts to occur in a time, e.g., 2 hours, much less than the pot-life at room temperatures. Complete cure is achieved after about 7 days drying at room temperatures. The fully cured coatings films have very good solvent resistance indicating a high degree of crosslinking.

The present coating compositions may further contain components such as pigments, including titanium dioxide, carbon blacks, Graph blue 6830-0, Per-orange-RL-70, NOVO-red-F3RK70 and Violet-228-5199.

The acrylated urethane acrylic resins of the present invention can also be cured with polyfunctional crosslinking agents having at least one primary amino or at least two secondary amino groups. Preferred amino curing agents are polyketimines or polyaldimines in which the primary amino groups have been previously blocked with ketones or aldehydes. Unblocked primary amines react with acrylol groups so rapidly at room temperatures that the mixture would gel before application onto the substrate. In the presence of water, ketimines or aldimines are deblocked to release primary amino groups which then react with acrylol groups. Polyketimines or polyaldimines can provide a favorable combination of storage stability, curing speed and film properties. Examples of suitable polyketimines include MEK or methyl isobutyl ketone (MIBK) ketimines of ethylene diamine, hexamethylene diamine, diethylene triamine, trimethylolpropane tri(polyoxypropylene amine), and the like. Polyketimines from diethylene triamine with a urea or an epoxy backbone as described in European Patent Application No. 262 720 may also be used. Aromatic aldehyde blocked polyamines are reported (K. J. Kim, in *Proceedings of the 20th Water-borne, High Solid and Powder Coatings Symposium*, pages, 57–79, Feb 1993) to have a lower hydrolysis rate than ketimines blocked with aliphatic ketones. Thus, polyamines blocked with aromatic ketones or aldehydes such as benzyladehyde may provide a longer pot life.

When the curable coating compositions of the present invention contain a bifunctional curing agent, the ratio of the curing agent to the acrylated urethane acrylic resin will be such that the ratio of (a) the equivalents of the crosslinking functional group to (b) the equivalents of the pendant (meth)acrylate groups on the resin is suitably 0.9:1 to 1:0.9, preferably about 1:1. In this regard, it should be noted that crosslinking groups such as the acetoacetate group and the malonate group contain two equivalents of crosslinking functionality per group. Thus, for the purposes of calculating the ratio of curing agent to acrylated urethane acrylic resin, both active methylene hydrogens in the acetoacetate group and the malonate group are counted as equivalents of crosslinking functional group.

Still another type of room temperature crosslinking agent for the acrylated urethane acrylic resins of the present invention may be compounds containing polyfunctional mercaptans as described in U.S. Pat. No 4,571,420. The curing with mercaptans may be catalyzed with certain bases, such as 1,1,3,3-tetramethyl guanidine.

Still another way to cure the (meth)acrylated urethane acrylic resins is free-radical crosslinking initiated thermally or at room temperatures with suitable free radical initiators such as peroxides or azo compounds or by irridiation with visible or with ultraviolet (UV) light with suitable photoinitiators or by electron beams (EB). Examples of free radical initiator systems for room temperature curing include tBHPO with cobalt salts and methyl ethyl ketone peroxide (MEKP) with cobalt salts.

A preferred means of free radical crosslinking the acrylated urethane acrylic resins of the present invention is by UV irradiation. Suitable photoinitiators for UV cure include benzophenone, substituted benzophenones, 2-phenyl-acetophenone (deoxybenzoin), 1-hydroxycyclohexyl-phenylketone (IRGACURE 184), 2,2-dimethoxy-1,2-diphenylethan-1-one (IRGACURE 651), 2-methyl-1-[4-(methylthio)phenyl]-2-morpholinopropan-1-one (IRGACURE 907), 2-hydroxyl-2-methyl-1-phenylpropan-1-one (DAROCURE 1173), 2,3-pentandione, 2,3-octandione, 2,4,6-trimethylbenzoyldiphenylphosphine, halogenated polynuclear ketones such as chlorosulphonated benzanthones, chlorosulphonated fluorenones, alpha-haloalkylated benzanthones, alpha-haloalkylated fluorenones, and the like. Water soluble photoinitiators include those described by M. L. Koehler et al and G. L. Bassi et al in *Radtech'88-North America Conference Papers*, April 1988, pages 150–166. Tertiary amines such as dimethylethanolamine, N,N-dimethylbenzylamine, N,N-bis(2-hydroxylpropyl)-p-toluidine and polymeric amines such as copolymers of dimethylaminoethyl methacrylate, may be used as accelerators or synergistic agents with photoinitiators such as benzophenone and alkylphenones to enhance the conversion of radiation energy to desired radical crosslinking. The UV-curable coating compositions generally contain from 0.01 to 10 wt. %, preferably from 0.1 to 6 wt. % based on the solid weight of the coating compositions, of the photoinitiator.

The UV curable aqueous coating compositions may be applied to any appropriate substrate as a thin film by a variety of methods, including rolling, dipping, spraying, brushing, flexographic, lithographic and offset web printing. The coating film is exposed to UV radiation of about 200 to 450 nanometers in wavelength provided by an appropriate light source such as low, medium and high pressure mercury vapor lamps, xenon and other flash type lamps, fluorescent lights, lasers, electrodeless mercury lamps, and the like. Other sources of radiant energy such as electron beams, gamma radiation, X-rays, and sunlight can also be used.

III. Third Embodiment

In this embodiment, the ambient-temperature dual-cure polymer compositions comprise (A) a compound containing at least two acetoacetate methylene groups; (B) a compound containing at least two acrylate alkene groups; and (C) a compound comprising at least two epoxy groups; and these compositions are cured in the presence of (D) a Michael reaction base catalyst. At least one of the above compounds is a water-borne film-forming binder containing, preferably, carboxyl groups.

The compound containing at least two acetoacetate methylene groups can be a low molecular weight compound or a high molecular weight polymer. Suitable polyacetoacetates can be obtained by the transesterification of a monomeric acetoacetate with a polyol. Examples of the monomeric acetoacetates that can be used include methyl acetoacetate, ethyl acetoacetate and t-butyl acetoacetate. Examples of suitable alkyl polyols are ethylene glycol, propylene glycol-(1,2) and (1,3), butylene glycol-(1,4) and (1,3), hexanediol-(1,6), octanediol-(1,8), neopentyl glycol, cyclohexanedimethanol, 2-methyl-1,3-propanediol, 2,2,4-trimethyl-1,3-pentanediol, trimethylol propanetriol (TMP), glycerine, pentaerythritol, and the like. Examples of low molecular weight polyacetoacetate compounds that can be produced by transesterification of the monomeric acetoacetates with the alkyl polyols are trimethylolpropane triacetoacetate (TMP-TAcAc), trimethylolethylethylene triacetoacetate (TMETAcAc), pentaerythritol tetraacetoacetate (PETAcAc) and glycerol triacetoacetate (GLTAcAc). Examples of high molecular weight acetoacetylated polymers include copolymers of ethylenically unsaturated compounds (such as (meth)acrylic acid, $C_{1-4}$-alkyl (meth)acrylate, styrene, butadiene, ethylene, propylene, etc.) with acetoacetoxyethyl methacrylate (AAEM) which may be produced through conventional free radical polymerizations in solution or in emulsion. In this case, it is preferred that the polymer have a number average molecular weight of 1,000 to 40,000 daltons, preferably 2,000 to 25,000 daltons, where the product is a solution polymer. In the case where the product is an emulsion polymer, the number average molecular weight is 3,000 to 2,000,000 daltons, preferably 10,000 to 800,000 daltons.

The compound containing at least two acrylate alkene groups can be a low molecular weight compound, an oligomer, or a high molecular weight polymer containing at least two acrylate functional groups. Examples of low molecular weight polyacrylate compounds are trimethylolpropane triacrylate (TMPTA), pentaerythritol tetraacrylate (PETA) and glycerolethoxy triacetoacetate (GETA). Examples of suitable oligomer polyacrylates include urethane oligomers terminated with acrylate functional groups. Preferred oligomer urethane polyacrylates are the water-dispersible resins described above in Embodiment I.

A preferred group of polymeric polyacrylates are the water-dispersible acrylated urethane acrylic (WDAUA) resins described above in Embodiment II. The WDAUA are prepared in two steps. First a water dispersible acrylic polyol backbone polymer is prepared. In the second step, urethane acrylate side chain material is prepared and the water-dispersible acrylic polyol backbone polymer is introduced for grafting.

Among the polyepoxides which can be used as the compound containing at least two epoxy groups are epoxy condensation products such as polyglycidyl ethers of alcohols and phenols and epoxy-containing acrylic polymers obtained by copolymerization of ethylenically unsaturated monomers (such as ethylene, propylene, butadiene, styrene, $C_{1-4}$-alkyl (meth)acrylates, etc.) with glycidyl (meth)acrylate and/or allyl glycidyl ether. A preferred polyepoxide is a liquid diglycidyl ether of bisphenol A (DGEBA) such as Epon 828, commercially available from the Shell Company. When the polyepoxide is an oligomer it suitably has a number average molecular weight of 100 to 800 daltons, preferably 250 to 700 daltons. When the polyepoxide is a solution polymer, it suitably has a number average molecular weight of 800 to 20,000 daltons, preferably 1,000 to 15,000 daltons. When the polyepoxide is an emulsion polymer, it suitably has a number average molecular weight of 3,000 to 2,000,000 daltons, preferably 5,000 to 800,000 daltons.

The compound containing at least two epoxy groups is normally incorporated with the compound containing at least two acetoacetate methylene groups to form a storage package for a two-pack coating composition. Thus, epoxy resins such as Epon 828, either alone or in an aqueous emulsion, are mechanically mixed with the polyacetoacetates. Epoxy aqueous emulsions can be prepared by mechanical emulsification of the epoxy resins using suitable emulsifiers and mechanical devices.

Alternatively, the compound containing at least two epoxy groups can be chemically bonded to the compound containing at least two acetoacetate methylene groups. Such as compounds or polymers with both acetoacetate moieties and epoxy moieties. Low molecular weight compounds containing both acetoacetate and epoxide functional groups can be obtained by transesterification of polyols with monofunctional acetoacetate compounds and then reaction of the partially substituted polyacetoacetate product with a polyisocyanate and glycidol to introduce the epoxy functional groups. The epoxy polyacetoacetate so obtained usually has a molecular weight range from 300 to 2000, preferably, 500 to 1000.

Polymers with both epoxy and acetoacetate functional groups are produced by copolymerization of glycidyl (meth)acrylate or allyl glycidyl ether with AAEM and other copolymerizable monomers. The polymerization can be carried out by any conventional method, preferably emulsion polymerization to obtain latices and solution polymerization to obtain resins. The epoxy acetoacetylated resins can be made water dispersible by introducing carboxyl functional groups using carboxyl containing monomers as described above in Embodiment I. High molecular weight epoxy acetoacetylated resins of the non-water dispersible type usually need to be mechanically emulsified into aqueous emulsion form to be used in the water-borne coatings.

The Michael reaction base catalyst used must have a pKa of from 12 to 14. Suitable catalysts which may be used include, but are not limited to DBU, DBN, TMGD, 1,4-dihydropyridines, 2-allyl-N-alkyl imidazolines, tetra-t-butylammonium hydroxide, potassium methoxide, NaOH and KOH. Catalyst blends of the above described catalysts can also be used. An appropriate catalyst blend can sometimes exhibit a synergistic effect of providing certain more desirable coating properties than when a single catalyst is used. The amount of the catalysts used depends on the acid value of the unneutralized composition and can range from 0.2 to 10 wt. %, preferably 0.4 to 6 wt. % of the total binder solid.

The compound containing at least two acetoacetate groups, the compound containing at least two acrylate groups, the compound containing at least two epoxy groups and the base catalyst may be combined as a water-borne coating composition in two storage stable packages. For example, a WDAUA resin, usually containing both acrylate and carboxyl functional groups, may be neutralized with the Michael reaction base catalyst and dispersed into water. The water dispersion of fine particle size so obtained can serve as one stable package (WDAUA pack). Pigments and other paint additives can be also incorporated into the WDAUA water dispersion using conventional paint making methods to formulate pigmented coatings.

The compound containing at least two acetoacetate groups and the compound containing at least two epoxy groups may be combined to obtain another storage stable package (AcAc pack) of the two-pack water-borne coatings. Compounds of polyacrylates can also be included in the AcAc pack. When low molecular weight (<1000) compounds such as TMPTAcAc and liquid DGEBA such as Epon 828 are used for the AcAc pack, the mixture of the AcAc pack is usually a low viscosity solution dispersible directly in the water-borne WDAUA pack, and the AcAc pack need not be a water-borne pack.

When a higher molecular weight (>1000) polyacetoacetate is used, however, the AcAc pack has to be a water-borne pack in emulsion or latex form. Suitable high molecular weight polyacetoacetates include acetoacetylated acrylic resins and latices. In the case of acetoacetylated acrylic resin, an aqueous emulsion can be formed by dispersing the acetoacetylated acrylic resin mechanically in water using suitable emulsifiers and suitable emulsification devices. The aqueous acetoacetylated acrylic emulsion obtained has a solid content ranging from 30 to 70 wt. %, preferably, 40 to 60 wt. %. The epoxy component can be incorporated into the AcAc pack by using an aqueous emulsion of the epoxy acetoacetylated acrylic resin described above, or an aqueous emulsion of epoxy resins such as Epon 828, or epoxy acrylic latices of, for example, glycidyl (meth)acrylate copolymers.

When an acetoacetylated latex is used, the compound containing at least two epoxy groups can be incorporated into the AcAc pack by using an epoxy aqueous emulsion and/or an acetoacetylated latex obtained by emulsion polymerization of AAEM and glycidyl (meth)acrylate with other copolymerizable monomers.

The two-pack coating composition can be formulated so that the acrylate/acetoacetate molar ratio ranges from 0.8 to 2.2, preferably, 1.0 to 2.0, and epoxy/carboxyl molar ratio ranges from 0.1 to 3.0, preferably, 0.6 to 2.0. The amount of base catalyst used should be enough to give a degree of neutralization of the total acid in the composition from 60% to 140%, preferably, 70 to 110%. When the composition does not contain carboxyl acid or other acidic groups, the amount of epoxide used can range from 0.1 to 20 wt. % preferably, 0.5 to 10 wt. %, and the amount of the base catalyst used can range from 0.2 to 2.0 wt. %, preferably, 0.5 to 1.2 wt. %, based on the total binder solid.

When the WDAUA pack and the AcAc pack of the two-pack coating composition are mixed, coating films applied from the mixture can be cured at ambient temperatures within 7 days and have excellent performance properties.

Other features of the invention will become apparent in the course of the following descriptions of exemplary embodiments which are given for illustration of the invention and are not intended to be limiting thereof.

A list of the abbreviations used in the Example section is provided in the following table:

| Abbreviation | Material/Definition | Source |
| --- | --- | --- |
| AA | acrylic acid | Rohm & Haas |
| AcAc | acetoacetate | |
| AAEM | acetoacetoxyethyl methacrylate | Estman Chem. |
| AUA | acrylated urethane acrylics | |
| BA | n-butyl acrylate | Rohm & Haas |
| BMA | n-butyl methacrylate | Rohm & Haas |
| BYK 035 | a defoamer | BYK Chem. |
| BYK 346 | a flow and level agent | BYK Chem. |
| Darocure 1137 | phenyl-2-hydroxy-2-propylketone | E. MerK |
| DBU | 1,8-diaza-bicyclo[5,4,0]undecene-7 | Air Products |
| DEA | diethylene glycol ethyl monoether | Dow Chem. |
| DEG | diethylene glycol | Dow Chem. |
| DGM | diethylene glycol dimethyl ether | Grant Chem. |
| DI water | deionized water | |
| DMM | propylene glycol dimethyl diether | Dow Chem. |
| DMPA | α,α-dimethyl propanoic acid | |
| DMSO | dimethyl sulfoxide | Aldrich |
| DM water | Demineralized water | |
| DOWICIL 75 (20%) | 20% aqueous Dowicil 75 | Dow Chem. |
| EDGM | diethylene glycol diethyl ether | Grant Chem. |
| EGM | ethylene glycol dimethyl ether | Grant Chem. |
| 2-EHA | 2-ethylhexyl acrylate | Aldrich |
| 2-EHMA | 2-ethylhexyl methacrylate | |
| EW | equivalent weight | |
| EX-n | Example n, n is an integer | |
| FC-430 | Flourad FC-430, flow aid | |
| Graph Blue 6830-0 | blue pigment | Nuodex Color |
| HDI | hexamethylene diisocyanate | |
| HDI-T | HDI isocyanurate trimer | |
| HDODA | 1,6-hexanediol diacrylate | Interez |
| HDT | HDI isocyanurate (Tolonate HDT) | Rhone-Poulenc |
| HEA | 2-hydroxyethyl acrylate | |
| HEMA | 2-hydroxyethyl methacrylate | |
| HPA | hydroxypropyl acrylate | |
| HMPA | hydroxypropyl methacrylate | Huls |
| IPDI | isophorone diisocyanate | Huls |
| IPDI-T | IPDI isocyanurate trimer | Huls |
| L-555M60 | t-amyl peroxyaceate, Lupersol 555M60 | Atochem. |
| LT | appearance of a dispersion in Example 59 | |
| MAA | methacrylic acid | |
| MEHQ | monomethyl ether hydroquinone | Aldrich |
| MEK | methyl ethyl ketone | |
| MEO | mercaptoethanol | |

| Abbreviation | Material/Definition | Source |
|---|---|---|
| MeOH | methanol | |
| MMA | methyl methacrylate | |
| Mn | number average molecular weight | |
| Mw | weight average molecular weight | |
| NMP | N-methyl-pyrrolidinone | |
| NOM | n-octyl mercaptan | |
| Novo-Red-F3RK70 | red pigment | Hoechst |
| Per-Orange-RL70 | orange pigment | Hoechst |
| PETA | pentaerythritol tetraacrylate | |
| PMA | propylene glycol methyl ether acetate | Dow Chem. |
| POLYG-55-112 | polyether polyol | |
| PVC | pigment volume content | |
| SKANE M-8 | fungicide | Rohm & Haas |
| St | styrene | |
| T-12 | dibutyltin dilaurate | M & T Chem. |
| Tg | glass transition temperature | |
| Tioxide | titanium dioxide | Tioxide Can. |
| TMGD | 1,1,3,3-tetramethylguanidine | Aldrich |
| TMP | triethyol propane | Celanese |
| TMPTA | trimethylolpropane triacrylate | Interez |
| TMPDAcAc | trimethylolpropane diacetoacetate | Guertin Bros. |
| TMPTAcAc | trimethylolpropane triacetoacetate | Guertin Bros. |
| TM-100 | $CH_2\!\!=\!\!CHCOOCH_2CH_2[OCO(CH_2)_5]_2OH$, Tone, M-100 | Union Carbide |
| UV | ultraviolet light | |
| Violet-228-5199 | violet pigment | SunChem. |
| VOC | volatile organic compound | |
| WD | water dispersible/dispersion | |

EXAMPLES

EMBODIMENT I

Example 1

Preparation of Wwater-Dispersible Acetoacetylated Acrylic Resins:

A suitable four-neck 2-liter flask equipped with an agitator and a condenser was used as the reaction vessel. The raw materials used are shown in Table 1. The Reactor Charge (RC) shown in Table 1 was charged into the reactor. The reactor was purged with dry nitrogen and maintained under a nitrogen blanket during the whole reaction period. The reactor was heated to the desired reaction temperatures. The Monomer Mixture (MM) was fed into the reactor over four hours. The reaction temperature was increased by 5° C. after all MM was fed in the reactor. Heating was continued for another two hours and then the mixutre was cooled to stop the reaction. Typical properties of the obtained water-dispersible AcAc acrylic resins are shown in Table 2.

TABLE 1

Recipes for the Water-Dispersible Acetoacetylated Acrylic Resins

| Raw Materials | EX-1A (GW26) | EX-1B (GW32) | EX-1C (GW36) | EX-1D (GW41) | EX-1E (GW42) | EX-1F (GW49) |
|---|---|---|---|---|---|---|
| Reactor Charge (RC) | | | | | | |
| DEA | 138.4 | 0 | 0 | 0 | 0 | 0 |
| PMA | 46.2 | 0 | 0 | 0 | 0 | 0 |
| DMSO | 0 | 149.8 | 0 | 0 | 0 | 0 |
| MEK | 0 | 34.6 | 11.7 | 0 | 0 | 0 |
| DGM | 0 | 0 | 128.2 | 0 | 184.0 | 0 |
| EGM | 0 | 0 | 35.0 | 0 | 0 | 0 |
| EDGM | 0 | 0 | 0 | 175.6 | 0 | 0 |
| NMP | 0 | 0 | 0 | 0 | 0 | 177.0 |
| Monomer Mixture (MM) | | | | | | |
| MMA | 273.4 | 272.0 | 284.3 | 274.4 | 0 | 0 |
| BMA | 171.9 | 171.7 | 90.9 | 109.3 | 149.5 | 196.7 |
| St | 0 | 0 | 0 | 0 | 271.4 | 177.0 |
| AAEM | 276.8 | 276.6 | 279.6 | 279.1 | 276.0 | 196.7 |
| AA | 30.2 | 32.3 | 23.3 | 16.5 | 32.2 | 24.6 |
| HEA | 0 | 0 | 83.3 | 0 | 0 | 59.0 |
| HPMA | 0 | 0 | 0 | 0 | 23.0 | 0 |

TABLE 1-continued

Recipes for the Water-Dispersible Acetoacetylated Acrylic Resins

| Raw Materials | EX-1A (GW26) | EX-1B (GW32) | EX-1C (GW36) | EX-1D (GW41) | EX-1E (GW42) | EX-1F (GW49) |
|---|---|---|---|---|---|---|
| MAA | 0 | 0 | 0 | 0 | 0 | 9.8 |
| 2-EHA | 0 | 0 | 0 | 0 | 0 | 95.4 |
| L-555M60 | 63.2 | 63.0 | 63.8 | 63.7 | 63.7 | 62.9 |
| MEO | 0 | 0 | 0 | 0 | 0 | 0.787 |
| Reaction Temperature °C., | 138 | 130 | 142 | 135 | 140 | 155 |

TABLE 2

Typical Properties of the Water-Dispersible Acetoacetylated Acrylic Resins

| Properties | EX-1A (GW26) | EX-1B (GW32) | EX-1C (GW36) | EX-1D (GW41) | EX-1E (GW42) | EX-1F (GW49) |
|---|---|---|---|---|---|---|
| Solid, wt % | 75 | 77 | 76 | 75 | 78 | 77 |
| AcAc EW (solid) | 611 | 611 | 612 | 612 | 613 | 867 |
| Acid Value (Solid) | 30 | 32 | 23 | 16 | 32 | 32 |
| Color (Gardner) | 1 | 1 | 1 | 1 | 1 | 5 |
| Viscosity (Gardner) | Z8 | — | Z7 | — | — | Z3 |
| Density, KG/L | 1.05 | — | 1.05 | — | — | — |

Example 2

Preparation of Acetoacetylated Acrylic Latexes:

The raw materials and recipes for preparing the AcAc acrylic latexes are shown in Table 3. A 2-liter reaction vessel equipped with a stirrer, a reflux condenser, a thermometer and a feeding inlet was charged with raw material RC shown in Table 3. The RC was purged with nitrogen and heated to the desired reaction temperature of 80° C. About 6 wt. % of the FC was fed into the reactor, and the temperature was held at 80° C. for 10 minutes. The FE was fed into the reactor over about three hours. The Feed Emulsion (FE) was prepared in another vessel before feeding. The reaction temperature was controlled by a water bath and maintained at 80° C. throughout the whole reaction period. Feeding the remainder of the FC was started after half of the FE was fed into the reactor and finished at the same time as the FE feeding. After all FC and FE were fed into the reactor, the reacting emulsion was maintained at 80° C. for another two hours and cooled to room temperatures. Then raw material PA was added. The products were filtered through a 200-mesh cloth. Typical properties of the obtained AcAc acrylic latexes are shown in Table 4.

TABLE 3

Recipes for Preparing the Acetoacetylated Latexes

| Recipe | EX-2A (GY680) | EX-2B (GY60) | EX-2C (GY62) | EX-2D (GY69) | EX-2E (GY70) | EX-2F (GY71) |
|---|---|---|---|---|---|---|
| Monomer Mixture (MM) | | | | | | |
| MMA | 45.0 | 39.1 | 0 | 0 | 45.0 | 44.9 |
| St | 0 | 0 | 35.3 | 35.2 | 0 | 0 |
| BMA | 0 | 22.9 | 22.7 | 24.4 | 0 | 0 |
| BA | 18.0 | 0 | 0 | 0 | 18.0 | 18.1 |
| HEMA | 0 | 0 | 0 | 0 | 0 | 5.1 |
| HEA | 0 | 0 | 0 | 3.7 | 0 | 0 |
| AAEM | 37.0 | 36.9 | 36.9 | 36.7 | 37.0 | 31.9 |
| MAA | 0 | 1.1 | 5.3 | 0 | 0 | 0 |
| NOM | 0.82 | 0.84 | 0.84 | 0.83 | 0 | 0.85 |
| Reactor Charge (RC) | | | | | | |
| DM water | 85.0 | 88.1 | 37.6 | 84.9 | 85.7 | 84.8 |
| Aerosol A103 | 3.82 | 3.97 | 3.94 | 3.82 | 3.85 | 3.94 |
| (MM) | 9.10 | 11.0 | 10.9 | 10.6 | 10.7 | 9.08 |
| Feed Emulsion (FE) | | | | | | |
| DM water | 23.4 | 24.3 | 25.4 | 23.1 | 23.8 | 23.3 |
| Triton QS44-K35 | 3.85 | 4.52 | 4.49 | 3.94 | 3.85 | 3.94 |
| Aerosol MA80 | 0.79 | 0.79 | 0.79 | 0.86 | 0.79 | 0 |
| Triton GR-5M | 0 | 0 | 0 | 0 | 0 | 1.11 |

TABLE 3-continued

Recipes for Preparing the Acetoacetylated Latexes

| Recipe | EX-2A (GY680) | EX-2B (GY60) | EX-2C (GY62) | EX-2D (GY69) | EX-2E (GY70) | EX-2F (GY71) |
|---|---|---|---|---|---|---|
| (MM) | 90.9 | 89.0 | 89.1 | 89.4 | 89.3 | 90.9 |
| Feed Catalyst (FC) | | | | | | |
| DM water | 7.38 | 3.81 | 8.76 | 7.27 | 8.57 | 7.26 |
| Triton X-405 | 0.21 | 0.22 | 0.22 | 0.21 | 0.21 | 0.21 |
| Ammonia persulfate | 0.38 | 0.40 | 0.39 | 0.40 | 0.40 | 0.38 |
| Post Addition | | | | | | |
| Dowicil 75 (20%) | 0.36 | 0.66 | 0.44 | 0.36 | 0.43 | 0 |
| Skane M-8 (50%) | 0 | 0 | 0 | 0 | 0 | 0.41 |

TABLE 4

Typical Properties of the Acetoacetylated Acrylic Latexes

| Latex | EX-2A (GY68) | EX-2B (GY60) | EX-2C (GY62) | EX-2D (GY-69) | EX-2E (GY70) | EX-2F (GY71) |
|---|---|---|---|---|---|---|
| Solid, wt % | 46.0 | 45.0 | 45.0 | 45.0 | 47.0 | 46.0 |
| pH | 5.0 | 4.8 | 4.6 | 4.5 | 4.2 | 4.1 |
| Viscosity, second (Zahn #2 Cup) | 16 | 16 | 17 | 21 | 17 | 18 |
| AcAc EW (solid) | 605 | 613 | 613 | 611 | 600 | 693 |
| Molecular weight | | | | | | |
| Mw × 0.001 | 44.0 | 58.0 | 46.0 | 36.0 | 166 | 31.0 |
| Mw/Mn | 3.7 | 5.5 | 4.1 | 3.3 | 3.3 | 2.4 |

Example 3

Preparation of single NCO-terminated Acrylate (GI17):

To a 2-liter reactor equipped with a stirrer, a reflux condenser, a thermometer and a dropping funnel was added the following materials at room temperature.

| IPDI-T | 1050 g |
|---|---|
| T-12 | 0.3 g |
| DGM | 111 g |

The reactor charge was purged with dry air, heated to and maintained at 58° C. A mixture of the following materials was fed into the reactor over 75 minutes under dry air atmosphere.

| HPA | 260 g |
|---|---|
| MEHQ | 0.14 g |

The reaction temperature was held at 60° C. until the NCO content of the reaction mixture reached the theoretical value of 3.0 wt. %. The reaction product was cooled to room temperature. The obtained clear resin has a non-volatile content of 70 wt. %, NCO content of 2.8 wt. % and acrylate double bond (C=C) equivalent weight of 710.

Example 4

Preparation of NCO-Free Urethane Polyacrylate Resin (GI-54):

The same reactor as used in Example 3 was charged with the following materials:

| GI-17 from Example 3 | 901 g |
|---|---|
| 3% MEHQ in PMA | 0.88 g |
| HPA | 83.3 g |

The reaction mixture was heated to 84° C. and maintained at that temperature until the NCO content dropped to less than 0.8 wt. %. Then 15 g of methanol was added. The reaction temperature was maintained at 70° C. until the NCO content reached zero. The reaction product was cooled to room temperature. The obtained clear resin had a non-volatile content of 72 wt. % and a C=C equivalent weight of 375 based on the resin solid. This resin is a hydrophobic urethane polyacrylate and is not water dispersible.

Example 5

Preparation of Water-Dispersible Urethane Acrylate (GI-56):

The same reactor as used in Example 3 was charged with the following materials:

| DMPA | 41.3 g |
|---|---|
| 3% MEHQ in PMA | 1.7 g |
| DGM | 144.7 g |

The reactor content was heated to 130° C. and became a clear solution. A mixture of

| | |
|---|---|
| GI-17 from Example 3 | 792 g |
| DGM | 20.7 g | was added into the reactor over 25 minutes while the reaction temperature was reduced from 130° C. to 95° C. The reaction mixture was maintained at 95° C. for another five hours when the NCO content approached zero. The reactor was cooled to room temperature. A clear viscous resin was obtained. The resin has the following properties:

| | |
|---|---|
| Solid content | 65 wt. % |
| NCO content | 0 |
| C=C EW (solid) | 534 |
| Acid value (solid) | 29 |

This resin is water dispersible upon neutralization with ammonia or other appropriate neutralizers described above. Stable translucent water dispersions were obtained with a degree of neutralization between 60 to 110%.

Example 6

Preparation of Water-Dispersible Urethane Acrylate (GI-36):

The same reactor as used in Example 3 was charged at room temperature with the following materials:

| | |
|---|---|
| PolyG-55-112 | 434.7 g |
| MEHQ | 0.013 g |
| GI-17 from Example 3 | 565.3 g |

The reaction mixture was heated to and maintained at 90° C. for 5 hours and then cooled to room temperature. The clear resin obtained has the following properties:

| | |
|---|---|
| Solid content | 89 wt. % |
| NCO content | 0 |
| C=C EW (solid) | 1043 |
| Acid value | 0 |

This is a nonionic water-dispersible urethane polyacrylate resin. It is readily dispersed in water to give stable water dispersions with a solid content from 20 to 30 wt. %.

Example 7

Water-Dispersible Urethane Acrylate (GI-88):

To the same reactor as used in Example 3 were charged at room temperature the following materials:

| | |
|---|---|
| DGM | 32.5 g |
| DEG | 64.7 g |
| DMPA | 16.3 g |
| PolyG-55-112 | 81.3 g |
| T-12 | 0.05 g |

The reaction mixture was purged with dry nitrogen and heated to 80° C. Raw material

| | |
|---|---|
| IPDI | 144.3 g | was added to the reactor over 3 hours. The reaction temperature was maintained at 80° C. for another 2 hours and then reduced to 70° C. Solvent

| | |
|---|---|
| Acetone | 48.7 g | was added, and the reaction solution was cooled to room temperature. Then the following materials were added.

| | |
|---|---|
| GI-17 from Example 3 | 504.0 g |
| DGM | 56.7 g |
| T-12 | 0.23 g |

The reaction mixture was purged with dry air, heated to and held at 78° C. for 6 hours. While cooling down to 60° C., Methanol 15 g was added to the reactor. Cooking was continued at 60° C. for another one hour, and then the reactor was cooled to room temperature. The obtained product is a clear resin with the following properties.

| | |
|---|---|
| Solid content | 73 wt. % |
| NCO content | 0 |
| C=C EW (solid) | 977 |
| Acid value | 11 |

This is an anionic/nonionic water-dispersible NCO-free urethane polyacrylate resin. Stable water dispersions were obtained from this resin with degree of neutralization from 60 to 140%.

Example 8

Hydrophobic Urethane Polyacrylate Resin (GI-1):

To the reactor were charged at room temperature the following materials:

| | |
|---|---|
| IPDI | 444.0 g |
| n-butyl acetate | 200.0 g |
| T-12 | 0.20 g |

The reaction mixture was purged with nitrogen and heated to 56° C. Then

| | |
|---|---|
| Diethylene glycol (DEG) | 106 g | was fed into the reactor over 1 hour. The reactor was held at 59° C. for another 1 hour. The NCO content of the reaction mixture was measured to be 11.1 wt. % at this time. The nitrogen blanket was removed and replaced with a dry air blanket. A mixture of

| | |
|---|---|
| HEA | 232 g |
| MEHQ | 0.0315 g | was fed to the reactor at 56° C. over 50 minutes. The reaction temperature was raised to 80° C., and heating was continued until the NCO content of the reaction mixture was less than 1.0 wt. %. Then

| | |
|---|---|
| Methanol | 15 g | was added. Heating was continued at 60° C. for another 1 hour, and the reactor was cooled to room temperature. The clear resin obtained had the following properties:

| | |
|---|---|
| Solid contents | 78.4 wt. % |
| NCO content | 0 |
| C=C EW (solid) | 391 |
| Acid value | 0 |

Example 9

Water-Dispersible Urethane Polyacrylate Resin (GI-78):

The same reactor as used in Example 3 was charged with the following materials:

| | |
|---|---|
| DEG | 101.0 g |
| DMPA | 54.1 g |
| T-12 | 0.14 g |
| DGM | 239.0 g |

The reactor charge was purged with dry nitrogen and heated to 45° C. A diisocyanate

| | |
|---|---|
| IPDI | 400.3 g | was added. The reaction temperature rose to 130° C. and slowly dropped to 90° C. Cooling was continued at 90° C. for another 2 hours. Then

| | |
|---|---|
| DGM | 54.1 g | was added. The reaction solution was cooled to room temperature and purged with dry air. The following materials were then added to the reactor:

| | |
|---|---|
| HPA | 137.5 g |
| MEHQ | 0.27 g |
| T-12 | 0.44 g |

The temperature of the reaction content was raised to 78° C. and maintained at that temperature for 8 hours. The reaction temperature was reduced to 70° C. and

| | |
|---|---|
| Methanol | 14.0 g | was added. Heating was continued at 70° C. for 1 hour, and the reactor was cooled to room temperature. The obtained clear resin had the following properties:

| | |
|---|---|
| Solid contents | 71 wt. % |
| NCO content | 0 |
| C=C EW (solid) | 652 |
| Acid value | 33 |

This resin is water dispersible upon neutralization.

Example 10

Clear Coating compositions: Effect of water on pot-life (gel time):

Two-component clear coatings were prepared from GI-78 resin of Example 9 and GI-54 resin of Example 4 as the polyacrylate component and TMPTAcAc as the AcAc component using TMGD as the catalyst. Different amounts of water were added to obtain 5 different clear coatings as shown in Table 5. It can be seen that only when water is present in large amount and forms a continuous phase in an oil-in-water emulsion such as in formulation EX-10E that a pot life of longer than 24 hours can be obtained. Films of EX-10E were drawn on aluminum panels and allowed to dry at room temperature. The films became tacky-free in about 80 minutes when significant crosslinking can be observed by MEK solubility test. The films before 70 minutes were completely soluble in MEK. After 70 minutes, some MEK insoluble gel appeared. The gel content increased as the dry time increased. Completely cured films were obtained after 4 days at room temperature. The cured films resisted more than 100 MEK double rubs. Films applied 24 hours after EX-10E was prepared showed the same curing behavior as that described above. Most of the water evaporated out of the films about 15 minutes after the films were applied. This was observed as the films changed appearance from hazy to glossy clear. The MEK insoluble gel appeared about 60 minutes later. The above experiments demonstrate that the crosslinking through the Michael reaction was somehow blocked by large amount of water and occurred only after water evaporated out of the films.

TABLE 5

Effect of Water on Pot-Life (gel time) of the Catalyzed Two Component Clear Coatings

| Coating # | EX-10A (S479A) | EX-10B (S479D) | EX-10C (S479B) | EX-10D (S479C) | EX-10E (S479B) |
|---|---|---|---|---|---|
| | part by weight (PBW) | | | | |
| Raw Materials | | | | | |
| GI-78 of Example 9 | 30.7 | 30.7 | 30.7 | 30.7 | 30.7 |
| GI-54 of Example 4 | 35.8 | 35.8 | 35.8 | 35.8 | 35.8 |
| TMPTAcAc | 7.6 | 7.6 | 7.6 | 7.6 | 7.6 |
| DGM | 24.1 | 24.1 | 24.1 | 24.1 | 24.1 |
| TNGD | 1.85 | 1.85 | 1.85 | 1.85 | 1.85 |
| DM water | 0 | 3.5 | 5.0 | 10.0 | 100.0 |
| Formular constants | | | | | |
| Solid content, wt % | 47.5 | 45.9 | 45.3 | 43.2 | 23.8 |
| C=C/AcAc molar ratio | 1.8 | 1.8 | 1.8 | 1.8 | 1.8 |

TABLE 5-continued

Effect of Water on Pot-Life (gel time) of the Catalyzed Two Component Clear Coatings

| Coating # | EX-10A (S479A) | EX-10B (S479D) | EX-10C (S479B) | EX-10D (S479C) | EX-10E (S479B) |
|---|---|---|---|---|---|
| | part by weight (PBW) | | | | |
| Catalyst level, wt % | 3.9 | 3.9 | 3.9 | 3.9 | 3.9 |
| pH | — | — | — | — | 9.8 |
| Appearance* | CS | CS | CS | HS | ME |
| Initial viscosity (Zahn Cup 2), sec | 30 | 30 | 30 | 30 | 60 |
| Gel time, minute | 70 | 25 | 20 | 80 | >1500 |

*CS = clear solution, HS = hazy solution, ME = milky emulsion

Example 11

Two-component NCO-free urethane/acrylic water-reducible white paint (S253B)
Component A: EX-1A
Component B: GI-54 of Example 4, TMPTA
Catalyst: TMGD
Pigment: Tioxide (titanium dioxide)

PAINT FORMULATION

| Raw Materials | Weight, g |
|---|---|
| Part I | |
| EX-1A resin | 601.4 |
| TMGD | 17.3 |
| Aerosol A 103 | 15.2 |
| Acrysol RM1020 | 10.0 |
| Ammonia (28%) | 1.0 |
| DM water | 600.0 |
| Tioxide RCR60 | 425.0 |

Mix in a high speed disperser for 20 minutes. Shift to a sandmill and grind for about 20 minutes to obtain a dispersion of Hergman 7. Then let down with the following materials:

| GI-54 of Example 4 | 86.8 |
|---|---|
| TMPTA | 65.4 |
| DM water | 30.0 |
| Subtotal of Part I | 1852.1 |
| Part II | |
| TMGD | 7.0 |
| PMA | 20.9 |
| DM water | 515.0 |
| Subtotal of Part II | 542.9 |
| Total of Part I + II | 2395.8 |

| Formula Properties | Part I | Part I + II |
|---|---|---|
| Solid, wt % | 54.3 | 41.9 |
| Viscosity (Zahn Cup 2), sec | 80 | 36 |
| Density, kg/L | 1.24 | 1.17 |
| pH | 8.2 | 9.4 |
| VOC (excluding water), lb/gal | 1.7 | 1.9 |
| Pigment/binder ratio by wt. | 43/57 | 43/57 |
| sag, mils | — | 9 |
| wet hiding power, ft²/gal | — | 1100 |

The paint was sprayed on aluminum and cold-rolled steel (Bonderite 40) panels. Cured coatings with dry film thickness of 1 to 2 mils were obtained. Typical coatings film properties are shown in Table 6.

TABLE 6

Typical film properties of the two-component NCO-free urethane/acrylic water-borne white paints (Examples 11 to 15)

| | Example # | | | | |
|---|---|---|---|---|---|
| Paint # | 11 S253B | 12 S330B2 | 13 S331B2 | 14 S366C1 | 15 S441B |
| Initial Gloss (60°/20°) | 85/70 | 88/77 | 88/77 | 85/70 | 84/66 |
| Gloss retention (60°/20°)% | | | | | |
| UV-CON exposure (0 hour) | 100/100 | 100/10 | 100/10 | 100/100 | 100/100 |
| (200 hours) | 93/75 | 0 | 0 | — | — |
| (300 hours) | 89/60 | 84/48 | 95/86 | — | — |
| (500 hours) | 86/50 | — | — | — | — |
| (1000 hours) | 88/54 | 60/19 | 96/88 | 92/69 | 60/— |
| | | | 56/18 | | |
| MEK double rub | >100 | >100 | >100 | >100 | >100 |
| Pencil hardness | 2H | 2H | 2H | 3H | 3H |

TABLE 6-continued

Typical film properties of the two-component NCO-free urethane/acrylic water-borne white paints (Examples 11 to 15)

| | Example # | | | | |
|---|---|---|---|---|---|
| Paint # | 11 S253B | 12 S330B2 | 13 S331B2 | 14 S366C1 | 15 S441B |
| Sward hardness number | 17 | 15 | 17 | — | — |
| Impact resistance, lb-in, direct | 28 | 12 | 10 | 10 | 16 |
| Flexibility, inch, | 3/16" | 3/16" | 1" | 1" | 1" |
| Salt spray resistance (hour) | 200 | 150 | 150 | — | — |
| Adhesion, aluminum | good | fair | good | fair | good |
| steel | good | good | good | fair | good |

Example 12

Two-component NCO-free urethane/acrylic water-reducible white paint using blend catalyst (S330B2)
Component A: EX-1C
Component B: GI-1 of Example 8, TMPTA
Catalyst: TMGD/DBU
Pigment: Tioxide

PAINT FORMULATION

| Raw Materials | Weight, g |
|---|---|
| Part I | |
| EX-1C resin | 136.8 |
| TMGD | 4.4 |
| DM water | 185.4 |
| Rheolate 2000 | 30.2 |
| Tioxide RCR60 | 301.5 |
| Mill in a high speed disperser for about 30 minutes to obtain a dispersion of Hergman 7. Then let down with the following materials: | |
| EX-1C resin | 354.5 |
| TMGD | 11.3 |
| DM water | 428.2 |
| GI-1 of Example 8 | 77.1 |
| TMPTA | 51.7 |
| DM water | 153.0 |
| Subtotal of Part I | 1734.1 |
| Part II | |
| DBU | 4.7 |
| DGM | 14.1 |
| DM water | 367.6 |
| Subtotal of Part II | 386.4 |
| Total of Part I + II | 2120.5 |

| Formula Properties | Part I | Part I + II |
|---|---|---|
| Solid, wt % | 45.7 | 37.4 |
| Viscosity (Zahn Cup 2), sec | 53 | 26 |
| Density, kg/L | 1.17 | 1.14 |
| pH | 8.7 | 9.0 |
| VOC (excluding water), lb/gal | 1.6 | 1.8 |
| Pigment/binder ratio by wt. | 38/62 | 38/62 |
| sag, mils | 12 | 9 |
| wet hiding power, ft²/gal | 800 | 800 |

The paint was sprayed on aluminum and cold-rolled steel (Bonderite 40) panels. Cured coatings with dry film thickness of 1 to 2 mils were obtained. Typical coatings film properties are shown in Table 6.

Example 13

Two-component NCO-free urethane/acrylic water-reducible white paint using blend catalyst (S331B1)
Component A: EX-1C
Component B: GI-1 of Example 8, TMPTA
Catalyst: TMGD/NaOH
Pigment: Tioxide

PAINT FORMULATION

| Raw Materials | Weight, g |
|---|---|
| Part I | |
| same as Part I of Example 12 | |
| Part II | |
| NaOH | 1.84 |
| DM water | 494.0 |
| Subtotal of Part II | 495.8 |
| Total of Part I + II | 2229.9 |

| Formula Properties | Part I | Part I + II |
|---|---|---|
| Solid, wt % | 45.7 | 35.6 |
| Viscosity (Zahn Cup 2), sec | 53 | 23 |
| Density, kg/L | 1.17 | 1.13 |
| pH | 8.7 | 9.0 |
| VOC (excluding water), lb/gal | 1.6 | 1.6 |
| Pigment/binder ratio by wt. | 38/62 | 38/62 |
| sag, mils | 12 | 8 |
| wet hiding power, ft²/gal | 800 | 800 |

The paint was sprayed on aluminum and cold-rolled steel (Bonderite 40) panels. Cured coatings with dry film thickness of 1 to 2 mils were obtained. Typical coatings film properties are shown in Table 6. Compared to Example 12 using TMGD/DBU blend catalyst, the paint of Example 13 using TMGD/NaOH blend catalyst gave coatings with much better gloss retention.

Example 14

Two-component NCO-free urethane/acrylic white latex paint (S366C1)
Component A: EX-2A, EX-1E
Component B: GI-54 of Example 4, TMPTA
Catalyst: TMGD/DBU
Pigment: Tioxide

PAINT FORMULATION

| Raw Materials | Weight, g |
|---|---|
| Part I | |
| EX-1E resin | 175.5 |
| TMGD | 6.1 |
| AMP-95 | 1.8 |
| DM water | 128.1 |
| Tioxide RCR60 | 336.9 |

Grind in a high speed disperser for 15 minutes to obtain a dispersion of Hergman 7. Then let down with the following materials:

| | |
|---|---|
| Rheolate 2000 | 23.4 |
| GI-54 of Example 4 | 76.0 |
| TMPTA | 57.2 |
| EX-2A | 580.0 |
| DM water | 50.9 |
| Subtotal of Part I | 1435.9 |
| Part II | |
| TMGD | 1.58 |
| DBU | 4.02 |
| DGM | 4.74 |
| DEA | 12.06 |
| DM water | 27.7 |
| subtotal of Part II | 50.10 |
| Total of Part I + II | 1486.0 |

| Formula Properties | Part I | Part I + II |
|---|---|---|
| Solid, wt % | 59.2 | 58.1 |
| Viscosity (Zahn Cup 2), sec | 35 | 27 |
| Density, kg/L | 1.26 | 1.25 |
| pH | 8.1 | 9.0 |
| VOC (excluding water), lb/gal | 1.2 | 1.5 |
| Pigment/binder ratio by wt. | 40/60 | 40/60 |
| sag, mils | — | — |
| wet hiding power, ft²/gal | 800 | 800 |

The paint was sprayed on aluminum and cold-rolled steel (Bonderite 40) panels. Cured coatings with dry film thickness of 1 to 2 mils were obtained. Typical coatings film properties are shown in Table 6.

Example 15

Two-component NCO-free urethane/acrylic white latex paint (S441B)
Component A: EX-2F, TMPTAcAc
Component B: GI-56 of Example 5, GI-54 of Example 4
Catalyst: TMGD
Pigment: Tioxide

PAINT FORMULATION

| Raw Materials | Weight, g |
|---|---|
| Part I | |
| GI-56 of Example 5 | 476.4 |
| TMGD | 13.8 |
| DM water | 666.0 |
| Tioxide RCR60 | 906.8 |

Grind in a high speed disperser for about 15 minutes to obtain a dispersion of Hergman 7. Then let down with the following materials:

| | |
|---|---|
| TMPTAcAc | 217.0 |
| GI-54 of Example 4 | 210.3 |
| EX-2F | 1344.0 |
| Subtotal of Part I | 3834.5 |
| Part II | |
| TMGD | 11.0 |
| DGM | 33.0 |
| DM water | 221.0 |
| subtotal of Part II | 265.0 |
| Total of Part I + II | 4099.5 |

| Formula Properties | Part I | Part I + II |
|---|---|---|
| Solid, wt % | 57.5 | 53.7 |
| Viscosity (Zahn Cup 2), sec | — | 26 |
| Density, kg/L | 1.25 | 1.24 |
| pH | — | 9.0 |
| VOC (excluding water), lb/gal | — | 1.4 |
| Pigment/binder ratio by wt. | 41/59 | 41/59 |
| sag, mils | — | 8 |
| wet hiding power, ft²/gal | — | 1100 |

The paint was sprayed on aluminum and cold-rolled steel (Bonderite 40) panels. Cured coatings with dry film thickness of 1 to 2 mils were obtained. Typical coatings film properties are shown in Table 6.

Example 16

Two-component black latex paint with low VOC (S499B)
Component A: EX-2F
Component B: GI-88 of Example 7, TMPTA, PETA
Catalyst: TMGD/NaOH
Pigment: Carbon black

PAINT FORMULATION

| Raw Materials | Weight, g |
|---|---|
| Part I | |
| GI-88 of example 7 | 57.4 |
| TMGD | 0.76 |
| EDGM | 2.9 |
| DM water | 73.8 |
| Patcote 519 (defoamer) | 0.081 |
| Monarch 120 (Carbon black) | 10.1 |

Grind in a high speed disperser for about 15 minutes. Shift to a sandmill and mill to obtain a dispersion of Hergman 7. Then let down with the following materials:

| | |
|---|---|
| EX-2F | 565.4 |
| TMPTA | 30.6 |
| PETA | 15.5 |
| Texanol | 8.7 |
| Acrysol RM1020 | 3.0 |
| DM water | 9.0 |
| 4 wt % NaOH in water | 19.0 |
| BYK 346 | 2.0 |
| Surfynol 104/EDGM (1:1) | 3.0 |
| BYK-VP-020 | 1.0 |

|  |  |
|---|---|
| Patcote 519 (defoamer) | 0.7 |
| Subtotal of Part I | 802.9 |
| Part II | |
| TMGD | 1.20 |
| EDGM | 4.8 |
| DM water | 24.0 |
| Subtotal of Part II | 30.0 |
| Total of Part I + Part II | 832.9 |

| Formula Properties | Mixture of Part I + Part II |
|---|---|
| Solid, wt % | 43.2 |
| Viscosity (Zahn Cup 2), sec | 20 |
| pH | 9.6 |
| VOC (excluding water), lb/gal | 0.9 |
| Pigment/binder ratio by wt. | 2.9/100 |
| sag, mils | 10 |
| wet hiding power, ft²/gal | 1000 |

The paint was drawn down on aluminum and cold-rolled steel (Bonderite 40) panels. Cured coatings with dry film thickness of about 1 mil were obtained. Typical coatings film properties are shown in Table 7.

TABLE 7

Typical film properties of the two-component NCO-free urethane/acrylic water-borne black paints (Examples 16 and 17).

|  | Example # | |
|---|---|---|
|  | 16 | 17 |
| Paint # | S499B | S494A |
| Initial gloss (600/200) | 85/70 | 87/76 |
| MEK double rub | 80 | >200 |
| Pencil hardness | H | 2H |
| Sward hardness number | — | 32 |
| Impact resistance, lb-in, direct | — | 16 |
| Flexibility | ¹⁄₁₆" | ½" |
| Adhesion, aluminum | good | good |
| steel | good | good |

Example 17

Two-component NCO-free urethane/acrylic water-reducible black paint (S494A)
Component A: TMPTAcAc
Component B: GI-88 of Example 7, GI-78 of Example 9, GI-54 of Example 4
Catalyst: TMGD
Pigment: Carbon black

PAINT FORMULATION

| Raw materials | Weight, g |
|---|---|
| Part I | |
| GI-88 of example 7 | 97.3 |
| TMGD | 1.29 |
| EDGM | 4.94 |
| DM water | 125.1 |
| Patcote 519 (defoamer) | 0.137 |
| Monarch 120 | 17.15 |
| (Carbon black) | |

Grind in a high speed disperser for about 15 minutes. Shift to a sandmill and mill to obtain a dispersion of Hergman 7. Then let down with the following materials:

|  |  |
|---|---|
| GI-78 of Example 9 | 296.0 |
| GI-54 of Example 4 | 346.0 |
| Patcote 519 | 1.0 |
| TMPTAcAc | 75.7 |
| TMGD | 18.4 |
| EDGM | 61.4 |
| DM water | 803.0 |
| BYK 301 | 4.0 |
| BYK 346 | 5.0 |
| Subtotal of Part I | 1856.5 |
| Part II | |
| TMGD | 3.2 |
| EDGM | 29.0 |
| DM water | 74.0 |
| Subtotal of Part II | 104.2 |
| Total of Part I + Part II | 1960.6 |

| Formula Properties | Mixture of Part I + Part II |
|---|---|
| Solid, wt % | 31.2 |
| Viscosity (Zahn Cup 2), sec | 20 |
| PH | 8.4 |
| VOC (excluding water), lb/gal | 2.9 |
| Pigment/binder ratio by wt. | 2.9/100 |
| sag, mils | 12 |
| wet hiding power, ft²/gal | 1000 |

The paint was sprayed on aluminum and cold-rolled steel (Bonderite 40) panels. Cured coatings with dry film thickness of 1 to 2 mils were obtained. Typical coatings film properties are shown in Table 7.

EMBODIMENT II

Examples 18 to 28

Preparation of NCO-free water-dispersible acrylated urethane acrylic (WDAUA) resins.

The WDAUA resins with different properties were obtained by tailor-designing the acrylic backbone using different acrylic monomers and the pendant acrylated urethane segments using different polyisocyanates and hydroxyl functional (meth)acrylates.

Preparation of Backbone Acrylic Polyols

A suitable four-neck 2-liter flask equipped with an agitator and a condenser was used as the reaction vessel. The raw materials used are shown in Table 8. The reactor was charged with Reactor Charge (RC) shown in Table 8. The reactor content was purged with dry nitrogen and a nitrogen blanket was maintained during the whole reaction period. The reactor was heated to the desired reaction temperatures, and the Monomer Mixture (MM) was fed into the reactor over four hours. The reaction temperature was increased by 5° C. after all the MM had been fed into the reactor, and the heating was continued for another two hours before cooling to stop the reaction. While cooling, the Post Addition (PA) was added, and the reactor was purged with dry air. Typical properties of the obtained water-dispersible acrylic polyol resins are shown in Table 8.

TABLE 8

Recipes for the Water-Dispersible Backbone Acrylic Polyols

| Raw materials | A (GW46) | B (GW74) | C (GW76) | D (GW78) | E (GW80) |
|---|---|---|---|---|---|
| Reactor Charge (RC) | | | | | |
| EDGM | 240.0 | 240.0 | 240.0 | 360.0 | 360.0 |
| Monomer Mixture (MM) | | | | | |
| MMA | 0 | 0 | 80.6 | 120.7 | 0 |
| BMA | 311.6 | 251.0 | 251.0 | 376.0 | 376.0 |
| St | 91.2 | 91.0 | 91.0 | 158.7 | 271.5 |
| 2-EHMA | 91.2 | 0 | 0 | 0 | 80.0 |
| BA | 0 | 200.0 | 120.0 | 179.8 | 0 |
| HEMA | 228.0 | 150.0 | 150.0 | 224.7 | 312.0 |
| AA | 26.6 | 52.5 | 52.0 | 63.1 | 78.1 |
| MAA | 15.0 | 20.0 | 20.0 | 23.9 | 30.0 |
| L-555M60 | 63.6 | 63.6 | 63.5 | 96.2 | 96.0 |
| MEO | 0.30 | 0.30 | 0.30 | 0.50 | 0.5 |
| Post Addition (PA) | | | | | |
| 3 wt % MEHQ in EDGM | 1.5 | 1.7 | 1.7 | 2.6 | 2.6 |
| NMP | 0 | 0 | 0 | 0 | 99.7 |
| Reaction Temperature °C. | 138 | 145 | 145 | 142 | 142 |
| Resin Properties: | | | | | |
| Solid, wt % | 75.0 | 75.0 | 75.0 | 75.0 | 70.6 |
| OH EW (solid) | 457 | 696 | 718 | 697 | 502 |
| Acid Value (solid) | 38.0 | 66.7 | 66.8 | 53.8 | 66.5 |
| Color (Gardner) | <1 | <1 | <1 | <1 | <1 |
| Viscosity (Gardner) | Z7 | Z5 | Z7 | Z6.5 | Z7 |

Preparation of the Water-Dispersible Acrylated Urethane Acrylic Resins (WDAUA) of the Present Invention (Examples 18 to 28)

A 2-liter reactor equipped with a stirrer, a reflux condenser, a thermometer and a dropping funnel was charged with the Polyisocyanate shown in Table 9, 0.025 g MEHQ and 0.07 g T-12 at room temperature. The reactor charge was purged with dry air, heated to and maintained at 60° C. The Hydroxyl Monomer in Table 9 was fed into the reactor over 75 minutes under a dry air atmosphere. The reaction temperature was held at 60° C. until the NCO content of the reaction mixture reached the theoretical values. Then the BackAcry Polyol (the backbone acrylic resins A to E prepared previously) was added over 10 minutes for grafting. The reaction temperature was raised to and held at 83° C. until 95% of the remaining NCO (before introducing the backbone acrylic) had been reacted or when the NCO content reached 0.1 wt. %. The reaction mixture was then cooled to 60° C. and the amount of methanol shown in Table 9 was added to stop the grafting. An additional 7.0 g of DMM was added in Examples 27 and 28 to reduce the resin viscosity. The properties of WDAUA resins are shown in Tables 10A and 10B. The colorless WDAUA resins have high solid contents, and they are suitable for formulating low VOC coatings.

TABLE 9

Raw Materials for Preparing the WDAUA Resins

| | Raw materials, grams | | | | | | |
|---|---|---|---|---|---|---|---|
| | Polyisocyanate | | | Hydroxy monomer | | BackAcry | |
| Resin # | IPDI | HDI | HDI-T | HPA | TM-100 | Polyol | MeOH |
| EX-B/GI-122 | 209.1 | 0 | 0 | 179.0 | 0 | B/606.7 | 6.1 |
| EX-9/GI-124 | 0 | 179.6 | 0 | 207.3 | 0 | C/604.9 | 8.0 |
| EX-10/GI-118 | 0 | 179.5 | 0 | 207.3 | 0 | B/604.9 | 8.0 |
| EX-11/GI-128 | 152.2 | 0 | 0 | 0 | 301.2 | C/539.7 | 6.9 |
| EX-12/GI-130 | 152.5 | 0 | 0 | 0 | 302.0 | B/538.5 | 6.9 |
| EX-13/GI-168 | 0 | 184.7 | 0 | 211.1 | 0 | D/597.0 | 7.6 |
| EX-14/GI-174 | 0 | 0 | 366.8 | 235.6 | 0 | D/392.9 | 5.2 |
| EX-15/GI-176 | 0 | 230.1 | 0 | 262.1 | 0 | A/499.1 | 8.6 |
| EX-16/GI-178 | 158.3 | 0 | 0 | 0 | 313.5 | D/522.3 | 5.8 |
| EX-17/GI-180 | 178.5 | 0 | 0 | 0 | 353.3 | E/454.3 | 7.0 |
| EX-18/GI-184 | 0 | 0 | 283.8 | 140.2 | 111.4 | E/452.0 | 5.5 |

TABLE 10A

Properties of water-dispersible acrylated urethane acrylic resins

| Resin # | EX-18 GI-122 | EX-19 GI-124 | EX-20 GI-118 | EX-21 GI-128 | EX-22 GI-130 |
|---|---|---|---|---|---|
| Backbone Tg, °C. | 15 | 33 | 15 | 33 | 15 |
| Side chain hardness | hard | soft-1 | soft-1 | soft-2 | soft-2 |
| hardness rating | 5 | 4 | 3 | 2 | 1 |
| Gardner color | <1 | <1 | <1 | <1 | <1 |
| Gardner Viscosity | Z9 | Z7 | Z6 | Z8 | Z7 |
| solid content, wt % | 84.3 | 84.1 | 84.1 | 85.8 | 85.8 |
| MW | 8231 | 14207 | 13614 | 12908 | 12237 |
| Mn | 1845 | 5333 | 5323 | 4060 | 4255 |
| Based on resin solid: | | | | | |
| Acid value, mgKOH/g | 36.1 | 36.0 | 36.0 | 31.5 | 31.3 |
| C=C equivalent weight | 528 | 603 | 527 | 980 | 977 |
| VOC, lb/gal | 1.40 | 1.42 | 1.42 | 1.28 | 1.28 |

TABLE 10B

Properties of water-dispersible acrylated urethane acrylic resins

| Resin # | EX-23 GI-168 | EX-24 GI-174 | EX-25 GI-176 | EX-26 GI-178 | EX-27 GI-180 | EX-28 GI-184 |
|---|---|---|---|---|---|---|
| Gardner color | <1 | <1 | <1 | <1 | <1 | <1 |
| Gardner Viscosity | Z6.5 | Z10 | Z6.2 | Z8.3 | Z8.3 | Z7.8 |
| solid content, wt % | 84.3 | 89.7 | 85.9 | 86.4 | 8S.0 | 85.2 |
| MW | 17618 | 23950 | 19348 | 13063 | 17175 | — |
| Mn | 5849 | 4338 | 2639 | 3714 | 3838 | — |
| Based on resin solid: | | | | | | |
| Acid value, mgKOH/g | 28.5 | 17.7 | 16.2 | 24.4 | 25.1 | 24.7 |
| C=C equivalent weight | 520 | 495 | 426 | 948 | 828 | 608 |
| VOC, lb/gal | 1.40 | 0.93 | 1.26 | 1.22 | 1.34 | 1.32 |

Comparative Example 1

Preparation of a WDAUA using a diisocyanate (IPDI) and an inappropriate OH/NCO ratio in the capping stage.

The procedure was the same as in Example 18, except that 123 g of HPA and 870 g of backbone acrylic polyol resin B were used. The OH/NCO ratio of HPA to IPDI was 0.50, a stoichiometry ratio for capping which statistically provides every diisocyanate molecule with a HPA to theoretcially result a single remaining NCO group for later grafting, instead of the ratio 0.73 used in Example 18. The reaction mixture gelled during the cooking after introducing the backbone acrylic polyol B for grafting.

Comparative Example 2

Preparation of a WDAUA using a diisocyanate (HDI) and an inappropriate OH/NCO ratio in the capping stage.

The procedure was the same as in Example 19, except that 139 g of HPA and 1025 g of backbone acrylic polyol resin C were used. The OH/NCO ratio of HPA to HDI was 0.50 instead of 0.75 in Example 20. The reaction mixture gelled during the cooking after introducing the backbone acrylic polyol C for grafting.

Comparative Example 3

Preparation of a WDAUA using a triisocyanate (HDI-T) and an inappropriate OH/NCO ratio in the capping stage.

The procedure was the same as in Example 24, except that 191 g of HPA and 664 g of acrylic polyol resin D were used. The OH/NCO ratio of HPA to HDI-T was 0.67, a stoichiometry ratio for capping which statistically provides every triisocyanate molecule with 2 HPA to theorectically result in a single NCO group remaining for later grafting, instead of the ratio 0.83 used in Example 24. Gelled product was obtained after introducing backbone acrylic polyol D for grafting.

Examples 29 to 33

Water-borne Michael reaction curable compositions (clear coatings).

Water dispersions of the water-dispersible acrylated urethane acrylic resins (WDAUA) were prepared by first neutralizing the WDAUA resins with 1,1,3,3-tetramethyl-guanidine (TMGD) and then gradually adding deionized water to the neutralized resins under agitation until the desired solid content and viscosity were achieved. Table 11 shows the properties of the water dispersions prepared from the WDAUA resins of Examples 18 to 23. The stability of the aqueous dispersions are fairly good since they could stand for more than 8 hours at 75° C. without phase separation. LT in Table 11 represents the appearance of a dispersion as judged by the naked eye and is a rough indication of particle size of the dispersion.

LT=0: clear homogeneous solutions;
LT>0 to 2.0: almost clear dispersions;
LT>2 to 6: translucent dispersions;
LT>7: milky white emulsions;
LT>10: unstable emulsions.

The dispersions EX-29WD to EX-33WD shown in Table 11 have low VOC (<1.4 lb/gal) and can form clear gloss films without the addition of any coalescent aiders.

TMPTAcAc was used as a crosslinker to formulate 2-component water-borne coatings. Table 12 shows the properties of the 2-component acrylic urethane water-borne coatings prepared. The coatings have low VOC (<1.2 lb/gal) and a long pot-life (>24 hrs). Coating films of 3 mils wet thickness were applied on aluminum and Bonderite 40 cold rolled steel panels and allowed to cure at room temperatures for 10 days. The properties of the cured dry films are shown in Table 12. The gloss of the clear coatings is rated with numbers from 1 to 10 with 10 being the best.

were mixed together. Usually, the viscosity of the mixed aqueous dispersions increases a little after 24 hours but is easily reduced to a desired value simply by adding more water. Properties of the coating films applied within 24 hours are the same.

TABLE 13

Properties of the 2-pack WDAUA clear water-borne coatings against pot-life

| | coatings # | | | |
|---|---|---|---|---|
| | EX-31 | | EX-29 | |
| pot-life, hr | 0 | 24 | 0 | 24 |
| viscosity, sec | 40 | 60 | 20 | 40 |
| LT | 7.0 | 7.0 | 5.5 | 6.0 |
| gloss | 10 | 10 | 10 | 10 |

TABLE 11

Water dispersions of acrylated urethane acrylic resin using TMGD as neutralizer

| dispersion # | EX-29WD S542A | EX-30WD S548A | EX-31WD S541A | EX-32WD S583A | EX-33WD S584A |
|---|---|---|---|---|---|
| WDAUA resin used | EX-18 | EX-19 | EX-20 | EX-21 | EX-22 |
| Degree of neutral % | 89 | 90 | 88 | 89 | 90 |
| Solid, wt % | 28.8 | 29.5 | 29.0 | 29.0 | 28.3 |
| Viscosity (Zahn#2) | 60 | 40 | 40 | 50 | 60 |
| pH | 9.83 | 9.73 | 9.84 | 9.90 | 9.63 |
| LT | 0.5 | 6.0 | 5.0 | 0.2 | 0.2 |
| VOC, lb/gal | 1.32 | 1.33 | 1.33 | 1.20 | 1.20 |
| Heat aging stability (75° C./8 hours) | pass | pass | pass | pass | pass |

TABLE 12

Two-pack WDAUA clear water-borne coatings

| coatings # | EX-29 S544A | EX-30 S549A | EX-31 S543A | EX-32 S586A | EX-33 S587A |
|---|---|---|---|---|---|
| Part I: 100pbw | EX-29WD | EX-30WD | EX-31WD | EX-32WD | EX-33WD |
| Part II: TMPTAcAc | 6.0 | 6.0 | 6.0 | 3.5 | 3.4 |
| C=C/AcAc mol ratio | 1.04 | 1.22 | 1.20 | 1.10 | 1.10 |
| VOC, lb/gal | 1.15 | 1.16 | 1.16 | 1.10 | 1.10 |
| pot-life, hr | 24 | 24 | 24 | 24 | 24 |
| solid, wt % | 34.7 | 35.4 | 34.9 | 32.5 | 31.7 |
| FILM PROPERTIES (air dry for 10 days) | | | | | |
| gloss (1-10) | 10 | 10 | 10 | 10 | 10 |
| MEK double rub | 100+ | 100 | 100+ | 100 | 100 |
| Hardness, pencil | 2H | H | H | F | HB |
| Sward Rocker | 34 | 16 | 14 | 10 | 8 |
| Impact, lb-in, dir | 16 | 140 | 100 | 100 | 80 |
| rev | 4 | 100 | 100 | 100 | 100 |

Example 34

Long pot-life of the 2-pack WDAUA Michael reaction-curable coatings.

The coating dispersion properties of Examples 29 and 31 were measured 24 hours after the TMPTAcAc crosslinker had been mixed in and coatings films were applied, and the film properties determined after 10 days of air drying. The results are shown in Table 13. The properties of the coatings changed little 24 hours after the two parts of the coatings

TABLE 13-continued

Properties of the 2-pack WDAUA clear water-borne coatings against pot-life

| | coatings # | | | |
|---|---|---|---|---|
| | EX-31 | | EX-29 | |
| pot-life, hr | 0 | 24 | 0 | 24 |
| MEK double rub | 200+ | 200+ | 100+ | 100+ |
| Hardness | H | H | 2H | 2H |

Example 35

Water-borne Michael reaction-curable composition (a white pigmented coating).

A two-pack water-borne Michael reaction curable white paint based on the WDAUA resin of Example 19 was prepared according to formulation S582A shown in Table 14. Coating films were sprayed on aluminum and cold rolled steel panels and allowed to air dry at room temperatures for 7 days before measuring film properties. The low VOC (0.96 lb/gal) paint gave good film properties such as high gloss, good solvent resistance and impact resistance as shown in Table 15.

TABLE 14

Formulation (S582A) of 2-pack WDAUA white coatings based on the WDAUA resin of Example 19

| raw materials | g | ml |
|---|---|---|
| PART I | | |
| WDAUA resin of Example 2 | 70.6 | 66.0 |
| TMGD | 4.0 | 4.35 |
| BYK035 | 0.14 | 0.14 |
| water | 125.3 | 125.3 |
| mixed in HSD at low speed for 15 min, then | | |
| TiO2 sifted in | 203.0 | 50.75 |
| grind at high speed for 20 min then let down with | | |
| WDAUA resin of Example 2 | 201.5 | 188.3 |
| TMGD | 11.3 | 12.28 |
| BYK035 | 0.14 | 0.4 |
| water | 357.7 | 357.7 |
| BYK 346 | 3.0 | 3.0 |
| Part I subtotal | 976.9 | 808.22 |
| PART II | | |
| TMPTAcAc | 57.3 | 48.97 |

TABLE 14-continued

| BYK 346 | 3.0 | 3.0 |
|---|---|---|
| Part II subtotal | 60.3 | 51.97 |
| Total Part I + Part II | 1037.3 | 860.19 |
| Formulation constants of Part I + Part II mixture: | | |
| Density: | 1.206 g/ml | |
| solid | 49.3 wt % | |
| pigment/binder: | 70.9 wt % | |
| PVC: | 16.5 % | |
| TMGD/Binder: | 5.35 wt % | |
| C=C/AcAc ratio: | 1.02 | |
| VOC (exclude H$_2$O): | 0.96 lb/gal | |
| pH: | 8.93 | |
| Viscosity: | 49 sec | |
| hiding: | 1100 ft$^2$/gal | |
| sag: | 6 mils | |

TABLE 15

Film properties of S582A white coatings

| gloss, 60/20 degree, | 85/72 |
|---|---|
| MEK double rub | 200+ |
| Hardness, pencil | H |
| Sward Rocker | 24 |
| Impact resistance, lb-in | |
| direct | 140 |
| reverse | 120 |

Example 36

Preparation of water dispersions of WDAUA resins

Water dispersions of WDAUA resins were prepared according to the formulations given in Table 16. TMGD or DBU was used both as neutralizing agent and the catalyst for Michael reaction cure. A 2 liter stainless steel vessel equipped with a high speed disperser was loaded with the WDAUA resin to be dispersed. The neutralizer (TMGD or DBU) and the defoamer BYK035 were added and mixed at low medium speed for about 5 minutes. The mixing speed was increased to medium high speed, and the deionized water was added slowly over 20 minutes. The agitation was reduced to low speed, and mixing was continued for another 20 minutes. The dispersions were allowed to stand overnight before measuring their physical properties. The acrylated urethane acrylic water dispersions prepared are stable and have the properties shown in Table 16.

TABLE 16

Michael reaction- curable water dispersions of WDAUA resins

| coatings # | EX-36A S612A | EX-36B S618A | EX-36C S623A | EX-36D S626A | EX-36E S631A |
|---|---|---|---|---|---|
| Raw materials, g | | | | | |
| Resin of Example 21 | 0 | 0 | 0 | 0 | 207.0 |
| Resin of Example 23 | 434.8 | 557.2 | 0 | 0 | 0 |
| Resin of Example 24 | 0 | 0 | 0 | 0 | 219.0 |
| Resin of Example 26 | 0 | 0 | 447.9 | 0 | 0 |
| Resin of Example 27 | 0 | 0 | 17.4 | 547.6 | 16.8 |
| TMGD | 19.3 | 0 | 0 | 21.6 | 0 |
| DBU | 0 | 33.5 | 0 | 0 | 0 |
| BYK035 | 0.6 | 0.8 | 0.6 | 0.6 | 0.6 |
| DI water | 882.3 | 1044.5 | 920.7 | 1133.7 | 659.0 |
| Total | 1337.0 | 1636.0 | 1386.0 | 1703.5 | 1103.1 |
| Dispersion properties: | | | | | |
| solid content, wt % | 27.4 | 28.7 | 27.9 | 27.3 | 34.0 |
| water content, wt % | 66.0 | 63.8 | 66.4 | 66.6 | 59.7 |
| density, g/ml | 1.020 | 1.023 | 1.021 | 1.020 | 1.025 |
| neutralization, % | 90.1 | 90.0 | 90.0 | 90.0 | 90.0 |
| C=C EW on solid | 520 | 520 | 948 | 828 | 647 |
| VOC, g/100 g solid | 18.6 | 18.6 | 15.7 | 17.6 | 13.9 |
| pH | 9.8 | 9.7 | 9.9 | 9.9 | 9.4 |
| LT | 3 | 5 | (3)* 3 | 3 | 3 |
| Viscosity, | | | | | |
| Zahn Cup 2, sec | 82 | −(28)* | 29 | 70 | 30 |
| Brookfield**, cps | 500 | 5000(180)* | 200 | 450 | 350 |

*data in are for EX-36B dispersion diluted with more water to 21.8 wt % solid.
**spindle #3, 10 rpm Example 37

Water-borne Michael reaction-curable composition (a white paint based on WDAUA resin of Example 23).

A two-pack water-borne Michael reaction-curable white paint based on the WDAUA resin of Example 23 was prepared from the dispersion EX-36A according to the formulation (S615A) shown in Table 17. The crosslinking agent, TMPTAcAc, is included in Part II of the formulation. Coating films were sprayed on aluminum and cold rolled steel panels. Film properties were measured after air dry at room temperature for 7 days. The low VOC paint gave good film properties such as high gloss, good solvent resistance and impact resistance as shown in Table 18.

TABLE 17

Formulation (S615A) of 2-pack WDAUA white coatings based on the WDAUA resin of Example 23.

| raw materials | g | ml |
|---|---|---|
| PART I | | |
| EX-36A WDAUA dispersion mixed in HSD at low speed and sifted in | 213.0 | 208.8 |
| Tioxide TR63 | 200.0 | 50.0 |
| grind at high speed for 20 min to obtain a Hergmen dispersion of 7 and then let down with | | |
| EX-36A dispersion | 690.0 | 676.5 |
| BYK 346 | 3.6 | 3.6 |
| Part I subtotal | 1106.6 | 938.9 |
| PART II | | |
| TMPTAcAc | 61.8 | 53.3 |

TABLE 17-continued

| BYK 346 | 3.2 | 3.6 |
|---|---|---|
| Part II subtotal | 65.0 | 56.5 |
| Total Part I + Part II | 1171.6 | 995.4 |
| Total excluding water | 575.6 | 399.4 |
| Formulation constants of Part I + Part II mixture: | | |
| Density: | 1.177 g/ml | |
| solid: | 43.4 wt % | |
| pigment/binder: | 64.7 wt % | |
| PVC: | 15.2 % | |
| TMGD/Binder: | 4.22 wt % | |
| C=C/AcAc ratio: | 1.0 | |
| VOC (exclude H₂O): | 0.96 lb/gal | |
| pH: | 9.3 | |
| viscosity: | 40 sec (Zahn Cup 2) | |
| Hiding: | 880 ft²/gal | |
| sag: | 6 mils | |

TABLE 18

Film properties of WDAUA coatings using TMPTAcAc as crosslinking agent

| Coatings # | Example # | | | | | |
|---|---|---|---|---|---|---|
| | 37<br>S651A | 38<br>S621B | 39<br>S629A | 40<br>S625D | 41<br>S634B | 42<br>S635B |
| Color | white | red | clear* | blue | blue | white |
| dry film thickness, mil | 1.7 | 1.4 | 1.5 | 1.0 | 1.2 | 1.2 |
| adhesion (1 to 10, 10 best) | | | | | | |
| aluminum | 10 | 10 | 10 | 10 | 10 | 10 |
| steel | 10 | 10 | 10 | 10 | 10 | 10 |
| gloss, 60/20 degree, | 88/79 | 88/81 | 88/80 | 86/76 | 88/79 | 88/80 |
| MEK double rub | 160 | 200+ | 200+ | 200 | 200+ | 200+ |
| Hardness, pencil | 2H | 2H | 2H | H | 2H | 2H |
| Sward Rocker | 48 | 48 | 46 | 40 | 46 | 48 |
| Impact resistance, lb-in | | | | | | |
| direct | 160 | 160 | 28* | 140 | 140 | 140 |
| reverse | 100 | 120 | 4 | 140 | 140 | 120 |

*Clear coatings on a brown epoxy primer which is in turn applied on cold rolled steel panel. The impact resistance of the whole coating system is limited by the epoxy primer.

Example 38

Water-borne Michael reaction-curable composition (a red paint based on WDAUA resin of Example 23).

A two-pack water-borne Michael reaction-curable red paint based on the WDAUA resin of Example 23 was prepared from the dispersions EX-36B and EX-36A according to the formulation (S621B) shown in Table 19. TMPTAcAc was used as the crosslinking agent and put in Part II of the formulation. Coating films were spray applied on aluminum and cold rolled steel panels. Film properties were measured after 7 days of drying at room temperature. The low VOC paint gave good film properties such as high gloss, good solvent resistance and impact resistance as shown in Table 18.

TABLE 19

Formulation (S621B) of 2-pack WDAUA red coatings based on the WDAUA resin of Example 23

| raw materials | g | ml |
|---|---|---|
| PART I | | |
| EX-36A WDAUA dispersion | 205.8 | 201.2 |
| mixed in HSD at low speed and sifted in | | |
| Per-Orange-RL-70 | 39.4 | 27.7 |
| NOVO-Red-F3RK70 | 1.4 | 1.0 |
| Violet-228-5199 | 1.1 | 1.0 |
| Tioxide TR63 | 10.8 | 2.7 |
| grind at high speed for 20 min, diluted with | | |
| Deionized water | 15.3 | 15.3 |
| grind in a sandmill for 20 minutes to obtain | | |
| a Hergmen dispersion of 7 and then let | | |
| down with | | |
| EX-36B dispersion | 1463.4 | 1430.5 |
| EX-36A dispersion | 380.8 | 373.3 |
| Deionized water | 160.0 | 160.0 |
| Part I subtotal | 2278.0 | 2212.7 |
| PART II | | |
| TMPTAcAc | 104.3 | 91.3 |
| BYK 346 | 10.8 | 10.8 |

TABLE 19-continued

| Part II subtotal | 115.1 | 102.1 |
|---|---|---|
| Total Part I + Part II | 2393.1 | 2314.8 |
| Total excluding water | 917.4 | 839.1 |

Formulation constants of Part I + Part II mixture:

| | |
|---|---|
| Density: | 1.034 g/ml |
| solid | 30.9 wt % |
| pigment/binder: | 7.7 wt % |
| PVC: | 4.9 % |
| DBU/Binder: | 4.97 wt % |
| TMGD/Binder: | 0.80 wt % |
| C=C/AcAc ratio: | 1.4 |
| VOC (exclude H$_2$O) | 1.08 lb/gal |
| pH: | 9.3 |
| Viscosity: | 2400 cps, (Brookfield, spindle 3, 10 rpm) |
| Hiding: | 510 ft$^2$/gal |
| sag: | >12 mils |

Example 39

Water-borne Michael reaction-curable composition (a clear coating based on WDAUA resin of Example 23).

A two-pack water-borne Michael reaction-curable clear coating based on the WDAUA resin of Example 23 was prepared from the dispersion EX-36A according to the formulation (S629A) shown in Table 20. TMPTAcAc was used as the crosslinking agent in Part II of the formulation. Coating films were spray applied on a brown epoxy primer which was in turn spray applied on aluminum and cold rolled steel panels. The clear coatings were applied about 2 hours after the application of the primer. Coating film properties were measured after 7 days of air drying at room temperature. The clear topcoat/primer system showed excellent inter-coat adhesion and gave good film properties such as high gloss and good solvent resistance as shown in Table 18. The impact resistance of the coating system is low because the epoxy primer used has lower impact resistance.

TABLE 20

Formulation (S629A) of 2-pack WDAUA clear coatings based on the WDAUA resin of Example 23

| raw materials | g | ml |
|---|---|---|
| PART I | | |
| EX-36A WDAUA dispersion | 285.2 | 279.6 |
| Part I subtotal | 285.2 | 279.6 |
| PART II | | |
| TMPTAcAc | 14.0 | 12.3 |
| BYK 346 | 1.6 | 1.6 |
| Part II subtotal | 15.6 | 13.9 |
| Total Part I + Part II | 300.8 | 293.5 |
| Total excluding water | 112.6 | 105.3 |
| Formulation constants of Part I + Part II mixture: | | |
| Density: | 1.025 g/ml | |
| solid: | 30.6 wt % | |
| TMGD/Binder: | 4.47 wt % | |
| C=C/AcAc ratio: | 1.4 | |
| VOC (exclude H$_2$O): | 1.15 lb/gal | |
| pH: | 9.3 | |
| viscosity: | 34 sec (Zahn Cup 2) | |
| sag: | 6 mils | |

Example 40

Water-borne Michael reaction-curable composition (a blue paint based on WDAUA resin of Example 26).

A two-pack water-borne Michael reaction-curable blue paint based on the WDAUA resin of Example 26 was prepared from the dispersion EX-36C according to the formulation (S625D) shown in Table 21. TMPTAcAc was used as the crosslinking agent and put in Part II of the formulation. Coating films were spray applied on aluminum and cold rolled steel panels. Film properties were determined after 7 days of air drying at room temperature. The low VOC paint gave good film properties such as high gloss, good solvent resistance and impact resistance as shown in Table 18.

TABLE 21

Formulation (S625D) of 2-pack WDAUA blue coatings based on the WDAUA resin of Example 26

| raw materials | g | ml |
|---|---|---|
| PART I | | |
| EX-36C WDAUA dispersion | 200.0 | 195.9 |
| mixed in HSD at low speed and shifed in | | |
| Tioxide TR63 | 43.0 | 10.8 |
| Graph Blue 6830-0 | 39.7 | 24.8 |
| grind at high speed for 20 min, diluted with | | |
| Deionized water | 35.0 | 35.0 |
| grind in a sandmill for 20 minutes to obtain | | |
| a Hergmen dispersion of 7 and then let | | |
| down with | | |
| EX-36C dispersion | 2138.7 | 2094.7 |
| Part I subtotal | 2456.4 | 2350.4 |
| PART II | | |
| TMPTAcAc | 65.0 | 56.5 |
| BYK 346 | 6.8 | 6.8 |
| EDGM | 57.9 | 60.0 |

TABLE 21-continued

| Deionized water | 119.8 | 119.8 |
|---|---|---|
| Part II subtotal | 249.5 | 243.1 |
| Total Part I + Part II | 2705.9 | 2593.5 |
| Total excluding water | 998.7 | 886.3 |
| Formulation constants of Part I + Part II mixture: | | |
| Density: | 1.043 g/ml | |
| solid: | 26.5 wt % | |
| pigment/binder: | 11.5 wt % | |
| PVC: | 5.1 % | |
| TNGD/Binder: | 4.09 wt % | |
| C=C/AcAc ratio: | 1.38 | |
| VOC (exclude H$_2$O): | 1.51 lb/gal | |
| pH: | 9.4 | |
| viscosity: | 41 sec (Zahn Cup 2) | |
| Hiding: | 700 ft$^2$/gal | |
| sag: | 8 mils | |

Example 41

Water-borne Michael reaction-curable composition (a blue paint based on WDAUA resin blend of Examples 21, 24 and 26).

This example demonstrates blends of the WDAUA resins can be used to formulate two-pack water-borne Michael reaction-curable coatings with excellent properties. A blue paint based on a WDAUA resin blend of Examples 21, 24 and 26 was prepared from the dispersions EX-36C and E according to the formulation (S634B) shown in Table 22. TMPTAcAc was used as the crosslinking agent and was put in Part II of the formulation. Coating films were spray applied on aluminum and cold rolled steel panels and their properties were measured after 7 days of air drying at room temperature. The low VOC paint gave good film properties such as high gloss, good solvent resistance and impact resistance as shown in Table 18.

TABLE 22

Formulation (S634B) of 2-pack WDAUA blue coatings based on the WDAUA resin blend of Example 21, 24 and 26

| raw materials | g | ml |
|---|---|---|
| PART I | | |
| EX-36C WDAUA dispersion | 100.0 | 98.0 |
| mixed in HSD at low speed and sifted in | | |
| Tioxide TR63 | 21.5 | 5.4 |
| Graph Blue 6830-0 | 19.9 | 12.4 |
| grind at high speed for 20 min, diluted with | | |
| Deionized water | 17.5 | 17.5 |
| grind in a sandmill for 20 minutes to obtain | | |
| a Hergmen dispersion of 7 and then let | | |
| down with | | |
| EX-36E dispersion | 2647.5 | 2582.9 |
| Texanol | 26.5 | 27.9 |
| BYK 346 | 13.2 | 13.2 |
| Part I subtotal | 2846.1 | 2757.3 |
| PART II | | |
| TMPTAcAc | 141.6 | 122.1 |
| Part II subtotal | 141.6 | 122.1 |
| Total Part I + Part II | 2987.7 | 2879.4 |
| Total excluding water | 1340.8 | 1232.5 |
| Formulation constants of Part I + Part II mixture: | | |
| Density: | 1.038 g/ml | |

TABLE 22-continued

| | |
|---|---|
| solid: | 37.2 wt % |
| pigment/binder: | 3.9 wt % |
| PVC: | 2.1 % |
| TMGD/Binder: | 3.89 wt % |
| C=C/AcAc ratio: | 1.30 |
| VOC (exclude H$_2$O) | 1.05 lb/gal |
| pH: | 9.2 |
| viscosity: | 26 sec (Zahn Cup 2) |
| Hiding: | 350 ft$^2$/gal |
| sag: | 8 mils |

Example 42

Water-borne Michael reaction-curable composition (a white paint based on WDAUA resin blend of Examples 21, 23 and 24).

This example demonstrates blends of the WDAUA resins can be used to formulate two-pack water-borne Michael reaction-curable coatings with excellent properties. A white paint based on a WDAUA resin blend of Examples 21, 23 and 24 was prepared from the dispersions EX-36A and E according to the formulation (S635B) shown in Table 23. TMPTAcAc was used as the crosslinking agent and was placed in Part II of the formulation. Coating films were spray applied on aluminum and cold rolled steel panels and their properties determined after 7 days of drying at room temperature. The low VOC paint gave good film properties such as high gloss, good solvent resistance and impact resistance as shown in Table 18.

TABLE 23

Formulation (S635B) of 2-pack WDAUA white coatings based on the WDAUA resin blend of Example 21, 23 and 24

| raw materials | g | ml |
|---|---|---|
| PART I | | |
| EX-36A WDAUA dispersion | 213.0 | 208.8 |
| mixed in HSD at low speed and sifted in | | |
| Tioxide TR63 | 200.0 | 50.0 |
| grind at high speed for about 25 minutes to obtain a Hergmen dispersion of 7 and then let down with | | |
| EX-36A dispersion | 690.0 | 676.5 |
| EX-36E dispersion | 311.1 | 303.5 |
| BYK 346 | 3.6 | 3.6 |
| Part I subtotal | 1417.6 | 1242.4 |
| PART II | | |
| TMPTAcAc | 59.6 | 51.4 |
| Part II subtotal | 59.6 | 51.4 |
| Total Part I + Part II | 1477.2 | 1293.8 |
| Total excluding water | 695.5 | 512.1 |
| Formulation constants of Part I + Part II mixture: | | |
| Density: | 1.142 g/ml | |
| solid: | 41.5 wt % | |
| pigment/binder: | 48.5 wt % | |
| PVC: | 11.8 % | |
| TMGD/Binder: | 4.31 wt % | |
| C=C/AcAc ratio: | 1.39 | |
| VOC (exclude H$_2$O) | 0.99 lb/gal | |
| pH: | 9.3 | |
| Viscosity: | 28 sec (Zahn Cup 2) | |

TABLE 23-continued

| | |
|---|---|
| Hiding: | 750 ft$^2$/gal |
| sag: | 6 mils |

Example 43

Preparation of acetoacetylated acrylic latex (GY-71)

A 4-liter reaction vessel equipped with a stirrer, a reflux condenser, a thermometer and a feeding inlet was charged with the reactor charge was purged with nitrogen and heated to the desired reaction temperature of 80° C. 150 g of the monomer mixture (MM) of the following composition:

| | |
|---|---|
| Methyl methacrylate | 735.0 g |
| n-Butyl acrylate | 297.2 g |
| Acetoacetoxyethyl methacrylate | 522.0 g |
| Hydroxyethyl methacrylate | 83.6 g |
| n-octyl mercaptan | 14.0 g |
| total monomer mixture (MM) | 1651.8 g | was added to the reactor. The reaction temperature was held at 80° C. for 10 minutes before 68 g of a 4.9 wt. % ammonia persulfate aqueous solution was added into the reactor. The temperature was held at 80° C. for an additional 10 minutes, then a pre-emulsified monomer emulsion (FE) of the following composition

| | |
|---|---|
| Rest of the above MM | 1501.8 g |
| Triton QS44 | 64.1 g |
| (neutralized with KOH, 35% solid) | |
| Triton GR-5M | 18.3 g |
| Deionized water | 385.0 g | was fed into the reactor over about three hours. The Feed Emulsion (FE) was prepared in another vessel before feeding. The reaction temperature was controlled by a water bath and maintained at 80° C. throughout the whole reaction period. Feeding of 62 g of 4.9 wt. % ammonia persulfate aqueous solution was commenced after half of the FE was fed into the reactor, and this feed was finished at the same time the FE feeding was finished. After all the FE was fed into the reactor, the reacting emulsion was maintained at 80° C. for another two hours and cooled to room temperature. Then 3.8 g of Skane M-8 and 3.0 g of deionized water were added. The product was filtered through a 200-mesh cloth. The acetoactylated acrylic latex obtained had 46 wt. % solid, pH of 4.1, viscosity (Zahn Cup 2) of 18 second, acetoacetate equivalent weight of 693 based on the solid, and a weight average molecular weight of 31,000 with a polydispersity (MW/Mn) of 2.4 as measured by GPC using polystyrene standards.

Example 44

Water-borne AUA clear coatings using mixture of acetoacetylated latex and TMPDAcAc as crosslinking agent.

This example demonstrates the use of an acetoacetylated latex as crosslinking agent for the WDAUA resin to formulate a two-pack room temperature curable coating. The two-pack water-borne clear coating based on the WDAUA resin of Example 27 was prepared from the dispersion EX-36D according to the formulation (S644G) shown in Table 24. The acetoacetylated latex prepared in Example 43 was used with TMPDAcAc as the crosslinking agents to form Part II of the formulation. Coating films were spray applied on a brown epoxy primer which was in turn spray applied on aluminum and cold rolled steel panels. The clear coatings were applied about 2 hours after the application of the primer. Properties of the coating films were determined after 7 days of air drying at room temperature. The clear topcoat/primer system showed excellent inter-coat adhesion and gave good film properties such as high gloss and good solvent resistance as shown in Table 24. The impact resistance of the coatings system of the clear topcoat on brown epoxy primer is low because the epoxy primer used has lower impact resistance. The clear topcoat alone on the bare steel substrate has much higher impact resistance (120 lb-in compared to 30 lb-in on the epoxy primer).

TABLE 24

Formulation (S644G) of 2-pack WDAUA clear coatings based on the WDAUA resin of Example 27 and the acetoacetylated latex of Example 43.

| raw materials | g | ml |
|---|---|---|
| PART I | | |
| EX-36D AUA dispersion | 228.4 | 223.9 |
| Deionized water | 21.6 | 21.6 |
| BYK 346 | 1.0 | 1.0 |
| Part I subtotal | 251.0 | 246.5 |
| PART II | | |
| AcAc latex of Example 43 | 56.9 | 54.7 |
| TMPDAcAc | 5.1 | 4.4 |
| DMM | 5.0 | 5.5 |
| Acrolsol RM-2020 | 4.0 | 4.0 |
| Part II subtotal | 71.0 | 68.6 |
| Total Part I + Part II | 322.0 | 315.1 |
| Total excluding water | 117.6 | 110.6 |

Formulation constants of Part I + Part II mixture:

| | |
|---|---|
| Density: | 1.022 g/ml |
| solid: | 29.1 wt % |
| TMGD/Binder: | 3.09 wt % |
| C=C/AcAc ratio: | 1.1 |
| VOC (exclude H$_2$O): | 1.20 lb/gal |
| pH: | 9.0 |
| viscosity: | 34 sec (Zahn Cup 2) |
| sag: | 6 mils |

Film properties:

| | |
|---|---|
| adhesion on Al, steel, the epoxy primer: | excellent |
| dry film thickness, mil: | 1.6 |
| gloss (60°/20°): | 87/78 |
| hardness, pencil | 2H |
| Sward Rocker | 30 |
| MEK double rub | 200+ |
| impact*, lb-in, direct | 30 (120) |
| reverse | 8 (100) |

*data in ( ) are for clear topcoat without the primer.

Example 45

Water-borne UV-curable coating composition based on the WDAUA resins of Examples 21 and 24.

This example demonstrates that the WDAUA aqueous dispersions can also be cured by UV radiation. The UV-curable clear coating composition (S649A) was prepared by adding 2.6 g of Darocure 1137 photoinitiator to 305 g of EX-36E water dispersion prepared in Example 36 from the WDAUA resins of Examples 21 and 24. The level of the Darocure photoinitiator is 2.5 wt. % based on the resin solid. Coating films were applied by drawdown with a 3 mil doctor blade on cold rolled steel panels and Leneta standard opacity charts and dried at room temperature for about 15 minutes to evaporate water before exposing to UV radiation for curing. The UV source is a medium pressure mercury vapor lamp delivering 300 watts per inch power. Three passes were made at a speed of 20 feet/minute. The coating film properties reached their ultimate values right after exposure to the UV radiation since the properties changed little after 7 days of post dry at room temperature. The cured coating properties are shown in Table 25. The gloss was measured for the coatings on the Leneta standard white opacity charts.

TABLE 25

Film properties of WDAUA coatings cured by UV radiation

| Example # | 45 | 46 |
|---|---|---|
| coatings # | S649A | S573A |
| dry film thickness, mil | 1.0 | 1.0 |
| adhesion (1 to 10, 10 best) | 6 | 9 |
| gloss, 60°/20° | 91/80 | 90/76 |
| MEK double rub | 200+ | 200+ |
| Hardness, | | |
| pencil | 2H | 3H |
| Sward Rocker | 30 | 52 |
| Impact resistance, lb-in | | |
| direct | 80 | 40 |
| reverse | 24 | 16 |
| Flexibility, inch | 1/16 | 1/16 |

Example 46

Water-borne UV-curable coating composition based on blend of WDAUA resin of Example 21 with hydrophobic acrylated polyurethane oligomer and polyacrylate monomer This example demonstrates that the WDAUA resins can be used with hydrophobic polyfunctional acrylate oligomers and monomers in formulating UV curable water dispersion coatings.

A hydrophobic acrylated polyurethane oligomer (GI-54) was prepared by fully capping isophorone diisocyanate (IPDI) isocyanurate trimer (IPDI-T) with hydroxypropyl acrylate (HPA). To the same 2 liter reactor as used in Example 18 were charged the following materials:

| | |
|---|---|
| IPDI-T (70 wt % solid) | 1050.0 g (3 mol NCO) |
| DGM | 112.3 g |
| dibutyltin dilaurate | 0.3 |
| MEHQ inhibitor | 0.182 g |

The reactor charge was heated to 56° C. and then

| | |
|---|---|
| HPA | 391.0 g (3 mol OH) | was fed into the reactor over 90 minutes. The reactor content was heated to 82° C. and held there until the NCO content dropped below 0.5%. The reaction temperature was decreased to 60° C. and

| | |
|---|---|
| Methanol | 22.2 g | was added. The obtained NCO-free acrylated polyurethane resin has a solid content of 71.5 wt. % and a C=C equivalent weight on solid of 375.

The UV-curable water dispersion (S573A) was prepared by the same method described in Example 36 using the following formulation.

| WDAUA resin of Example 21 | 300.0 g |
|---|---|
| GI-54 resin | 37.7 g |
| Trimethylolpropane triacrylate | 28.3 g |
| TMGD | 13.0 g |
| Deionized water | 534.0 g |
| Darocure 1137 | 7.53 g |

The water dispersion has the following properties:

| solid content | 34.3 wt % |
|---|---|
| photoinitiator level | 2.4 wt % on solid |
| degree of neutralization | 78.2% |
| pH | 9.3 |
| LT | 3.0 |
| viscosity | 40 second (Zahn Cup 2) |

Coating films were applied by drawdown with a 3 mil doctor blade on cold rolled steel panels and Leneta standard opacity charts and UV-cured in the same way as described in Example 45. The properties of cured coatings are shown in Table 25. The gloss was measured for the coatings on the Leneta standard white opacity charts. The UV-curable water dispersion has a long pot life. Coating films applied 3 months after the preparation of the dispersion and UV-cured gave essentially the same properties as those shown in Table 25.

Example 47

Ambient temperature-curable water-borne coatings using polyketimine crosslinking agents.

This example demonstrates that the WDAUA resins can also be cured by a polyfunctional ketimine (ethylene diamine blocked with MIBK). To 100 g of the WDAUA water dispersion of EX-36E were added in order the following materials as Part II of the 2-package clear coating:

| deionized water | 38.6 g |
|---|---|
| ethylene diketimine of MIBK | 6.0 g |
| BYK 346 | 0.6 g |
| ethylene glycol monobutyl ether | 12.0 g |

The properties of the coating composition measured immediately after the preparation are pH=10.8, LT=1.0 and viscosity (Zahn cup 2)=60 seconds. The composition had a pot-life of about 30 minutes.

Following the preparation of the coating composition, films were applied to steel panels (Bonderite 40). The resulting coatings dry to tack-free in about 5 hours. Cured film properties were determined after 7 days of drying at ambient temperature and are shown below.

| Hardness, | |
|---|---|
| Pencil | F |
| Sward Rocker | 12 |
| MEK double rub | 100 |

| Impact Resistance, lb-in | |
|---|---|
| direct | 140 |
| reverse | 120 |

EMBODIMENT III

Example 48

Preparation of the Water Dispersible Acrylated Urethane Acrylic Resins (WDAUA)

The WDAUA were prepared in two steps. First a water dispersible acrylic polyol backbone polymer was prepared. In the second step, a urethane acrylate side chain material was prepared and the water dispersible acrylic polyol backbone polymer was introduced for grafting.

Preparation of Water-dispersible Acrylic Polyols

A suitable four-neck 3-liter flask equipped with an agitator and a condenser was used as the reaction vessel. The raw materials used are shown in Table 26. The Reactor Charge (RC) shown in Table 26 was charged into the reactor. The reactor was purged with dry nitrogen, and a nitrogen blanket was maintained during the whole reaction period. The reactor was heated to the desired reaction temperatures. The Monomer Mixture (MM) was fed into the reactor over four hours. The reaction temperature was increased by 5° C. after all MM was fed into the reactor. Heating was continued for another two hours before cooling to stop the reaction. While cooling, the Post Addition (PA) was added, and the reactor was purged with dry air. Typical properties of the obtained water-dispersible acrylic polyol resins are shown in Table 26.

TABLE 26

Recipes for the Water-Dispersible Backbone Acrylic Polyols

| Raw materials | A (GW84) | B (GW88) |
|---|---|---|
| Reactor Charge (RC) | | |
| EDGM | 568.0 | 568.0 |
| Monomer Mixture (MM) | | |
| CHMA | 205.0 | 205.0 |
| BMA | 564.0 | 441.6 |
| St | 204.0 | 204.0 |
| 2-EHMA | 0 | 300.0 |
| BA | 177.0 | 0 |
| HEMA | 477.0 | 478.0 |
| AA | 120.0 | 120.5 |
| MAA | 60.0 | 60.0 |
| Noramco 7966 | 0 | 8.0 |
| L-555M60 | 148.0 | 148.0 |
| MEO | 1.10 | 1.20 |
| Post Addition (PA) | | |
| 3 wt % MEHQ in EDGM | 4.1 | 4.2 |
| Reaction Temperature, C., | 145 | 145 |
| Resin Properties: | | |
| Solid, wt % | 75.0 | 75.0 |
| OH EW (solid) | 516.7 | 518.2 |
| Acid Value (solid) | 70.0 | 69.6 |
| Color (Gardner) | <1 | <1 |
| Viscosity (Gardner) | Z7 | Z7 |

Grafting for Production of WDAUA Resins

The recipes for preparing the WDAUA resins are shown in Table 27. To a 2-liter reactor equipped with a stirrer, a reflux condenser, a thermometer and a dropping funnel was added the IPIDI, T-12 and MEHQ shown in Table 27 at room temperature. The reactor was purged with dry air, heated to and maintained at 60° C. The HPA was added over 35 minutes and then Tone M-100 was added over 50 minutes under dry air atmosphere. The dropping funnel was rinsed with the first part of NMP in Table 27. The reaction temperature was held at 60° C. until the NCO content of the reaction mixture reached 5.4 wt. %. Then the water dispersible (WD) acrylic polyol prepared above (GW-84 for Example 48A and GW-88 for Example 48B) was added over 10 minutes for grafting. The container for the WD acrylic polyol was rinsed with the second part of the NMP in Table 27. The reaction temperature was raised to and held at 83° C. until the NCO content reached 0.2 wt. %. The reaction mixture was cooled to 60° C. and the amount of methanol shown in Table 27 was added to stop the grafting. Properties of WDAUA resins cooked are shown in Table 27.

TABLE 27

Raw Materials for Preparing the WDAUA Resins

| Example | | 48A | | 48B |
|---|---|---|---|---|
| Resin | | GI-192 | | GI-226 |
| Raw material | | (g) | | (g) |
| IPDI | | 375.7 | | 500.0 |
| T-12 | | 0.030 | | 0.050 |
| MEHQ | | 0.080 | | 0.101 |
| HPA | | 100.0 | | 156.0 |
| Tone M-100 | | 481.1 | | 580.0 |
| NMP | | 12.5 | | 16.0 |
| WD Acrylic polyol | GW-84 | 914.7 | GW-88 | 1208.0 |
| NMP | | 36.0 | | 42.0 |
| Methanol | | 12.0 | | 16.0 |
| Resin properties | | | | |
| Solid, wt % | | 85.0 | | 85.0 |
| Viscosity, (Gardner) | | Z10 | | Z10 |
| Color, (Gardner) | 1.0 | | 1.0 | |
| Acid value (mgKOH/g solid) | | 30.0 | | 29.5 |
| acrylate EW (solid) | | 755 | | 742 |

Example 49

Preparation of trimethylolpropane triacetoacetate (TMPTAcAc)

A 2-liter reactor equipped with an agitator, a reflux condenser and a thermometer was loaded with the following materials at room temperature.

| trimethylolpropane (TMP) | 337.5 g |
|---|---|
| methyl acetoacetate (MAcAc) | 1103.9 g |

The reactor content was purged with nitrogen and heated to about 125° C. when distillation of methanol begins. The temperature of the reactor content slowly increased to 180° C. over 8 hours while collecting distilled methanol. The reaction was held at 180° C. until no more methanol was collected. Then a vacuum of greater than 27" Hg was applied to remove excessive MAcAc. The reaction product was cooled down to 50° C. and collected.

TMPTAcAc so obtained has the following properties:

| Gardner Viscosity | E-F |
|---|---|
| Gardner color | 3-4 |
| Acetoacetate EW | 129 |

Example 50

This example demonstrates that WDAUA coatings using a blend of polyacetoacetate compound and epoxy resin as crosslinkers give much better film properties than coatings using only a polyacetoacetate compound as the crosslinker.

Two-part clear coatings were prepared according to the formulations shown in Table 28. The clear coatings prepared have the formulation properties also shown in Table 28 when the two parts are mixed together. Epon 828, used in Example 50, is a liquid diglycidyl ether of bisphenol A with an epoxy equivalent weight of about 189 (produced by the Shell Co.). 8.2 wt. % of Epon 828 epoxy resin based on total resin solid was used in Example 50 to make the epoxy/carboxyl molar ratio of 1.0. In comparison, no epoxy resin was used in Example 49-C (Hereafter, example numbers followed with -C stand for comparative examples in which the epoxy component is not used.)

TABLE 28

Formulations for two-part clear coatings based on WDAUA resin of Example 48A (GI-192)

| | weight (g) | |
|---|---|---|
| Example # | 50-C | 50 |
| Coatings # | (S676A) | (S677A) |
| Part I | | |
| WDAUA resin of Example 48A | 297.0 | 297.0 |
| TMGD | 14.0 | 14.0 |
| BYK035 | 0.3 | 0.3 |
| deionized water | 636.2 | 636.2 |
| Part II | | |
| TMPTAcAc | 44.4 | 44.4 |
| Epon 828 | 0 | 26.6 |
| BYK 346 | 3.5 | 3.5 |
| water | 177.6 | 148.0 |
| Formulation Properties | | |
| Solid content, wt % | 26.0 | 26.7 |
| viscosity (Zahn Cup 2), sec | 18 | 19 |
| pH | 9.21 | 9.28 |
| C=C/AcAc mol ratio | 1.00 | 1.00 |
| Epoxy/Carboxyl ratio | 0 | 1.01 |
| Epoxy resin/Total resin solid, wt % | 0 | 8.2 |

The coatings were sprayed on cold rolled steel panels primed with a grey epoxy primer and allowed to air dry for 8 to 10 days before measuring the final film properties as shown in Table 29. As can be seen, coatings S677A (Example 50) with the Epon 828 epoxy resin gives much better film properties than coatings S676A (Example 50-C) without the epoxy resin. Solvent resistance, impact resistance and hardness are all improved with the presence of the epoxy resin. There is a remarkable improvement in the weathering resistance when the epoxy resin is used.

Incorporating the epoxy in the coatings also helps improve early film property development as shown in Table 30. Early water resistance is desirable.

TABLE 29

Final coatings film properties (air dry 8 to 10 days)

| Example # Coatings # | 50-C S676A | 50 S677A |
|---|---|---|
| Dry film thickn., mil | 0.9 | 0.8 |
| MEK double rub | 200 | 300+ |
| Impact (lb-in), | | |
| direct | 40 | 60 |
| reverse | 8 | 12 |
| Hardness, | | |
| Pencil | 4H | 5H |
| Sward, % | 40 | 42 |
| Mar resistance | good | Vgood |
| Gloss, | | |
| 60 degree | 89 | 89 |
| 20 degree | 81 | 75 |
| 60 degree gloss retention, % UVCON | | |
| 365 hrs | 73 | 91 |
| 726 hrs | 49 | 85 |
| 942 hrs | 14 | 81 |

TABLE 30

Film property development of S676A and S677A coatings with curing time.

| RT dry time, hr | Sward hardness, % | | MEK d. rub | | Water Resistance* | |
|---|---|---|---|---|---|---|
| Example # coatings | 50-C S676A | 50 S677A | 50-C S676A | 50 S677A | 50-C S676A | 50 S677A |
| 16 | 12 | 12 | 16 | 30 | 1 | 6 |
| 20 | 16 | 16 | — | — | — | — |
| 24 | 18 | 18 | 40 | 100+ | 2 | 7 |
| 40 | 24 | 27 | — | — | — | — |
| 48 | 28 | 30 | 100 | 200+ | 4 | 8 |
| 64 | 33 | 35 | — | — | — | — |
| 72 | 33 | 35 | 200+ | 300+ | 5 | 8 |
| 96 | 37 | 38 | 200+ | 300+ | 6 | 8 |
| 168 | 40 | 42 | 200+ | 300+ | 6 | 9 |
| 208 | 40 | 42 | 200+ | 300+ | 7 | 10 |

*spot test, rated with numbers from 0 to 10 with 0 completely dissolved and 10 not affected.

Example 51

Preparation of a urethane polyacetoacetate with epoxy functional group.

To a 3-liter reactor equipped with an agitator, a reflux condenser, a thermometer and a dropping funnel were charged the following materials at room temperature.

| trimethylolpropane (TMP) | 542.0 g |
|---|---|
| methyl acetoacetate (MAcAc) | 1258.5 g |

The reactor content was purged with nitrogen and heated to about 125° C. when distillation of methanol begins. The temperature of the reactor content was slowly increased to 180° C. over 4 hours while collecting distilled methanol, and held at 180° C. until no more methanol was collected. Then a vacuum of greater than 27" Hg was applied to remove excessive MAcAc. The reaction product was cooled down to room temperature and collected for later use.

685.3 g of hexamethylene diisocyanate (HDI) and 0.060 g of dibutyltin dilaurate (T-12) were charged to the reactor. The reaction temperature was increased to 50° C., and a mixture of 609.0 g of GI-199 prepared above and 102 g of glycidol was fed into the reactor over 30 minutes. The reaction temperature was raised to 85° C. and held at that temperature until the NCO content decreased to below 0.1 wt. %. The reaction product was cooled to 50° C. and collected.

The epoxy urethane TMPTAcAc so obtained has the following properties:

| Gardner Viscosity | Z5 |
|---|---|
| Gardner color | 3–4 |
| Acetoacetate EW | 218 |
| Epoxy EW | 715 |

Example 52

Another example of preparing urethane polyacetoacetate with epoxy functional group.

To the same reactor as used in Example 51 were loaded the following materials at room temperature.

| trimethylolpropane (TMP) | 293.5 g |
|---|---|
| methyl acetoacetate (MAcAc) | 876.4 g |

The reactor content was purged with nitrogen and heated to about 125° C. when distillation of methanol began. The temperature of the reactor content slowly increased to 180° C. over 4 hours while collecting distilled methanol, and was held at 180° C. for another hour. Then a vacuum of greater than 27" Hg was applied to remove excessive MAcAc. The reaction product (GI-207) was cooled down to room temperature and collected for later use.

222.0 g of isophorone di-isocyanate (IPDI) and 0.030 g of dibutyltin dilaurate (T-12) were charged to the reactor. The reaction temperature was increased to 50° C. 76 g of glycidol was fed into the reactor over 15 minutes. Then 1170.0 g of GI-207 prepared above was fed into the reactor over 40 minutes. The reaction temperature was raised to 85° C. and held at that temperature until the NCO content decreased to below 0.1 wt. %. The reaction product was cooled to 50° C. and collected.

The epoxided urethane TMPTAcAc so obtained has the following properties:

| Gardner Viscosity | Z2 |
|---|---|
| Gardner color | 6 |
| Acetoacetate EW | 171 |
| Epoxy EW | 1468 |

Example 53

This example demonstrates that epoxy groups chemically bonded to the acetoacetate crosslinker also help to improve coating properties. The epoxy polyacetoacetates prepared in Examples 51 and 52 were used as crosslinkers in Part II of the two-part clear coatings of Examples 53A and 53B, respectively.

The following materials were used to prepare a water dispersion (S695A) of GI-192 resin:

| | |
|---|---|
| Example #48A (GI-192) WDAUA resin | 521.5 g |
| TMGD | 24.5 g |
| BYK022 | 0.6 g |
| deionized water | 1035.0 g |

The WDAUA, TMGD and BYK022 were mixed in a high speed disperser. The water was then added slowly over about 40 minutes to obtain a translucent water dispersion with a solid content of 28.0 wt. %, pH 9.6 and Zahn cup 2 viscosity of 84 seconds.

Two-part clear coatings were prepared according to the following formulations.

| Example # | 53A | 53B |
|---|---|---|
| Coatings # | S705C | S707C |
| Part I | | |
| S695A dispersion | 200 | 200 |
| 50% Fluorad FC-430 in NMP | 1.0 | 1.0 |
| water | 3.1 | 8.8 |
| Part II | | |
| Example 50 (TMPTAcAc) | 7.0 | 0 |
| Example 51 | 4.64 | 0 |
| Example 52 | 0 | 13.0 |

The coating formulation properties of the mixed two parts and the properties of cured coating films are shown in Table 31. The coatings were sprayed on cold rolled steel panels primed with a grey epoxy primer and allowed to cure at room temperatures for 8 days before measuring film properties. The properties of the coating in Example 50-C are also shown in Table 31 for comparison. The coatings of Example 53A and 53B using the epoxy polyacetoacetates of Examples 51 and 52, respectively, give better properties, such as gloss retention and impact resistance, than the coatings of example 50-C without epoxy.

TABLE 31

Properties of two-part clear coatings based on WDAUA resin of Example 48A with epoxided urethane polyacetoacetates.

| Example # | 50C | 53A | 53B |
|---|---|---|---|
| Coating # | S676A | S705C | S707C |
| Solid content, wt % | 26.0 | 31.4 | 32.5 |
| viscosity, sec | 18 | 32 | 27 |
| pH | 9.21 | 9.2 | 9.2 |
| C=C/AcAc mol ratio | 1.00 | 1.0 | 1.0 |
| Crosslinker | EX-50 | EX-50/EX-51 | EX-52 |
| Epoxy/Carboxyl ratio | 0 | 0.22 | 0.30 |
| Coatings film properties (air dry 8 to 10 days) | | | |
| Dry film thickn., mil | 0.9 | | |
| MEK double rub | 200+ | 200+ | 200+ |
| Impact direct | 40 | 80 | 80 |
| (lb-in), reverse | 8 | 100 | 40 |
| Hardness, | | | |
| Pencil | 4H | 2H | 3H |
| Sward, % | 40 | 30 | 32 |
| Mar resistance | good | Vgood | Vgood |
| Gloss, | | | |
| 60 degree | 89 | 88 | 87 |
| 20 degree | 81 | 78 | 72 |

TABLE 31-continued

Properties of two-part clear coatings based on WDAUA resin of Example 48A with epoxided urethane polyacetoacetates.

| Example # | 50C | 53A | 53B |
|---|---|---|---|
| Coating # | S676A | S705C | S707C |
| 60 degree gloss retention, % | | | |
| UVCON 250 hrs | 77 | 84 | 85 |
| 600 hrs | 57 | 69 | 78 |

Example 54

Preparation of urethane trimethylolpropane diacetoacetate (UTMPDAcAc).

A 2-liter reactor equipped with an agitator, a reflux condenser and a thermometer was loaded with the following materials at room temperature.

| | |
|---|---|
| trimethylolpropane (TMP) | 583.7 g |
| methyl acetoacetate (MAcAc) | 1706.2 g |

The reactor content was purged with nitrogen and heated to about 130° C. when distillation of methanol began. The temperature of the reactor content slowly increased to 180° C. over 4 hours while collecting distilled methanol. After two moles of methanol have been collected, a vacuum of greater than 27" Hg was applied to remove excessive MAcAc. The reaction product was cooled down to 50° C. and collected.

800 g of the above product were mixed with 100 g of phenyl isocyanate and 0.1 g of dibutyltin dilaurate and heated at 50° C. until the NCO content reached zero.

UTMPDAcAc so obtained had the following properties:

| | |
|---|---|
| Gardner Viscosity | R–S |
| Gardner color | 4–5 |
| Acetoacetate EW | 152 |

Example 55

Preparation of urethane pentaerythritol triacetoacetate (UPETAcAc).

A 3-liter reactor equipped with an agitator, a reflux condenser and a thermometer was loaded with the following materials at room temperature.

| | |
|---|---|
| pentaerythritol (PE) | 408.0 g |
| methyl acetoacetate (MAcAc) | 2243.2 g |

The reactor content was purged with nitrogen and heated to about 130° C. when distillation of methanol began. The temperature of the reactor content slowly increased to 180° C. over 4 hours while collecting distilled methanol and was held at 180° C. until three moles of methanol were collected. Then a vacuum of greater than 27" Hg was applied to remove excessive MAcAc. The reaction product was cooled down to 50° C. and collected.

800 g of the above product were mixed with 100 g of phenyl isocyanate and heated at 50° C. until the NCO content reached zero.

UPETAcAc so obtained had the following properties:

| Gardner Viscosity | Y |
|---|---|
| Gardner color | 4–5 |
| Acetoacetate EW | 136 |

Example 56

Preparation of urethane glycerol diacetoacetate (UGLDAcAc).

A 2-liter reactor equipped with an agitator, a reflux condenser and a thermometer was loaded with the following materials at room temperature.

| glycerine (GL) | 368.0 g |
|---|---|
| methyl acetoacetate (MAcAc) | 1752.0 g |

The reactor content was purged with nitrogen and heated to about 130° C. when distillation of methanol began. The temperature of the reactor content slowly increased to 180° C. over 7 hours while collecting distilled methanol and was held at 180° C. for another 2 hours. Then a vacuum of greater than 27" Hg was applied to remove excessive MAcAc. The reaction product was cooled down to 50° C. and collected.

800 g of the above product were mixed with 100 g of phenyl isocyanate and 0.12 g dibutyltin dilaurate and heated at 50° C. until the NCO content reached zero.

UGLDAcAc so obtained had the following properties:

| Gardner Viscosity | I |
|---|---|
| Gardner color | 7–8 |
| Acetoacetate EW | 134 |

Example 57

This example demonstrates the influence of the epoxy content on the properties of pigmented coatings based on the WDAUA resin of Example 48B. Urethane polyacetoacetates prepared in Examples 54 and 55 are used with Epon 828 epoxy resin to form the second part of two-part white coatings.

A water dispersion (S739A) of WDAUA resin from Example 48B was prepared in the same method as described in Example 53 according to the following formulation:

| Example 48B WDAUA resin | 1200.0 g |
|---|---|
| BYK022 | 1.2 g |
| TMGD | 37.0 g |
| TEA | 5.4 g |
| 4 wt % NaOH aqueous solution | 80.4 g |
| 50 wt % FC-430 in NMP | 18.6 g |
| Deionized water | 2165.1 g |

The dispersion (S739A) so obtained had a solid content of 29.1 wt. %, viscosity (Zahn cup 2) of 70 seconds and pH of 9.62.

A white pigmented paint (S742-I) was prepared using the above dispersion according to the following formulation and procedure:

| S739A dispersion of Example 48B | 458.2 g |
|---|---|
| Ti-Pure 960 (TiO2) pigment | 400.0 g |
| BYK022 | 1.2 g |
| Rheolate 2000 (antisettling agent) | 17.8 g |

The above materials were ground in a high speed disperser to obtain a pigment dispersity of greater than Hegman 6 and then diluted with the following materials:

| S739A dispersion of Example 48B | 1845.0 g |
|---|---|
| 50% FC-430 in NMP | 16.3 g |
| 20% TMGD in NMP | 21.8 g |
| deionized water | 274.0 g |

Two-part white coatings were prepared as follows.

| Example # | 57-C | 57A | 57B | 57C | 57D | 57E |
|---|---|---|---|---|---|---|
| Coating # | S742B | S742C | S742D | S743B | S743C | S743D |
| Part I (g) | | | | | | |
| S742-I white paint | 334.4 | 334.4 | 334.4 | 334.4 | 334.4 | 334.4 |
| Part I (g) | | | | | | |
| Example 54 (UTMPDAcAc) | 18.3 | 18.3 | 18.3 | 0 | 0 | 0 |
| Example 55 (UPETAcAc) | 0 | 0 | 0 | 14.6 | 14.6 | 14.6 |
| Epon 828 epoxy resin | 0 | 5.8 | 7.4 | 7.4 | 9.1 | 11.8 |
| NMP | 4.5 | 4.5 | 4.5 | 4.5 | 4.5 | 4.5 |
| Diluted the mixed two-parts paints with water to obtain spray viscosity (20–30 sec of Zahn cup 2) | | | | | | |
| water | 6.4 | 14.3 | 14.3 | 19.1 | 23.9 | 33.8 |

The two-part white coatings had the formulation properties shown in Table 32. Coatings were sprayed on cold rolled steel panels and allowed to air dry for 8 days before measuring film properties. The film properties measured are shown in Table 32. As can be seen, the film performance properties, especially the gloss retention, became better and better as the epoxy content increases. The epoxy/carboxyl molar ratios in Examples 57C, 57D and 57E are greater than 1.0, 1.24 and 1.61, respectively. Still, improved film properties were obtained. This suggests that, besides reacting with carboxyl groups, the epoxy groups also participate in other reactions which contribute to crosslinking in the cured coatings films. Self crosslinking of the epoxy is one of the possible reactions. The epoxy group may also react with the acetoacetate groups under the strong basic conditions.

TABLE 32

Influence of epoxy content on white paints using
WDAUA resin of Example 48B and EPON 828 epoxy resin from the Shell Co.

| Example # | 57-C | 57A | 57B | 57C | 57D | 57E |
|---|---|---|---|---|---|---|
| Coating # | S742B | S742C | S742D | S743B | S743C | 5743D |
| Epoxy/tot binder, wt % | 0 | 5.9 | 7.4 | 7.7 | 9.3 | 11.8 |
| Epoxy/Carboxyl ratio | 0 | 0.79 | 1.01 | 1.01 | 1.24 | 1.61 |
| TMGD/tot binder, wt % | 3.43 | 3.23 | 3.17 | 3.30 | 3.23 | 3.15 |
| AcAc x-linker | EX-54 | EX-54 | EX-54 | EX-55 | EX-55 | EX-55 |
| C=C/AcAc | 1.15 | 1.15 | 1.15 | 1.15 | 1.15 | 1.15 |
| pigment/bind, wt % | 47.9 | 45.1 | 44.3 | 46.0 | 45.2 | 44.0 |
| Coatings film properties (air dry 8 to 10 days) | | | | | | |
| Dry film thickn., mil | 1.3 | 1.3 | 1.3 | 1.4 | 1.7 | 1.6 |
| MEK double rub | 200+ | 200+ | 200+ | 200+ | 200+ | 200+ |
| Impact direct | 140 | 160 | 160 | 160 | 140 | 160 |
| (lb-in), reverse | 120 | 140 | 140 | 60 | 40 | 100 |
| Hardness, | | | | | | |
| Pencil | 2H | 3H | 3H | 5H | 5H | 5H |
| Sward, % | 24 | 30 | 30 | 36 | 36 | 40 |
| Mar resistance | fair | good | Vgood | Vgood | Vgood | Exceln |
| Gloss, | | | | | | |
| 60 degree | 85 | 87 | 87 | 87 | 87 | 88 |
| 20 degree | 75 | 77 | 77 | 77 | 77 | 79 |
| 60 degree gloss retention, % | | | | | | |
| UVCON 384 hrs | 52 | 79 | 86 | 88 | 90 | 90 |
| 570 hrs | — | 60 | 76 | 76 | 83 | 86 |

Example 58

This example demonstrates the use of EPON 828 epoxy in white pigmented paints using the WDAUA resin of Example 48B and different polyacetoacetate crosslinkers.

Two-part white coatings were prepared with the same procedure described in Example 57 using the following formulations.

| Example # | 57-C | 57B | 58-Ca | 58A | 58-Cb | 58B |
|---|---|---|---|---|---|---|
| Coating # | S742B | S742D | S746B | S746C | S751C | S741D |
| Part I, g | | | | | | |
| S742-I white paint | 334.4 | 334.4 | 334.4 | 334.4 | 334.4 | 334.4 |
| Part I, g | | | | | | |
| Example 54 (UTMPDAcAc) | 18.3 | 18.3 | 0 | 0 | 0 | 0 |
| Example 56 (UGLDAcAc) | 0 | 0 | 11.6 | 11.6 | 0 | 0 |
| Example 49 (TMPTAcAc) | 0 | 0 | 0 | 0 | 11.2 | 11.2 |
| Epon 828 epoxy resin | 0 | 7.4 | 0 | 7.4 | 0 | 7.4 |
| NMP | 4.5 | 4.5 | 4.5 | 4.5 | 4.5 | 4.5 |
| Diluted the mixed two-part paints with water to obtain spray viscosity (20–30 sec Zahn cup 2). | | | | | | |
| water | 6.4 | 14.3 | 10.5 | 23.9 | 0 | 22.4 |

The formulation constants and the coating film properties are shown in Table 33. In the presence of the epoxy resin (EP/COOH=1.01), the gloss retention is remarkably improved. Other coatings properties such as solvent resistance, impact resistance, hardness and mar resistance are also greatly improved.

TABLE 33

White paints based on GI-226 WDAUA resin using different crosslinkers with Epon 828 epoxy. Catalyst: TMGD/NaOH (93/7 by wt), C=C/AcAc molar ratio = 1.14, pigment/binder wt ratio = 46/100.

| Example #<br>Coating # | 57-C<br>S742B | 57B<br>S742D | 58-Ca<br>S742B | 58A<br>S746C | 58-Cb<br>S751C | 58B<br>S741D |
|---|---|---|---|---|---|---|
| Epoxy/tot binder, wt % | 0 | 7.4 | 0 | 8.0 | 0 | 8.0 |
| Epoxy/Carboxyl ratio | 0 | 1.01 | 0 | 1.01 | 0 | 1.01 |
| TMGD/tot binder, wt % | 3.43 | 3.17 | 3.70 | 3.40 | 3.72 | 3.42 |
| AcAc x-linker | EX-54 | EX-54 | EX-56 | EX-56 | EX-49 | EX-49 |
| pigment/binder, wt % | 47.9 | 44.3 | 51.6 | 47.5 | 52.2 | 47.7 |
| Coatings film properties (air dry 8 to 10 days) | | | | | | |
| Dry film thickn., mil | 1.3 | 1.3 | 2.0 | 2.2 | 1.7 | 1.4 |
| MEK double rub | 200+ | 200+ | 180 | 200+ | 100 | 200+ |
| Impact direct | 140 | 160 | 35 | 140 | 100 | 160 |
| (lb-in), reverse | 120 | 140 | 12 | 160 | 28 | 140 |
| Hardness, | | | | | | |
| Pencil | 2H | 3H | F | 4H | H | 4H |
| Sward, % | 24 | 30 | 24 | 30 | 18 | 44 |
| Mar resistance | Vgood | fair | Vgood | fair | Vgood | fair |
| Gloss, | | | | | | |
| 60 degree | 85 | 87 | 86 | 86 | 87 | 87 |
| 20 degree | 7S | 77 | 76 | 75 | 77 | 77 |
| 60 degree gloss retention, % | | | | | | |
| UVCON 384 hrs | 52 | 86 | 46 | 86 | <70 | 87 |
| 570 hrs | — | 76 | — | 83 | <50 | 82 |

Example 59

This example demonstrates that epoxy resin (EPON 828) can be formulated into pigmented paints of different colors and has the same good effects in improving the coatings properties, especially the gloss retention.

Paints with different colors are prepared in a procedure similar to that described in Example 57. Their formulation properties are shown in Table 34 together with the coating film properties. The coatings using Epon 828 epoxy resin gave much better UVCON resistance.

TABLE 34

Paints of different colors with and without Epon 828 epoxy using TMPTAcAc from Example 49 as the Michael reaction curing agent.

| Example #<br>Coating #<br>Color | 59-Ca<br>S622B<br>orange | 59A<br>S632D | 59-Cb<br>S634B<br>blue | 59B<br>S634C | 59-Cc<br>S635B<br>white | 59C<br>S635C |
|---|---|---|---|---|---|---|
| Formulation Properties | | | | | | |
| WDAUA resin | GI168/GI180 | | GI128/GI174/GI168 | | | |
| C=C/AcAc | 1.2 | 1.2 | 1.4 | 1.4 | 1.4 | 1.4 |
| Epoxy/carboxyl ratio | 0 | 0.8 | 0 | 0.8 | 0 | 0.8 |
| Epoxy/bind, wt % | 0 | 5.9 | 0 | 3.0 | 0 | 5.3 |
| pigment/bind, wt % | 5.2 | 4.9 | 4.4 | 3.9 | 48.5 | 43.4 |
| Catalyst, | DBU | | TMGD | | | |
| Coatings film properties (air dry 8 to 10 days) | | | | | | |
| DFT, mil | 1.4 | 2.0 | 1.2 | 1.5 | 1.2 | 1.2 |
| MEK D. rub | 200+ | 300+ | 300+ | 200+ | 200+ | 300+ |
| Impact, dir. | 160 | 60 | 140 | 140 | 140 | 140 |
| (lb-in), reve. | 120 | 60 | 140 | 140 | 120 | 120 |
| Hardn, | | | | | | |
| Pencil | 2H | 2H | 2H | 2H | 2H | 3H |
| Sward, % | 44 | 40 | 46 | 44 | 48 | 52 |

TABLE 34-continued

Paints of different colors with and without Epon 828 epoxy using TMPTAcAc from Example 49 as the Michael reaction curing agent.

| Example # | 59-Ca | 59A | 59-Cb | 59B | 59-Cc | 59C |
|---|---|---|---|---|---|---|
| Coating # | S622B | S632D | S634B | S634C | S635B | S635C |
| Color | orange | | blue | | white | |
| Gloss, | | | | | | |
| 60° | 88 | 89 | 88 | 88 | 88 | 88 |
| 20° | 81 | 81 | 79 | 80 | 80 | 80 |
| 60 degree gloss retention, % | | | | | | |
| UVCON, 100 | 42 | 90 | 68 | 80 | 70 | 80 |
| 200 | — | 88 | 60 | 70 | 55 | 70 |
| (hr) 600 | — | 73 | — | 50 | — | 46 |

Example 60

Preparation of epoxy acetoacetylated latices.

Epoxy acetoacetylated latex was prepared according to the following formulation and procedure. Glycidyl methacrylate was used to introduce epoxy functionality in formulation GY-68G. Latices GY68A and GY-72 do not contain epoxy functionality and will be used for comparison.

Acetoacetylated Acrylic Latex Formulations

| Raw materials | weight (g) |
|---|---|
| Reactor Charge (RC) | |
| demineralized (DM) water | 613.3 |
| Aerosol A103 | 27.6 |
| Feed Emulsion (FE) | |
| DM water | 168.8 |
| Triton QS-44 (neutralized with KOH, 35% solid) | 27.7 |
| Aerosol MA 80 | 5.7 |
| Monomer mixture | 721.5 |
| n-octylmercaptan (NOM) | 5.9 |
| Feed Catalyst (FC) | |
| DM water | 53.2 |
| Triton X-405 | 1.5 |
| Ammonia persulfate | 2.74 |
| Post Addition | |
| Dowicil 75 (20%) | 2.6 |

| Example # | 60-C1 | 60 | 60-C2 |
|---|---|---|---|
| Monomer Mixture | GY-68A | GY-68G | GY-72 |
| Methyl methacrylate (MMA) | 324.5 | 324.5 | 324.0 |
| butyl acrylate (BA) | 130.0 | 0 | 130.5 |
| Glycidyl methacrylate (GMA) | 0 | 130.0 | 0 |
| hydroxyethyl methacrylate (HEMA) | 0 | 0 | 36.8 |
| Acetoacetoxyethyl methacrylate (AAEM) | 267.0 | 267.0 | 230.2 |
| total | 721.5 | 721.5 | 721.5 |

The Feed Emulsion (FE) was prepared in a separate vessel prior to latex formation. The reactor charge was loaded into the reactor, and the reactor content was purged with dry nitrogen and maintained under a nitrogen blanket during the whole reaction period. The reactor was heated to the desired reaction temperature of 80° C. 9.1 wt. % of the FE was added to the reactor. Then 50% of the FC was fed into the reactor, and the temperature was held at 80° C. for 10 minutes. Then the FE was fed into the reactor over about three hours. The reaction temperature was maintained at 80° C. throughout the whole reaction period. The remainder of the FC was added after half of the FE had been fed into the reactor and was finish at the same time as the FE feeding. After all FC and FE were fed into the reactor, the reacting emulsion was maintained at 80° C. for another two hours and then cooled to room temperature. Then raw material PA was added. The products were filtered through a 200-mesh cloth.

Typical properties of the latices made are as follows.

| Example # | 60-C1 | 60 | 60-C2 |
|---|---|---|---|
| latex # | GY-68A | GY-68G | GY-72 |
| Solid, wt % | 46.0 | 46.0 | 46.0 |
| Viscosity (Zahn Cup 2), sec | 16 | 16 | 18 |
| pH | 4.4 | 4.3 | 4.1 |
| Equivalent weight of solid | | | |
| AcAc | 605 | 605 | 693 |
| epoxy | — | 825 | — |

Example 61

This example demonstrates the effects of epoxy on the coatings using acetoacetylated latices as crosslinkers.

A water dispersion (S770A) of WDAUA resin from Example 48B was prepared in the same method as described in Example 53 according to the following formulation:

| Example 48B WDAUA resin | 2499.6 g |
|---|---|
| NMP | 163.0 g |
| BYK022 | 2.6 g |
| TMGD | 99.7 g |
| TEA | 11.0 g |
| 50 wt % FC-430 in NMP | 37.3 g |
| Deionized water | 4481 g |

The dispersion (S770A) so obtained had a solid content of 28.2 wt. %, a viscosity (Brookfield, spindle 4, 20 rpm) of 2800 cps, and a pH of 9.64.

A white pigmented paint (S771A) was prepared using the above dispersion according to the following formulation and procedure:

| S770A dispersion of Example 48B | 800.0 g |
|---|---|
| Tioxide pigment | 726.0 |
| BYK022 | 0.4 g |
| Rheolate 2000 (antisettling agent) | 32.0 g |

The above materials were ground in a high speed disperser to obtain a pigment dispersity of greater than Hergmen 6 and then diluted with 3324.0 g of S770A dispersion of Example 48B. The white pigmented paint (S771A) so prepared had a pH of 9.5 and a viscosity (Brookfield, Spindle 4, 20 rpm) of 6000 cps.

Two-part white coatings were prepared according to the formulations which are shown in Table 35 along with the formulation properties. Coatings were sprayed on cold rolled steel panels with a brown epoxy primer. Coating film properties were measured after curing at room temperatures for 8 days and are listed in Table 35. As can be seen, coatings with epoxy components (Examples 61A, 61B, 61C and 61D) have better performance properties than coatings without epoxy (Examples 61-C1 and 61-C2).

Two different ways of incorporating epoxy into the crosslinker part were investigated. Epon 828 epoxy resin aqueous emulsion was blended with the acetoacetate component (Example 60-C1 latex and TMPTAcAc) and used in Example 61C. On the other hand, epoxy functional groups were introduced onto the acetoacetylated latex by copolymerizing with glycidyl methacrylate (GMA) in Example 60 and used in Example 61D. Example 61C using Epon 828 gave better performance properties than Example 61D using GMA copolymerized latex.

TABLE 35

Effects of epoxy on water-borne two-part Michael reaction cure coatings using WDAUA resin of Example 48B and latex crosslinkers of Example 60.

| Example # | 61-C2 | 61A | 61B | 61-C1 | 61C | 61D |
|---|---|---|---|---|---|---|
| Coatings # | S759D | S777B | S779B | GM44A | GM44B | GM44C |
| Part I | | | | | | |
| S771A white | 300 | 300 | 300 | 300 | 300 | 300 |
| 20% TMGD/NMP | 2.2 | 2.1 | 2.3 | 0 | 0 | 0 |
| water | 23.4 | 35.3 | 24.1 | 0 | 0 | 0 |
| Part II | | | | | | |
| Example 49 (TMPTAcAc) | 4.9 | 0 | 4.9 | 4.7 | 4.7 | 4.7 |
| Example 60-C2 latex | 59.2 | 0 | 0 | 0 | 0 | 0 |
| Example 60-C1 latex | 0 | 0 | 0 | 73.8 | 73.8 | 0 |
| Example 60 latex | 0 | 105 | 57.0 | 0 | 0 | 73.8 |
| TMPTA | 0 | 0 | 0 | 1.5 | 1.5 | 1.5 |
| 51% Epon828 emulsion | 0 | 0 | 0 | 0 | 15.3 | 0 |
| DMM | 2.0 | 0 | 0 | 0 | 0 | 0 |
| Toluol | 1.0 | 0 | 0 | 0 | 0 | 0 |
| RM 2020 | 3.0 | 0 | 0 | 0 | 0 | 0 |
| *adjustment after mixing the two parts together* | | | | | | |
| 4% NaOH solution | 0 | 0 | 0 | adjust to pH = 9.4 | | |
| water: adjust viscosity to 30 sec (Zahn cup 2) for spray | | | | | | |
| Total wt | 422.2 | 442.5 | 388.1 | — | — | — |
| Formulation properties | | | | | | |
| C=C/AcAc | 1.2 | 1.2 | 1.2 | 1.2 | 1.2 | 1.2 |
| Epoxy component | no | EX-60 | EX-60 | no | EP828 | EX-60 |
| Epoxy/carboxyl ratio | 0 | 1.57 | 0.85 | 0 | 1.1 | 1.1 |
| Epoxy/bind, wt % | 0 | 40 | 25.6 | 0 | 12.1 | 30.4 |
| pigment/bind, wt % | 43.0 | 37.3 | 43.7 | 40.1 | 35.2 | 43.4 |
| TMGD/Binder, wt % | 3.76 | 3.24 | 3.83 | 3.10 | 2.72 | 3.10 |
| pH | 9.23 | 9.38 | 8.89 | 9.4 | 9.4 | 9.4 |
| visc., sec | 30 | 23 | 32 | 30 | 30 | 30 |
| pot-life, hr | 24 | 24 | 24 | 24 | 24 | 24 |
| FILM PROPERTIES (air dry 8 to 10 days) | | | | | | |
| color | white | white | white | white | white | white |
| DFT, mil | 2.0 | 1.6 | 1.6 | 1.7 | 2.3 | 2.2 |
| MEK rub | 100 | 100 | 160+ | 200+ | 200+ | 200+ |
| impact, | | | | | | |
| dir | 20 | 4 | 20 | 32 | 76 | 28 |
| rev | 4 | 0 | 4 | 4 | 8 | 4 |
| Hard, | | | | | | |
| pencil | H | H | 2H | 2H | 3H | 3H |
| Sward % | 26 | 26 | 32 | 16 | 22 | 22 |
| gloss, 60/20 | 88/78 | 79/49 | 84/66 | 86/65 | 87/70 | 86/65 |
| 60 degree gloss retention, % | | | | | | |
| UVCONII, | | | | | | |
| 0 hr | 100 | 100 | 100 | 100 | 100 | 100 |
| 220 | 68 | 83 | 74 | — | — | — |
| 257 | — | — | — | 78 | 85 | 72 |
| 304 | — | — | — | 66 | 88 | 66 |
| 500 | 50 | 70 | 60 | — | — | — |

Example 62

This example demonstrates the synergistic effects of using both epoxy and polyacetoacetate as crosslinkers for WDAUA.

Two-part coatings were prepared according to the formulations shown in Table 36. The preparation of S771A white paints used in Part I is already described in Example 61. GPacryl 513 is an acetoacetylated acrylic resin with an acetoacetate equivalent weight of 535 based on solid and is commercially available from Guertin Bros. Polymers. Coatings were sprayed on cold rolled steel panels and allow to air dry for 8 days for Examples 62 and 62-C1 and 18 days for Example 62-C2 before measuring the film properties. It took more than 10 days for coatings Example 62-C2 to achieve complete cure.

Both polyacetoacetate and epoxy components were used as crosslinkers for the WDAUA paints in Example 62 of the present invention. In comparison, only a polyacetoacetate component (GPacryl 513) was used in comparative Example 62-C1 on one hand and only an epoxy component (Epon 828) was used in comparative Example 62-C2 on the other hand. As can be seen from the data shown in Table 36, Example 62 of the present invention gave much better coatings performance properties than comparative Examples 62-C1 and 62-C2.

When only polyacetoacetate is used as in Example 62-C1, crosslinking takes place mainly through the Michael reaction between the active methylene groups and the acrylate vinyl groups. On the other hand, crosslinking is believed to take place mainly through carboxyl and epoxy reaction and epoxy self reaction under the base catalyst conditions in comparative Example 62-C2, in which only the epoxy component is used as the crosslinker. Coatings Example 62-C2 had a long dry time (about 48 hrs for tacky-free) indicating slower reaction between the carboxyl and epoxy groups. The synergistic effect of using epoxy with polyacetoacetate as the crosslinker is obviously shown by the results of Example 62 which gave much better coating properties than Examples 62-C1 and 62-C2.

TABLE 36

White paints based on WDAUA resin of Example 48B with aqueous emulsion of acetoacetylated acrylic resin (GPAcryl 513) and aqueous emulsion of Epon 828 epoxy resin as crosslinkers.

| Example #<br>Coatings # | 62-C1<br>S783A | 62<br>S784A | 62-C2<br>S787A |
|---|---|---|---|
| PART I | | | |
| S771A white | 300 | 300 | 300 |
| 20% TMGD/NMP | 2.2 | 2.2 | 0 |
| water | 40.1 | 30.0 | 31.7 |
| Part II CROSSLINKERS | | | |
| GPACRYL 513 Emulsion 47 wt % | 91.2 | 91.2 | 0 |
| Epon 828 emulsion 51 wt % | 0 | 19.1 | 0 |
| Epon 828 epoxy | 0 | 0 | 9.6 |
| NMP | 0 | 0 | 6.0 |
| Total wt | 433.5 | 442.6 | 347.3 |
| Formulation Properties | | | |
| AcAc component | GP513 | GP513 | no |
| Epoxy component | no | EP828 | EP828 |
| C=C/AcAc ratio | 1.2 | 1.2 | N/A |
| Epoxy/carboxyl ratio | 0 | 1.35 | 1.35 |
| Epoxy/bind, wt % | 0 | 7.8 | 7.8 |
| pigment/bind, wt % | 39.1 | 36.1 | 55.2 |

TABLE 36-continued

White paints based on WDAUA resin of Example 48B with aqueous emulsion of acetoacetylated acrylic resin (GPAcryl 513) and aqueous emulsion of Epon 828 epoxy resin as crosslinkers.

| Example #<br>Coatings # | 62-C1<br>S783A | 62<br>S784A | 62-C2<br>S787A |
|---|---|---|---|
| TMGD/Binder, wt % | 3.42 | 3.15 | 4.28 |
| pH | 9.37 | 9.50 | 9.34 |
| Visc., sec | 26 | 30 | 43 |
| Tacky-free time, hr | 5 | 5 | 48 |
| pot-life, hr | 24 | 24 | 6 |
| FILM PROPERTIES (air dry 8 to 10 days) | | | |
| color | white | white | white |
| MEK rub | 140 | 200+ | 50 |
| impact, | | | |
| dir | 160 | 160 | 50 |
| rev | 120 | 160 | 8 |
| Hard, | | | |
| pencil | F | H | F |
| Sward % | 12 | 16 | 12 |
| gloss, 60/20 degree | 89/78 | 90/80 | 82/67 |
| 60 degree gloss retention, % | | | |
| UVCON, | | | |
| 0 hr | 100 | 100 | 100 |
| 48 | 93 | 97 | 99 |
| 183 | — | — | 98 |
| 314 | 51 | 82 | — |
| 436 | 28 | 74 | — |

Example 63

Preparation of a hydrophobic urethane polyacrylate (GI-170) based on HDT (HDI isocyanurate trimer)

A 2-liter reactor equipped with a stirrer, a reflux condenser, a thermometer and a dropping funnel was charged with the following materials:

| Tolonate HDT | 504.4 g |
|---|---|
| T-12 | 0.3 g |
| MEHQ | 0.05 g | at room temperature. The reactor charge was purged with dry air, heated to 60° C. 347.0 g of HPA was fed to the reactor over about 200 minutes while maintaining the reaction temperature at 60 to 65° C. The reaction temperature was then increased to 80° C. and maintained at 80° C. until the NCO content of the reaction mixture was reduced to below 0.2 wt. %. The temperature of the reaction content was then decreased to 50° C., and 11 g of methanol was added and mixed for about 30 minutes before collecting.

The HDT triacrylate (HDTTA) resin so obtained had the following properties.

| Solid, % | >98 |
|---|---|
| Gardner color | <1 |
| Gardner viscosity | Z10 |
| C=C EW | 303 |

Example 64

This example demonstrates the effects of epoxy on a solvent-borne Michael reaction curing coating system which does not contain carboxyl functional groups and uses a lower level of catalyst (TMGD).

Clear coatings were prepared according to the formulations shown in Table 37. Coating films were drawn down with a 3 mil doctor blade on cold rolled steel panels, some primed with a brown epoxy primer. Gloss and gloss retention were measured for the epoxy primered panels and other film properties were measured for the unprimered panels.

Epon 828 present in Example 64 (S788B) seems to function more as a plasticizer and flow agent to assist in obtaining better gloss and soft coatings films, as compared to the film properties of Example 64-C without Epon 828 epoxy resin, than as a co-crosslinker to contribute to crosslinking of coating films.

TABLE 37

Formulations and properties of solvent-borne Michael reaction curable coatings based on GPacryl 513 acetoacetylated acrylic resin.

| Example # | 64 | 64-C |
|---|---|---|
| Coatings # | S788B | S789B |
| | Part by weight | |
| GPacryl 513 | 20.6 | 20.6 |
| HDTTA (Example 16) | 11.6 | 11.6 |
| Epon 828 epoxy resin | 2.2 | 0 |
| EDGM | 8.0 | 10.2 |
| 20 TMGD in NMP | 0.90 | 0.90 |
| Formulation Properties | | |
| Epoxy/total solid, wt % | 7.3 | 0 |
| C═C/AcAc ratio | 1.2 | 1.2 |
| gel time, hr | 1.0 | 1.0 |
| tacky-free time, hr | 4.0 | 3.5 |
| Cured film properties | | |
| MEK double rub | 200++ | 200++ |
| Impact, lb-in, | | |
| direct | 120 | 120 |
| reverse | 120 | 120 |
| Hardness, | | |
| pencil | F | H |
| sward, % | 14 | 20 · |
| Gloss, 60/20 degree | 90/83 | 89/79 |
| 60 degree gloss retention, | | |
| UVCON | | |
| 0 hr | 100 | 100 |
| 48 hr | 99 | 100 |
| 183 hr | 98 | 97 |

U.S. patent applications Ser. Nos. 08/058,240, filed on May 10, 1993, and 08/165,643, filed on Dec. 13, 1993, are incorporated herein in their entirety by reference.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An ambient-temperature-curable aqueous polymer system, comprising:
   (A) an acetoacetylated polymer; and
   (B) a polyacrylate containing at least two (meth)acrylate end groups,
in the form of an aqueous solution, suspension, or emulsion, wherein said acetoacetylated polymer is a water-dispersible acetoacetylated acrylic resin obtained by solution copolymerization of 10 to 60 wt. % of a (meth)acrylic monomer (M1) having the formula $$CH_2=C(R1)-CO-O-R2-O-CO-CH_2-CO-CH_3 \quad (M1)$$

wherein R1 is —H or —CH$_3$ and R2 is a linear or branched saturated C$_{1-4}$ alkylene group, 1 to 15 wt. % of a carboxyl vinyl monomer (M2), and 25 to 89 wt. % of a copolymerizable vinyl monomer (M3) selected from the group consisting of C$_{1-4}$-alkyl (meth)acrylate and styrene.

2. The aqueous polymer system of claim 1, wherein said polyacrylate (B) is a NCO-free urethane polyacrylate having at least two (meth)acrylate end groups, obtained by capping a linear, branched or cyclic alkyl or aryl polyisocyanate, or a NCO-terminated urethane prepolymer obtained by reacting an excess of a linear, branched or cyclic alkyl or aryl polyisocyanate with a linear, branched or cyclic alkyl or aryl polyol, with a hydroxyl-containing (meth)acrylate of formula (B4a), (B4b), (B4c) or mixtures thereof $$CH_2=C(R1)-CO-O-R4-OH \quad (B4a)$$

$$CH_2=C(R1)-CO-O-R4-O-CO-(CH_2)_6-OH \quad (B4b)$$

$$CH_2=C(R1)-CO-O-(R4-O)_n-H \quad (B4c)$$

wherein R1 is H or CH$_3$, R4 is a C$_{2-6}$ linear or branched alkylene, and n is an integer of 2 to 30.

3. The aqueous polymer system of claim 1, wherein said polyacrylate (B) is a NCO-free urethane polyacrylate having at least two (meth)acrylate and groups, obtained by capping a linear, branched or cyclic alkyl or aryl polyol with a single NCO-terminated (meth)acrylate which is obtained by reacting an excess of a linear, branched or cyclic alkyl or aryl polyisocyanate with a hydroxyl-containing (meth)acrylate of formula (B4a), (B4b), (B4c) or mixtures thereof $$CH_2=C(R1)-CO-O-R4-OH \quad (B4a)$$

$$CH_2=C(R1)-CO-O-R4-O-CO-(CH_2)_6-OH \quad (B4b)$$

$$CH_2=C(R1)-CO-O-(R4-O-)_n-H \quad (B4c)$$

wherein R1 is H or CH$_3$, R4 is a C$_{2-6}$ linear or branched alkylene, and n is an integer of 2 to 30.

4. The aqueous polymer system according to claim 2, wherein said NCO-free urethane polyacrylate is a water dispersible NCO-free polyurethane polyacrylate resin obtained by incorporating into the NCO-free urethane polyacrylate 0 to 6 wt. % of carboxyl groups from an alpha, alphadimethylalkylanoic acid, and/or 0 to 10 wt. % of a polyethylene oxide having a molecular weight from 300 to 1500.

5. The polymer system of claim 1, further comprising a catalyst having a pKa of 12 to 14.

6. The aqueous polymer system of claim 5, wherein said catalyst is a blend of at least two bases of a pKa of 12 to 14.

7. The aqueous polymer system of claim 1, wherein said polyacrylate (B) is a NCO-free urethane polyacrylate having at least two (meth)acrylate end groups, obtained by capping a linear, branched or cyclic alkyl or aryl polyisocyanate, or a NCO-terminated urethane prepolymer obtained by reacting an excess of a linear, branched or cyclic alkyl or aryl polyisocyanate with a linear, branched or cyclic alkyl or aryl polyol, with a hydroxyl-containing (meth)acrylate of formula (B4a), (B4b), (B4c) or mixtures thereof $$CH_2=C(R1)-CO-O-R4-OH \quad (B4a)$$

$$CH_2=C(R1)-CO-O-R4-O-CO-(CH_2)_6-OH \quad (B4b)$$

$$CH_2=C(R1)-CO-O-(R4-O-)_n-H \quad (B4c)$$

wherein R1 is H or $CH_3$, R4 is a $C_{2-6}$ linear or branched alkylene, and n is an integer of 2 to 30.

8. The aqueous polymer system according to claim 3, wherein said acetoacetylated polymer (A) is a water-dispersible acetoacetylated acrylic resin obtained by solution copolymerization of 10 to 60 wt. % of a (meth)acrylic monomer (M1) having the formula $$CH_2=C(R1)-CO-O-R2-O-CO-CH_2-CO-CH_3 \quad (M1)$$

wherein R1 is —H or —$CH_3$ and R2 is a linear or branched saturated $C_{1-4}$-alkylene group, 1 to 15 wt. % of a carboxyl vinyl monomer (M2), and 25 to 89 wt. % of a copolymerizable vinyl monomer (M3) selected from the group consisting of $C_{1-4}$-alkyl (meth)acrylate and styrene.

9. The aqueous polymer system according to claim 3, wherein said acetoacetylated polymer (A) is a mixture of:

(a) a water-dispersible acetoacetylated acrylic resin obtained by solution copolymerization of 10 to 60 wt. % of a (meth)acrylic monomer (M1) having the formula $$CH_2=C(R1)-CO-O-R2-O-CO-CH_2-CO-CH_3 \quad (M1)$$

wherein R1 is —H or —$CH_3$ and R2 is a linear or branched saturated $C_{1-4}$-alkylene group, 1 to 15 wt. % of a carboxyl vinyl monomer (M2), and 25 to 89 wt. % of a copolymerizable vinyl monomer (M3) selected from the group consisting of $C_{1-4}$-alkyl (meth)acrylate and styrene;

(b) an acetoacetylated acrylic latex obtained by emulsion polymerization of 10 to 60 wt. % of a (meth)acrylic monomer (M1) having the formula $$CH_2=C(R1)-CO-O-R2-OCO-CH_2-CO-CH_3 \quad (M1)$$

wherein R1 is —H or —$CH_3$ and R2 is a linear or branched saturated $C_{1-4}$-alkylene group, 0 to 8 wt. % of a carboxyvinyl monomer (M2), and 32 to 90 wt. % of a copolymerizable monomer (M3) selected from the group consisting of $C_{1-4}$-alkyl(meth)acrylates and styrene in the presence of 0 to 10 wt. % of an anionic surfactant, a nonionic surfactant or a mixture thereof, and 0.1 to 5 wt. % of a free radical initiator; and (c) an acetoacetylated polyester or a polyfunctional acetoacetate compound obtained by (a) transesterifying a linear, branched or cyclic alkyl or aryl polyol and a $C_{1-4}$ linear or branched alkyl acetoacetate, or (b) reacting diketene with a linear, branched or cyclic alkyl or aryl polyol.

10. An ambient-temperature curable composition, comprising:

(A) a compound containing at least two acetoacetate methylene groups;

(B) a compound containing at least two acrylate alkene groups;

(C) a compound containing at least two expoxy groups; and (D) a Michael reaction catalyst base.

11. The ambient-temperature curable composition of claim 10, wherein said compound containing at least two acrylate alkene groups is a water dispersible polyacrylate resin containing carboxyl groups.

12. The ambient-temperature curable composition of claim 11, wherein said water dispersible polyacrylate resin is a water dispersion of a water-dispersible acrylated urethane acrylic (WDAUA) resin neutralized with said Michael reaction catalyst base and/or other suitable bases.

13. The ambient-temperature curable composition of claim 12, wherein said compound containing at least two epoxy groups and said acetoacetate methylene-containing component are contained in a first storage-stable package, and said water dispersion of WDAUA is contained in a second storage-stable package.

14. The composition of claim 13, wherein said compound containing at least two epoxy groups is a liquid diglycidyl ether of bisphenol A.

15. The composition of claim 13, wherein said compound containing at least two epoxy groups is glycidyl methacrylate (GMA) chemically bonded onto the acetoacetate component as a copolymer.

16. The composition of claim 13, wherein said compound containing at least two epoxy groups is glycidol chemically bonded onto the acetoacetate component.

17. A process for preparing a cured coating comprising curing a mixture of:

(A) a compound containing at least two acetoacetate methylene groups;

(B) a compound containing at least two acrylate alkene groups; and (C) a compound containing at least two expoxy groups, in the presence of:

(D) a Michael reaction catalyst base.

18. The process according to claim 17, wherein said compound containing at least two acrylate alkene groups is a water dispersible polyacrylate resin containing carboxyl groups.

19. The process according to claim 18, wherein said water dispersible polyacrylate resin is a water dispersion of a water-dispersible acrylated urethane acrylic (WDAUA) resin neutralized with said Michael reaction catalyst base and/or other suitable bases.

20. The process according to claim 19, wherein said compound containing at least two epoxy groups and said acetoacetate methylene-containing component are contained in a first storage-stable package, and said water dispersion of WDAUA is contained in a second storage-stable package.

21. The process according to claim 20, wherein said compound containing at least two epoxy groups is a liquid diglycidyl ether of bisphenol A.

22. The process according to claim 20, wherein said compound containing at least two epoxy groups is glycidyl methacrylate (GMA) chemically bonded onto the acetoacetate component as a copolymer.

23. The process according to claim 20, wherein said compound containing at least two epoxy groups is glycidol chemically bonded onto the acetoacetate component.

24. A cured coating prepared by a process comprising curing a mixture of:

(A) a compound containing at least two acetoacetate methylene groups;

(B) a compound containing at least two acrylate alkene groups; and (C) a compound containing at least two expoxy groups, in the presence of:

(D) a Michael reaction catalyst base.

25. The coating of claim 24, wherein said compound containing at least two acrylate alkene groups is a water dispersible polyacrylate resin containing carboxyl groups.

26. The coating of claim 25, wherein said water dispersible polyacrylate resin is a water dispersion of a water-dispersible acrylated urethane acrylic (WDAUA) resin neutralized with said Michael reaction catalyst base and/or other suitable bases.

27. The coating of claim 26, wherein said compound containing at least two epoxy groups and said acetoacetate methylene-containing component are contained in a first storage-stable package, and said water dispersion of WDAUA is contained in a second storage-stable package.

28. The coating of claim 27, wherein said compound containing at least two epoxy groups is a liquid diglycidyl ether of bisphenol A.

29. The coating of claim 27, wherein said compound containing at least two epoxy groups is glycidyl methacrylate (GMA) chemically bonded onto the acetoacetate component as a copolymer.

30. The coating of claim 27, wherein said compound containing at least two epoxy groups is glycidol chemically bonded onto the acetoacetate component.

* * * * *